(12) United States Patent
Zhu et al.

(10) Patent No.: US 12,519,515 B2
(45) Date of Patent: Jan. 6, 2026

(54) DATA PROCESSING METHOD AND APPARATUS

(71) Applicant: HUAWEI TECHNOLOGIES CO., LTD., Guangdong (CN)

(72) Inventors: Huiying Zhu, Shanghai (CN); Pengpeng Dong, Shanghai (CN); Zhiyuan Tan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 81 days.

(21) Appl. No.: 18/398,385

(22) Filed: Dec. 28, 2023

(65) Prior Publication Data

US 2024/0214042 A1  Jun. 27, 2024

Related U.S. Application Data

(63) Continuation of application No. PCT/CN2022/100546, filed on Jun. 22, 2022.

(30) Foreign Application Priority Data

Jun. 29, 2021   (CN) .......................... 202110727292.9

(51) Int. Cl.
*H04B 7/0456* (2017.01)
*H03M 13/11* (2006.01)
(Continued)

(52) U.S. Cl.
CPC ....... *H04B 7/0482* (2013.01); *H03M 13/1102* (2013.01); *H03M 13/1515* (2013.01); *H03M 13/152* (2013.01); *H04L 1/0041* (2013.01)

(58) Field of Classification Search
CPC ............... H04B 7/0478; H04B 7/0482; H03M 13/1102; H03M 13/1515; H03M 13/152; H04L 1/0041
(Continued)

(56) References Cited

U.S. PATENT DOCUMENTS

2021/0058989 A1    2/2021  Simsek et al.

FOREIGN PATENT DOCUMENTS

| CN | 107634803 A | 1/2018 |
| CN | 107205192   | * 10/2019 |

OTHER PUBLICATIONS

Intel Corporation, ATandT, Use cases and options for network coding in IAB, 3GPP TSG RAN Meeting #86, RP-192535, Sitges, Spain, Dec. 9-12, 2019, total 7 pages.
(Continued)

*Primary Examiner* — Leila Malek

(57) ABSTRACT

A data processing method and apparatus are disclosed, which may be applied to communication systems such as 5G systems and 6G systems. The method includes: obtaining an extended first codebook based on a second codebook by increasing a quantity of codewords or lengths of codewords, and performing first network coding or decoding based on the first codebook. Linear independence between codewords in the extended first codebook may be ensured as much as possible, so as to generate more valid redundant packets or check packets, thereby improving system reliability. Alternatively, flexible block lengths are supported, so as to perform efficient network coding or decoding on more original data packets, thereby improving system spectral efficiency. This application may be applied to an extended reality (XR) service or a low-delay service.

9 Claims, 14 Drawing Sheets

(51) Int. Cl.
  *H03M 13/15* (2006.01)
  *H04L 1/00* (2006.01)
(58) Field of Classification Search
  USPC .......................................................... 375/267
  See application file for complete search history.

(56) References Cited

OTHER PUBLICATIONS

International Search Report and Written Opinion issued in PCT/CN2022/100546, dated Sep. 21, 2022, 9 pages.
Francisco L\"Azaro et al: "Parallel Concatenation of Non-Binary Linear Random Fountain Codes with Maximum Oistance Separable Codes", arxiv.org. Cornell University Library. 201 Olin Library Cornell University Ithaca, NY 14853, Sep. 17, 2019 (Sep. 17, 2019), XP081478752, total 9 pages.
Extended European Search Report issued in EP22831811.9, dated Sep. 10, 2024, 10 pages.

* cited by examiner $Y^{N\times 1}$  $A^{N\times K}$  $X^{K\times 1}$

Encoded data = Coding coefficient matrix · Original data

DATA PROCESSING METHOD AND APPARATUS

CROSS REFERENCE TO RELATED APPLICATIONS

This application is a continuation of International Application No. PCT/CN2022/100546, filed on Jun. 22, 2022, which claims priority to Chinese Patent Application No. 202110727292.9, filed on Jun. 29, 2021. The disclosures of the aforementioned applications are hereby incorporated by reference in their entireties.

TECHNICAL FIELD

This application relates to the communication field, and in particular, to a data processing method and apparatus.

BACKGROUND

In an existing communication system, effective error control is implemented for feedback retransmission. For example, a hybrid automatic repeat request (HARQ) mechanism at a medium access control (MAC) layer and an automatic repeat request retransmission mechanism at a radio link control (RLC) layer jointly ensure reliability of data transmission. However, with evolution and development of communication technologies, a new radio (NR) access technology imposes higher requirements on system reliability, effectiveness, and the like, and a feedback retransmission mechanism also faces many problems, for example, high overheads and performance loss caused by frequent feedback in a multicast or broadcast scenario. A network coding technology is a forward error correction (FEC) technology. The network coding technology encodes original data packets and adds redundancy in advance to prevent packet loss or performance loss in wireless transmission, to reduce feedback overheads. Therefore, the network coding technology provides a different solution to ensure transmission reliability for the new radio access technology.

However, the network coding technology may have a problem that coding efficiency and flexible code rates cannot be balanced. For example, fountain codes and random linear network coding (RLNC) support flexible code rates, but cannot ensure that a coding coefficient is linearly independent, resulting in low coding efficiency. However, for a maximum distance separable (MDS) code based on a codebook, for example, an RS code, a codebook is formed based on a Vandermonde matrix or a Cauchy matrix, and a coding coefficient is linearly independent, so that coding efficiency can be ensured. However, because a size of a codebook is fixed and depends on a field size of a finite field, for example, a field size of a Galois Field (GF). That is, a maximum quantity of original data packets that can be encoded and a maximum quantity of redundant packets that can be generated are usually limited. Therefore, flexible quantities/block lengths of the original data packets, quantities/code lengths of the encoded data packets, and the like cannot be supported, that is, flexible code rates cannot be supported.

Therefore, how to design a redundancy generation method to improve coding efficiency and flexible code rates becomes an urgent problem to be resolved.

SUMMARY

Embodiments of this application provide a data processing method and apparatus, to improve linear independence between coding coefficients, so as to resolve a problem that coding efficiency and flexible code rates cannot be balanced.

To achieve the foregoing objective, the following technical solutions are used in this application.

According to a first aspect, a data processing method is provided. The method may be performed by a transmitter device (for example, a terminal device or a network device), or may be performed by a component of the transmitter device, for example, a processor, a chip, or a chip system of the transmitter device. Alternatively, the method may be performed by a receiver device (for example, a terminal device or a network device), or may be performed by a component of the receiver device, for example, a processor, a chip, or a chip system of the receiver device. The method includes: obtaining a first codebook, and performing first network coding or decoding based on the first codebook. The first codebook may be obtained by using one or more of the following extension rules.

Extension rule 1: The first codebook includes a codeword in a third codebook, the third codebook is different from the second codebook, and the second codebook is used to perform second network coding or decoding. In other words, the first codebook is a codebook obtained by adding some or all codewords in the third codebook based on the second codebook. In this case, the second codebook may be referred to as a base codebook of the first codebook, and the first codebook may be referred to as an extension codebook of the second codebook. Specifically, the first codebook may be a codebook, and the codebook includes a codeword in the second codebook and some or all of the codewords in the third codebook. Alternatively, the first codebook may include two sub-codebooks, where one sub-codebook includes a codeword in the second codebook, and the other sub-codebook includes some or all of the codewords in the third codebook. This is not specifically limited herein.

Extension rule 2: Any codeword in the first codebook includes: s elements in one codeword in the second codebook, where s is a length of one codeword in the second codebook, and s is a positive integer; and all elements or some elements in one codeword in the third codebook or one codeword in the second codebook, where a quantity of all the elements is a length of one codeword in the third codebook or the second codebook, and values of different elements in the codeword are the same or different. In other words, any codeword in the first codebook is extended by adding an element included in one codeword to the second codebook, and the added element may come from one codeword in the third codebook, or may come from any codeword in the second codebook. In this case, the second codebook may be referred to as a base codebook of the first codebook, and the first codebook may be referred to as an extension codebook of the second codebook. Specifically, the first codebook may be a codebook, and a size (size, which may also be referred to as a dimension or a length) of any codeword in the codebook is greater than a size of any codeword in the second codebook.

It should be noted that one element in the foregoing codeword is one member in the codeword, and values of different members may be the same or may be different. This is not specifically limited herein.

In this embodiment of this application, the third codebook in the foregoing two extension rules may be determined based on a first matrix corresponding to the third codebook, or may be determined based on a relationship between the first matrix corresponding to the third codebook and a second matrix corresponding to the second codebook.

Specifically, the first matrix and the second matrix may be obtained in one or more of the following manners.

Manner 1: The first matrix is a random coefficient full-rank matrix, and the second matrix is a non-random coefficient full-rank matrix. In this way, the third codebook corresponds to a full-rank random matrix, so that a linear independence feature can be maintained between codewords, and more valid redundant packets or check packets can be generated, so that flexible code rates or code lengths are supported; or flexible block lengths can be supported, or more original data packets can be efficiently encoded, to improve coding or decoding performance, thereby improving system spectral efficiency or improving system reliability.

Manner 2: The first matrix and the second matrix satisfy one of the following relationships: A vector in the first matrix and a vector in the second matrix come from a set of row vectors in a same matrix A, and a length of the vector in the first matrix or a length of the vector in the second matrix is less than or equal to a length of a row vector of the matrix A; or a vector in the first matrix and a vector in the second matrix come from a set of column vectors in a same matrix A, and a length of the vector in the first matrix or a length of the vector in the second matrix is less than or equal to a length of a column vector in the matrix A, where one or more vectors in the first matrix (that is, all or some vectors in the first matrix) are different from all vectors in the second matrix. In other words, the first matrix includes at least one vector that is different from all vectors in the second matrix. Both the third codebook and the second codebook may come from a same full-rank matrix, so that a linear independence feature can be maintained between a codeword in the third codebook and a codeword in the second codebook. More valid redundant packets or check packets can be generated than those generated in a manner in which network coding is performed based on only the second codebook, and flexible code rates or code lengths can be supported; or flexible block lengths can be supported, or more original data packets can be efficiently encoded, to improve coding or decoding performance, thereby improving system spectral efficiency or improving system reliability.

Manner 3: The first matrix and the second matrix satisfy a functional relationship. Optionally, the functional relationship may keep a linear independence feature between a codeword in the third codebook and a codeword in the second codebook. More valid redundant packets or check packets can be generated than those generated in a manner in which network coding is performed based on only the second codebook, and flexible code rates or code lengths can be supported; or flexible block lengths can be supported, or more original data packets can be efficiently encoded, to improve coding or decoding performance, thereby improving system spectral efficiency or improving system reliability. For a specific implementation of the function, refer to the following descriptions.

Manner 4: A field size of a finite field corresponding to the first matrix is greater than a field size of a finite field corresponding to the second matrix. In this way, when the network coding is performed based on the first codebook, more valid redundant packets or check packets can be generated than those generated in a manner in which network coding is performed based on only the second codebook, and flexible code rates or code lengths can be supported; or flexible block lengths can be supported, or more original data packets can be efficiently encoded. Further, based on a feature of the third codebook, a linear independence feature may be maintained between codewords as much as possible, to improve coding or decoding performance, thereby improving system spectral efficiency or improving system reliability.

Based on the data processing method according to the first aspect, codebook extension may be implemented by increasing a codeword quantity and/or increasing a codeword size, so that more valid redundant packets or check packets can be generated, and flexible code rates or code lengths can be supported, or flexible block lengths can be supported, or more original data packets can be efficiently encoded, to improve coding or decoding performance, thereby improving system spectral efficiency or improving system reliability.

The following describes Manner 1 to Manner 4 in detail.

For Manner 1, optionally, the second matrix is also a full-rank matrix, that is, both the first matrix and the second matrix are full-rank matrices. This ensures linear independence between original codewords and between extension codewords in the first codebook, so that flexible block lengths can be supported or more original data packets can be efficiently encoded, thereby improving coding or decoding performance, and improving system spectral efficiency.

For Manner 2, in a possible implementation, the matrix A satisfies $$\begin{bmatrix} a_1^0 & a_2^0 & \ldots & a_m^0 & \ldots & a_q^0 \\ a_1^1 & a_2^1 & \ldots & a_m^1 & \ldots & a_q^1 \\ \vdots & \vdots & \ddots & \vdots & \ddots & \vdots \\ a_1^l & a_2^l & \ldots & a_m^l & \ldots & a_q^l \\ \vdots & \vdots & \ddots & \vdots & \ddots & \vdots \\ a_1^{q-1} & a_2^{q-1} & \ldots & a_m^{q-1} & \ldots & a_q^{q-1} \end{bmatrix}$$

or $$\begin{bmatrix} a_1^0 & a_2^0 & \ldots & a_m^0 & \ldots & a_q^0 \\ a_1^1 & a_2^1 & \ldots & a_m^1 & \ldots & a_q^1 \\ \vdots & \vdots & \ddots & \vdots & \ddots & \vdots \\ a_1^l & a_2^l & \ldots & a_m^l & \ldots & a_q^l \\ \vdots & \vdots & \ddots & \vdots & \ddots & \vdots \\ a_1^{q-1} & a_2^{q-1} & \ldots & a_m^{q-1} & \ldots & a_q^{q-1} \end{bmatrix}^T.$$

q is a size of a finite field minus 1, $a_m$ is an element in the finite field, $1 \leq m \leq q$, $a_1, a_2, \ldots, a_m, \ldots, a_q$ are different elements in the finite field, $a_m^l$ is $a_m$ to the power of l, and $0 \leq l \leq q-1$. The third codebook and the second codebook may come from a full-rank Vandermonde matrix, so that a linear independence feature can be maintained between a codeword in the third codebook and a codeword in the second codebook. More valid redundant packets or check packets can be generated than those generated in a manner in which network coding is performed based on only the second codebook, and flexible code rates or code lengths can be supported; or flexible block lengths can be supported, or more original data packets can be efficiently encoded, to improve coding or decoding performance, thereby further improving system spectral efficiency or improving system reliability.

In another possible implementation, the first matrix satisfies $$V_1 = \begin{bmatrix} b_1^0 & b_2^0 & \ldots & b_m^0 & \ldots & b_q^0 \\ b_1^1 & b_2^1 & \ldots & b_m^1 & \ldots & b_q^1 \\ \vdots & \vdots & \ddots & \vdots & \ddots & \vdots \\ b_1^l & b_2^l & \ldots & b_m^l & \ldots & b_q^l \\ \vdots & \vdots & \ddots & \vdots & \ddots & \vdots \\ b_1^{K-1} & b_2^{K-1} & \ldots & b_m^{K-1} & \ldots & b_q^{K-1} \end{bmatrix},$$

and the second matrix satisfies $$V_0 = \begin{bmatrix} a_1^0 & a_2^0 & \ldots & a_m^0 & \ldots & a_q^0 \\ a_1^1 & a_2^1 & \ldots & a_m^1 & \ldots & a_q^1 \\ \vdots & \vdots & \ddots & \vdots & \ddots & \vdots \\ a_1^l & a_2^l & \ldots & a_m^l & \ldots & a_q^l \\ \vdots & \vdots & \ddots & \vdots & \ddots & \vdots \\ a_1^{K-1} & a_2^{K-1} & \ldots & a_m^{K-1} & \ldots & a_q^{K-1} \end{bmatrix}^T,$$

where $[b_1, b_2, \ldots, b_m, \ldots, b_q]$ and $[a_1, a_2, \ldots, a_m, \ldots, a_q]$ are different. It may be understood that, that the two vectors described in this application are different may mean that elements are the same, but sequences are different, and/or all or some of the elements are different. Alternatively, the first matrix satisfies $$V_1 = \begin{bmatrix} b_1^0 & b_2^0 & \ldots & b_m^0 & \ldots & b_q^0 \\ b_1^1 & b_2^1 & \ldots & b_m^1 & \ldots & b_q^1 \\ \vdots & \vdots & \ddots & \vdots & \ddots & \vdots \\ b_1^l & b_2^l & \ldots & b_m^l & \ldots & b_q^l \\ \vdots & \vdots & \ddots & \vdots & \ddots & \vdots \\ b_1^{K-1} & b_2^{K-1} & \ldots & b_m^{K-1} & \ldots & b_q^{K-1} \end{bmatrix}^T,$$

and the second matrix satisfies $$V_0 = \begin{bmatrix} a_1^0 & a_2^0 & \ldots & a_m^0 & \ldots & a_q^0 \\ a_1^1 & a_2^1 & \ldots & a_m^1 & \ldots & a_q^1 \\ \vdots & \vdots & \ddots & \vdots & \ddots & \vdots \\ a_1^l & a_2^l & \ldots & a_m^l & \ldots & a_q^l \\ \vdots & \vdots & \ddots & \vdots & \ddots & \vdots \\ a_1^{K-1} & a_2^{K-1} & \ldots & a_m^{K-1} & \ldots & a_q^{K-1} \end{bmatrix},$$

where $[b_1, b_2, \ldots, b_m, \ldots, b_q]^T$ and $[a_1, a_2, \ldots, a_m, \ldots, a_q]^T$ are different. K is a quantity of original data packets corresponding to the first network coding or decoding, q is a field size of a finite field minus 1; $a_m$ is an element in the finite field, $1 \leq m \leq q$, $a_1, a_2, \ldots, a_m, \ldots, a_q$ are different elements in the finite field, $a_m^l$ is $a_m$ to the power of l, and $0 \leq l \leq K-1$; and $b_m$ is an element in the finite field, $1 \leq m \leq q$, $b_1, b_2, \ldots, b_m, \ldots, b_q$ are different elements in the finite field, $b_m^l$ is $b_m$ to the power of l, and $0 \leq l \leq K-1$. The third codebook and the second codebook may come from different full-rank Vandermonde matrices, so that a linear independence feature can be maintained between a codeword in the third codebook and a codeword in the second codebook as much as possible. More valid redundant packets or check packets can be generated than those generated in a manner in which network coding is performed based on only the second codebook, and flexible code rates or code lengths can be supported; or flexible block lengths can be supported, or more original data packets can be efficiently encoded, to improve coding or decoding performance, thereby further improving system spectral efficiency or improving system reliability.

For Manner 3, that the first matrix and the second matrix satisfy a functional relationship may include: the first matrix is a product of the second matrix and a diagonal matrix corresponding to a non-zero row vector $v=[v_1, \ldots, v_K]$ or $[v_1, \ldots, v_q]$ or a non-zero column vector $v=[v_1, \ldots, v_K]^T$ or $[v_1, \ldots, v_q]^T$. In this way, the third codebook comes from an extension matrix of a matrix corresponding to the second codebook, so that a linear independence feature can be maintained between a codeword in the third codebook and a codeword in the second codebook as much as possible. More valid redundant packets or check packets can be generated than those generated in a manner in which network coding is performed based on only the second codebook, and flexible code rates or code lengths can be supported; or flexible block lengths can be supported, or more original data packets can be efficiently encoded, to improve coding or decoding performance, thereby further improving system spectral efficiency or improving system reliability.

Optionally, that the first matrix and the second matrix satisfy a functional relationship may include: the second matrix satisfies $$V_0 = \begin{bmatrix} a_1^0 & a_2^0 & \ldots & a_m^0 & \ldots & a_q^0 \\ a_1^1 & a_2^1 & \ldots & a_m^1 & \ldots & a_q^1 \\ \vdots & \vdots & \ddots & \vdots & \ddots & \vdots \\ a_1^l & a_2^l & \ldots & a_m^l & \ldots & a_q^l \\ \vdots & \vdots & \ddots & \vdots & \ddots & \vdots \\ a_1^{K-1} & a_2^{K-1} & \ldots & a_m^{K-1} & \ldots & a_q^{K-1} \end{bmatrix},$$

the non-zero vector is a row vector $v=[v_1, \ldots, v_K]$ or a column vector $v=[v_1, \ldots, v_K]^T$, and the first matrix satisfies $$V_1 = \text{diag}(v) \times V_0 = \begin{bmatrix} v_1 a_1^0 & v_1 a_2^0 & \ldots & v_1 a_m^0 & \ldots & v_1 a_q^0 \\ v_2 a_1^1 & v_2 a_2^1 & \ldots & v_2 a_m^1 & \ldots & v_2 a_q^1 \\ \vdots & \vdots & \ddots & \vdots & \ddots & \vdots \\ v_m a_1^l & v_m a_2^l & \ldots & v_m a_m^l & \ldots & v_m a_q^l \\ \vdots & \vdots & \ddots & \vdots & \ddots & \vdots \\ v_K a_1^{K-1} & v_K a_2^{K-1} & \ldots & v_K a_m^{K-1} & \ldots & v_K a_q^{K-1} \end{bmatrix},$$

where $$\text{diag}(v) = \begin{bmatrix} v_1 & 0 & \ldots & 0 \\ 0 & v_2 & \ldots & 0 \\ \vdots & \vdots & \ddots & \vdots \\ 0 & 0 & \ldots & v_K \end{bmatrix}.$$

Alternatively, the second matrix satisfies $$V_0 = \begin{bmatrix} a_1^0 & a_2^0 & \ldots & a_m^0 & \ldots & a_q^0 \\ a_1^1 & a_2^1 & \ldots & a_m^1 & \ldots & a_q^1 \\ \vdots & \vdots & \ddots & \vdots & \ddots & \vdots \\ a_1^l & a_2^l & \ldots & a_m^l & \ldots & a_q^l \\ \vdots & \vdots & \ddots & \vdots & \ddots & \vdots \\ a_1^{K-1} & a_2^{K-1} & \ldots & a_m^{K-1} & \ldots & a_q^{K-1} \end{bmatrix},$$

the non-zero vector is a row vector $v=[v_1, \ldots, v_q]$ or a column vector $v=[v_1, \ldots, v_q]^T$, and the first matrix satisfies $$V_1 = V_0 \times \mathrm{diag}(v) = \begin{bmatrix} v_1 a_1^0 & v_2 a_2^0 & \ldots & v_m a_m^0 & \ldots & v_q a_q^0 \\ v_1 a_1^1 & v_2 a_2^1 & \ldots & v_m a_m^1 & \ldots & v_q a_q^1 \\ \vdots & \vdots & \ddots & \vdots & \ddots & \vdots \\ v_1 a_1^l & v_2 a_2^l & \ldots & v_m a_m^l & \ldots & v_q a_q^l \\ \vdots & \vdots & \ddots & \vdots & \ddots & \vdots \\ v_1 a_1^{K-1} & v_2 a_2^{K-1} & \ldots & v_m a_m^{K-1} & \ldots & v_q a_q^{K-1} \end{bmatrix}^T,$$

where $$\mathrm{diag}(v) = \begin{bmatrix} v_1 & 0 & \ldots & 0 \\ 0 & v_2 & \ldots & 0 \\ \vdots & \vdots & \ddots & \vdots \\ 0 & 0 & \ldots & v_q \end{bmatrix}.$$

Alternatively, the second matrix satisfies $$V_0 = \begin{bmatrix} a_1^0 & a_2^0 & \ldots & a_m^0 & \ldots & a_q^0 \\ a_1^1 & a_2^1 & \ldots & a_m^1 & \ldots & a_q^1 \\ \vdots & \vdots & \ddots & \vdots & \ddots & \vdots \\ a_1^l & a_2^l & \ldots & a_m^l & \ldots & a_q^l \\ \vdots & \vdots & \ddots & \vdots & \ddots & \vdots \\ a_1^{K-1} & a_2^{K-1} & \ldots & a_m^{K-1} & \ldots & a_q^{K-1} \end{bmatrix}^T,$$

the non-zero vector is a row vector $v=[v_1, \ldots, v_K]$ or a column vector $v=[v_1, \ldots, v_K]^T$, and the first matrix satisfies $$V_1 = V_0 \times \mathrm{diag}(v) = \begin{bmatrix} v_1 a_1^0 & v_2 a_2^0 & \ldots & v_m a_m^0 & \ldots & v_1 a_q^0 \\ v_1 a_1^1 & v_2 a_2^1 & \ldots & v_m a_m^1 & \ldots & v_2 a_q^1 \\ \vdots & \vdots & \ddots & \vdots & \ddots & \vdots \\ v_1 a_1^l & v_2 a_2^l & \ldots & v_m a_m^l & \ldots & v_m a_q^l \\ \vdots & \vdots & \ddots & \vdots & \ddots & \vdots \\ v_K a_1^{K-1} & v_K a_2^{K-1} & \ldots & v_K a_m^{K-1} & \ldots & v_K a_q^{K-1} \end{bmatrix}^T,$$

where $$\mathrm{diag}(v) = \begin{bmatrix} v_1 & 0 & \ldots & 0 \\ 0 & v_2 & \ldots & 0 \\ \vdots & \vdots & \ddots & \vdots \\ 0 & 0 & \ldots & v_K \end{bmatrix}.$$

Alternatively, the second matrix satisfies $$V_0 = \begin{bmatrix} a_1^0 & a_2^0 & \ldots & a_m^0 & \ldots & a_q^0 \\ a_1^1 & a_2^1 & \ldots & a_m^1 & \ldots & a_q^1 \\ \vdots & \vdots & \ddots & \vdots & \ddots & \vdots \\ a_1^l & a_2^l & \ldots & a_m^l & \ldots & a_q^l \\ \vdots & \vdots & \ddots & \vdots & \ddots & \vdots \\ a_1^{K-1} & a_2^{K-1} & \ldots & a_m^{K-1} & \ldots & a_q^{K-1} \end{bmatrix}^T,$$

the non-zero vector is a row vector $v=[v_1, \ldots, v_q]$ or a column vector $v=[v_1, \ldots, v_q]^T$, and the first matrix satisfies $$V_1 = V_0 \times \mathrm{diag}(v) = \begin{bmatrix} v_1 a_1^0 & v_2 a_2^0 & \ldots & v_m a_m^0 & \ldots & v_q a_q^0 \\ v_1 a_1^1 & v_2 a_2^1 & \ldots & v_m a_m^1 & \ldots & v_q a_q^1 \\ \vdots & \vdots & \ddots & \vdots & \ddots & \vdots \\ v_1 a_1^l & v_2 a_2^l & \ldots & v_m a_m^l & \ldots & v_q a_q^l \\ \vdots & \vdots & \ddots & \vdots & \ddots & \vdots \\ v_1 a_1^{K-1} & v_2 a_2^{K-1} & \ldots & v_m a_m^{K-1} & \ldots & v_q a_q^{K-1} \end{bmatrix}^T,$$

where $$\mathrm{diag}(v) = \begin{bmatrix} v_1 & 0 & \ldots & 0 \\ 0 & v_2 & \ldots & 0 \\ \vdots & \vdots & \ddots & \vdots \\ 0 & 0 & \ldots & v_q \end{bmatrix}.$$

K is a quantity of original data packets corresponding to the first network coding or decoding, q is a field size of a finite field minus 1, $a_m$ is an element in the finite field, $1 \leq m \leq q$, $a_1, a_2, \ldots, a_m, \ldots, a_q$ are different elements in the finite field, $a_m^l$ is $a_m$ raised to the power of l, $0 \leq l \leq K-1$, and diag(v) is a diagonal matrix corresponding to v. In this way, the third codebook may come from an extended Vandermonde matrix of a Vandermonde matrix corresponding to the second codebook, so that a linear independence feature can be maintained between a codeword in the third codebook and a codeword in the second codebook as much as possible. More valid redundant packets or check packets can be generated than those generated in a manner in which network coding is performed based on only the second codebook, and flexible code rates or code lengths can be supported; or flexible block lengths can be supported, or more original data packets can be efficiently encoded, to improve coding or decoding performance, thereby further improving system spectral efficiency or improving system reliability.

Alternatively, in still another possible design solution, that the first matrix and the second matrix satisfy a functional relationship may include: the first matrix is a matrix obtained after elementary transformation is performed on the second matrix, and the elementary transformation includes one or more of elementary row transformation, elementary column transformation, row-change transformation, or column-change transformation. In this way, the third codebook comes from an elementary transformation matrix of a matrix corresponding to the second codebook, so that a linear independence feature can be maintained between a codeword in the third codebook and a codeword in the second codebook as much as possible. More valid redundant packets or check packets can be generated than those generated in a manner in which network coding is performed based on only the second codebook, and flexible code rates or code lengths can be supported; or flexible block lengths can be supported, or more original data packets can be efficiently encoded, to improve coding or decoding performance, thereby further improving system spectral efficiency or improving system reliability. In addition, a transformation operation may be further performed on the first matrix and the second matrix based on an inverse matrix. With the inverse matrix, a codeword in the third codebook and a codeword in the second codebook may be as linearly independent as possible. In this case, the elementary transformation may further include a non-zero number multiplied by a row or a column of the matrix.

For example, the second matrix satisfies $$V_0 = \begin{bmatrix} a_1^0 & a_2^0 & \cdots & a_m^0 & \cdots & a_q^0 \\ a_1^1 & a_2^1 & \cdots & a_m^1 & \cdots & a_q^1 \\ \vdots & \vdots & \ddots & \vdots & \ddots & \vdots \\ a_1^l & a_2^l & \cdots & a_m^l & \cdots & a_q^l \\ \vdots & \vdots & \ddots & \vdots & \ddots & \vdots \\ a_1^{K-1} & a_2^{K-1} & \cdots & a_m^{K-1} & \cdots & a_q^{K-1} \end{bmatrix},$$

and the first matrix is a row transformation matrix of the second matrix; or the second matrix satisfies $$V_0 = \begin{bmatrix} a_1^0 & a_2^0 & \cdots & a_m^0 & \cdots & a_q^0 \\ a_1^1 & a_2^1 & \cdots & a_m^1 & \cdots & a_q^1 \\ \vdots & \vdots & \ddots & \vdots & \ddots & \vdots \\ a_1^l & a_2^l & \cdots & a_m^l & \cdots & a_q^l \\ \vdots & \vdots & \ddots & \vdots & \ddots & \vdots \\ a_1^{K-1} & a_2^{K-1} & \cdots & a_m^{K-1} & \cdots & a_q^{K-1} \end{bmatrix}^T,$$

and the first matrix is a column transformation matrix of the second matrix. K is a quantity of original data packets corresponding to the first network coding or decoding, q is a field size of a finite field minus 1, $a_m$ is an element in the finite field, $1 \le m \le q$, $a_1, a_2, \ldots, a_m, \ldots, a_q$ are different elements in the finite field, $a_m^l$ is $a_m$ raised to the power of l, and $0 \le l \le K-1$.

For Manner 4, that a field size of a finite field corresponding to the first matrix is greater than a field size of a finite field corresponding to the second matrix may include: the second matrix satisfies $$V_0 = \begin{bmatrix} a_1^0 & a_2^0 & \cdots & a_{q_2}^0 \\ a_1^1 & a_2^1 & \cdots & a_{q_2}^1 \\ \vdots & \vdots & \ddots & \vdots \\ a_1^{K-1} & a_2^{K-1} & \cdots & a_{q_2}^{K-1} \end{bmatrix},$$

the first matrix satisfies $$V_1 = \begin{bmatrix} c_1^0 & c_2^0 & \cdots & c_{q_1}^0 \\ c_1^1 & c_2^1 & \cdots & c_{q_1}^1 \\ \vdots & \vdots & \ddots & \vdots \\ c_1^{K-1} & c_2^{K-1} & \cdots & c_{q_1}^{K-1} \end{bmatrix},$$

and a field size $Q_1$ of a finite field in which $[c_1, c_2, \ldots, c_{q_1}]^T$ is located is greater than a field size $Q_2$ of a finite field in which $[a_1, a_2, \ldots, a_{q_2}]^T$ is located. Alternatively, the second matrix satisfies $$V_0 = \begin{bmatrix} a_1^0 & a_2^0 & \cdots & a_{q_2}^0 \\ a_1^1 & a_2^1 & \cdots & a_{q_2}^1 \\ \vdots & \vdots & \ddots & \vdots \\ a_1^{K-1} & a_2^{K-1} & \cdots & a_{q_2}^{K-1} \end{bmatrix}^T,$$

the first matrix satisfies $$V_1 = \begin{bmatrix} c_1^0 & c_2^0 & \cdots & c_{q_1}^0 \\ c_1^1 & c_2^1 & \cdots & c_{q_1}^1 \\ \vdots & \vdots & \ddots & \vdots \\ c_1^{K-1} & c_2^{K-1} & \cdots & c_{q_1}^{K-1} \end{bmatrix}^T,$$

and a field size $Q_1$ of a finite field in which $[c_1, c_2, \ldots, c_{q_1}]^T$ is located is greater than a field size $Q_2$ of a finite field in which $[a_1, a_2, \ldots, a_{q_2}]^T$ is located. K is a quantity of original data packets corresponding to the first network coding or decoding, $q_1=Q_1-1$, $q_2=Q_2-1$, $a_1, a_2, \ldots, a_{q_2}$ are different elements in the finite field whose field size is $Q_2$, and $c_1, c_2, \ldots, c_{q_1}$ are different elements in the finite field whose field size is $Q_1$. In this way, the third codebook and the second codebook correspond to different finite fields, and the codebooks are extended in a number field dimension. More valid redundant packets or check packets can be generated than those generated in a manner in which network coding is performed based on only the second codebook, and flexible code rates or code lengths can be supported; or flexible block lengths can be supported, or more original data packets can be efficiently encoded, to improve coding or decoding performance, thereby further improving system spectral efficiency or improving system reliability.

For example, the codeword in the second codebook may be one or more of the following: a Reed-Solomon code (RS), a maximum distance separable (MDS) code, a low density parity check code (LDPC), and a Bose-Chaudhuri-Hocquenghem (BCH) code. In this way, the codeword having a structural characteristic may be extended to design a third codebook that is as linearly independent as possible of the codeword. More valid redundant packets or check packets can be generated than those generated in a manner in which network coding is performed based on only the second codebook, and flexible code rates or code lengths can be supported; or flexible block lengths can be supported, or more original data packets can be efficiently encoded, to improve coding or decoding performance, thereby further improving system spectral efficiency or improving system reliability.

It should be noted that the data processing method according to the first aspect is applicable to both block code-based network coding or decoding and convolutional code-based network coding or decoding.

In addition, for a convolutional code with a variable convolutional coding depth, an embodiment of this application further provides another data processing method. For details, refer to the data processing method according to the following second aspect.

According to a second aspect, a data processing method is provided. The method may be performed by a transmitter device (for example, a terminal device or a network device), or may be performed by a component of the transmitter device, for example, a processor, a chip, or a chip system of the transmitter device. Alternatively, the method may be performed by a receiver device (for example, a terminal device or a network device), or may be performed by a component of the receiver device, for example, a processor, a chip, or a chip system of the receiver device. The method includes: obtaining a coding coefficient based on a fourth codebook, and performing network coding or decoding on a plurality of groups of original data packets in a network coding sliding window based on the coding coefficient. The coding coefficient includes a plurality of groups of elements, the plurality of groups of elements are in a one-to-one correspondence with a plurality of groups of original data packets, any group of elements in the plurality of groups of elements come from one codeword in the fourth codebook, and any two groups of elements come from different codewords in the fourth codebook.

Based on the data processing method according to the second aspect, a plurality of groups of elements that are in a one-to-one correspondence with a plurality of groups of original data packets in a network coding sliding window may be obtained based on a codebook of a limited size, and all to-be-transmitted data packets in the network coding sliding window are encoded or decoded together by using a coding coefficient obtained after the plurality of groups of elements are combined, so that flexible block lengths are supported and more original data packets can be encoded. In addition, any two groups in the plurality of groups of elements come from different codewords in a fourth codebook, so that in different network coding sliding windows, coding coefficients corresponding to a same group of data packets come from different codewords in the fourth codebook. In this way, a redundant packet or a check packet generated for the same group of data packets is valid, to improve coding or decoding performance, thereby improving system spectral efficiency or improving system reliability.

The fourth codebook may be one or more of the first codebook, the second codebook, or the third codebook in the first aspect, or may be a codebook obtained in another manner. This is not limited in this embodiment of this application.

Optionally, a length of any codeword in the fourth codebook is less than a total quantity of data packets in the plurality of groups of original data packets, and is greater than or equal to a quantity of data packets in any group of data packets in the plurality of groups of original data packets.

In a possible design solution, in different network coding sliding windows, coding coefficients corresponding to a same group of data packets are different. In this way, flexible block lengths can be supported, or more original data packets can be efficiently encoded, to improve coding or decoding performance, thereby improving system spectral efficiency or improving system reliability.

In a possible design solution, in different network coding sliding windows, network coding or decoding is performed on a same group of data packets by using different redundant versions. In this way, flexible block lengths can be supported, or more original data packets can be efficiently encoded, to improve coding or decoding performance, thereby improving system spectral efficiency or improving system reliability.

According to a third aspect, a data processing apparatus is provided. The apparatus is configured to perform the data processing method according to any one of the first aspect or the second aspect or the possible implementations of the first aspect or the second aspect.

It should be understood that the data processing apparatus according to the third aspect includes a corresponding module, unit, or means for implementing the data processing method according to any one of the first aspect or the second aspect or the possible implementations of the first aspect or the second aspect. The module, unit, or means may be implemented by hardware, software, or hardware executing corresponding software. The hardware or software includes one or more modules or units configured to perform functions related to the foregoing data processing methods. For example, a module configured to perform a coding or decoding function in the foregoing data processing methods may be a coder or a decoder, or a codec. The coder or the decoder, or the codec may be implemented by using a circuit, for example, implemented by using a digital circuit.

According to a fourth aspect, a data processing apparatus is provided. The apparatus includes a processor. The processor is configured to perform the data processing method according to any one of the first aspect or the second aspect or the possible implementations of the first aspect or the second aspect.

In a possible design solution, the data processing apparatus according to the fourth aspect may further include an interface circuit or a transceiver. The transceiver may be a transceiver circuit or an interface circuit. The interface circuit or the transceiver may be used for communication between the data processing apparatus according to the fourth aspect and another apparatus or module.

In a possible design solution, the data processing apparatus according to the fourth aspect may further include a memory. The memory and the processor may be integrated together, or may be disposed separately. The memory may be configured to store a computer program and/or data related to the coding or decoding method according to any one of the first aspect or the second aspect or the possible implementations of the first aspect or the second aspect.

According to a fifth aspect, a data processing apparatus is provided. The apparatus includes a processor. The processor is coupled to a memory, and the processor is configured to execute a computer program stored in the memory, to enable the apparatus to perform the data processing method according to any one of the first aspect or the second aspect or the possible implementations of the first aspect or the second aspect.

In a possible design solution, the data processing apparatus according to the fifth aspect may further include an interface circuit or a transceiver. The interface circuit or the transceiver may be used for communication between the data processing apparatus according to the fifth aspect and another apparatus. The interface circuit or the transceiver is configured to connect to the processor, and interact with another apparatus other than the apparatus.

In this application, the data processing apparatus according to any one of the third aspect to the fifth aspect or the possible implementations of the third aspect to the fifth aspect may be the transmitter device or the receiver device according to any one of the first aspect or the second aspect or the possible implementations of the first aspect or the second aspect. The transmitter device and the receiver device each may be a terminal device or a network device, or may be a chip (system) or another component or component that may be disposed in the terminal device or the network device, or may be an apparatus including the terminal device or the network device.

In addition, for technical effects of the data processing apparatus according to any one of the third aspect to the fifth aspect or the possible implementations of the third aspect to the fifth aspect, refer to technical effects of the data processing method according to any one of the first aspect or the second aspect or the possible implementations of the first aspect or the second aspect.

According to a sixth aspect, an embodiment of this application provides a chip, including a processor. The processor is coupled to a memory. The memory is configured to store a program or an instruction. When the program or the instruction is executed by the processor, the chip is enabled to implement the data processing method according to any one of the first aspect or the possible implementations of the second aspect.

According to a seventh aspect, a communication system is provided. The communication system includes a transmitter device and a receiver device.

According to an eighth aspect, a computer-readable storage medium is provided, including a computer program or instructions. When the computer program or the instructions are run on a computer, the computer is enabled to perform the data processing method according to any one of the first aspect or the second aspect or the possible implementations of the first aspect or the second aspect.

According to a ninth aspect, a computer program product is provided, including a computer program or instructions. When the computer program or the instructions are run on a computer, the computer is enabled to perform the data processing method according to any one of the first aspect or the second aspect or the possible implementations of the first aspect or the second aspect.

DESCRIPTION OF EMBODIMENTS

Figure 1A:
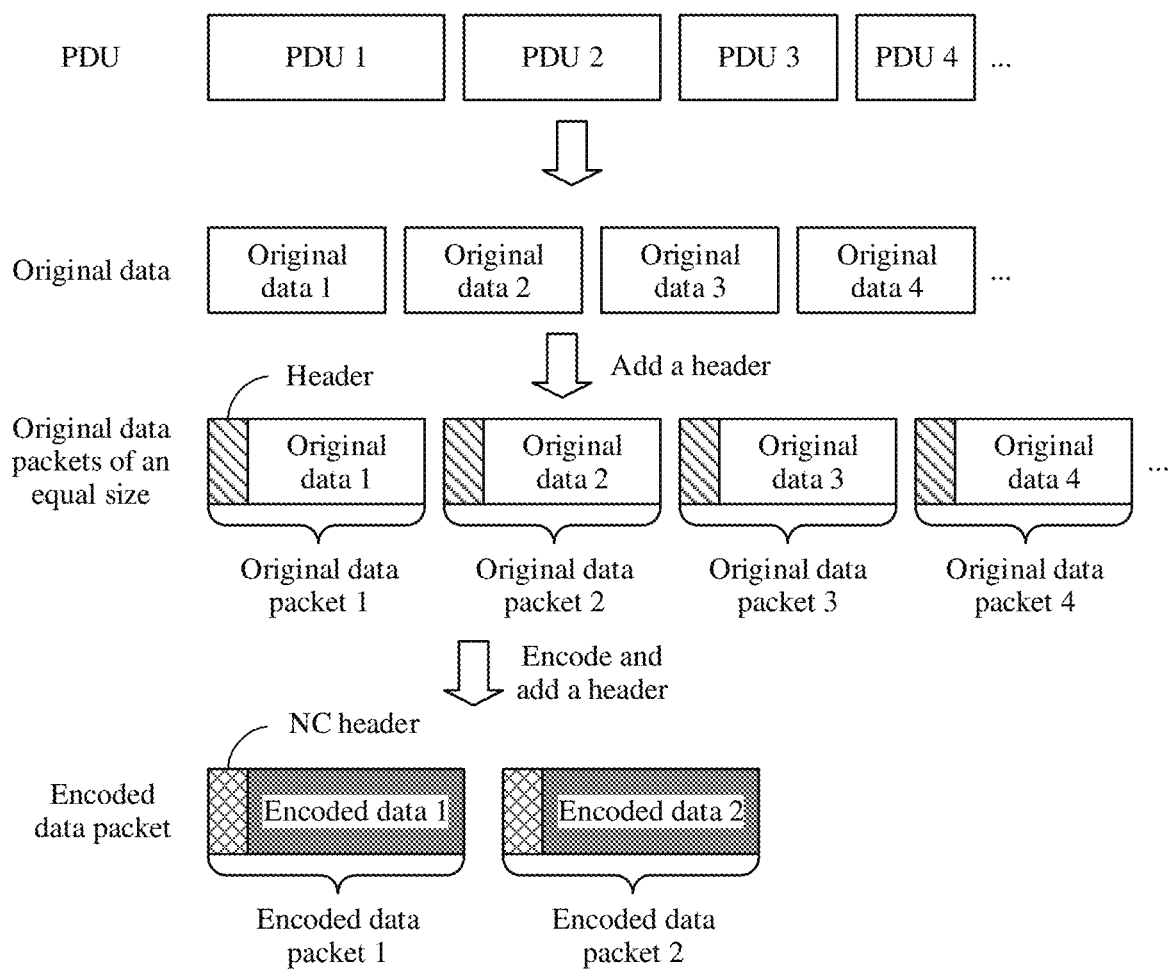
FIG. 1A is a schematic diagram 1 of an example network coding procedure according to an embodiment of this application.

For ease of understanding technical solutions in embodiments of this application, the following first briefly describes technologies or terms related to this application.

Network coding (NC): A network coding function in this application includes performing network coding on an original data packet and adding a packet header of an encoded data packet. The network coding may be implemented by using a coder. An input of the coder is K original data packets, and an output of the coder is N encoded data packets (referred to as encoded packets), where both N and K are positive integers, and N>K. The encoded data packets include N-K redundant packets and K system packets, or N redundant packets (that is, the encoded data packets are all redundant packets and do not include system packets). Content of a system packet is the same as that of an original data packet. The system packet can be generated without encoding. For example, the system packet can be obtained by directly adding a packet header to the original data packet. Therefore, it may be considered that an equivalent coding coefficient of the system packet is a unit vector. A redundant packet is also referred to as a check packet. A coding coefficient of the redundant packet is a non-unit vector. The content of the redundant packet is associated with the content of the original data packet based on which the redundant packet is generated, so that the receiver can decode the redundant packet and the original data packet or system packet that is successfully received, and restore the original data packet that is not successfully received. In another possible implementation, a packet header may be first added to the original data packet, and then network coding is performed and a packet header of the encoded packet is added, to obtain the check packet. In this application, a data packet obtained by adding a packet header to an original data packet before network coding is also referred to as a system packet. Based on characteristics of network coding, the original data packets have an equal size. Further, the network coding function may further include a process of processing original data units, for example, service data units (SDUs) or a protocol data units (PDUs), to obtain original data packets of an equal size. The processing may include one or more of segmentation, concatenation, or padding. The network coding function of the transmitter corresponds to the network decoding function of the receiver. The receiver may restore K original data packets by decoding the at least K successfully received encoded data packets together. A protocol layer having a network coding function or a decoding function corresponding to network coding is referred to as a network coding or decoding layer. In this application, the network coding or decoding layer is referred to as a network coding layer, that is, the foregoing protocol layer having a network coding or decoding function is referred to as a network coding layer.

The network coding layer may be a protocol layer such as a radio resource control (RRC) layer, a packet data convergence layer protocol (PDCP) layer, a backhaul adaptation protocol (BAP) layer, a radio link control (RLC) layer, a medium access control (MAC) layer, or a physical layer (PHY). The network coding layer may also be a new protocol layer other than the MAC layer, the RLC layer, the BAP layer, and the PDCP layer, and may be a network coding layer added above the PDCP layer, or a network coding layer added above the BAP layer, or a network coding layer added between the PDCP layer and the RLC layer, or a network coding layer added between the RLC layer and the MAC layer, or a network coding layer added between the MAC layer and the PHY layer. A location of the new protocol layer may not be limited in this application. In embodiments of this application, the term "network coding layer" may also be referred to as a "coding and decoding layer", "coding or decoding layer", "network coding/decoding layer", "network coding and decoding layer", or another name. This is not limited in this application.

Common network coding schemes fall into two types: a scheme based on block codes and a scheme based on convolutional codes. The scheme based on block codes includes one or more of the following: random linear network coding (RLNC), deterministic linear network coding (DLNC), batch sparse code (BATS code), erasure code, fountain code, maximum distance separable code (MDS code), LT (Luby Transform) code, rapid tornado code, RaptorQ code, rateless code, and RS (Reed-Solomon) code, and the like. The scheme based on convolutional codes includes one or more of the following: convolutional network coding (CNC), streaming code, sliding window network coding, and the like.

The following describes two possible network coding procedures of the network coding function of a transmitter.

The first possible network coding procedure is as follows:

First, a PDU or an SDU is obtained. A PDU is used as an example. Original data packets of an equal size are obtained by performing one or more of operations such as segmentation, concatenation, or padding on one or more PDUs. Each original data packet carries a correspondence between the original data packet and one or more PDUs corresponding to the original data packet. The correspondence may be explicitly carried, for example, a location mapping relationship between the original data packet and one or more PDUs corresponding to the original data packet is carried. Alternatively, the correspondence may be implicitly carried, for example, the correspondence between the original data packet and one or more PDUs corresponding to the original data packet is default. In this way, a receiver may restore a PDU from the original data packet based on the correspondence.

Optionally, a packet header of each original data packet carries a correspondence between the original data packet and one or more PDUs corresponding to the original data packet. In this case, a possible implementation is as follows: One or more of the foregoing operations such as segmentation, concatenation, and padding are first performed on the PDUs to obtain original data, and then a packet header is added to the original data to obtain original data packets of an equal size.

Optionally, the correspondence may be indicated by using a segmentation status and/or a concatenation status of one or more PDUs.

It may be understood that, if the PDUs or the SDUs are of an equal size, the foregoing step of obtaining original data packets of an equal size by performing one or more of operations such as segmentation, concatenation, and padding on one or more PDUs may be skipped. In other words, the PDUs or the SDUs are original data packets of an equal size.

Figure 1B:
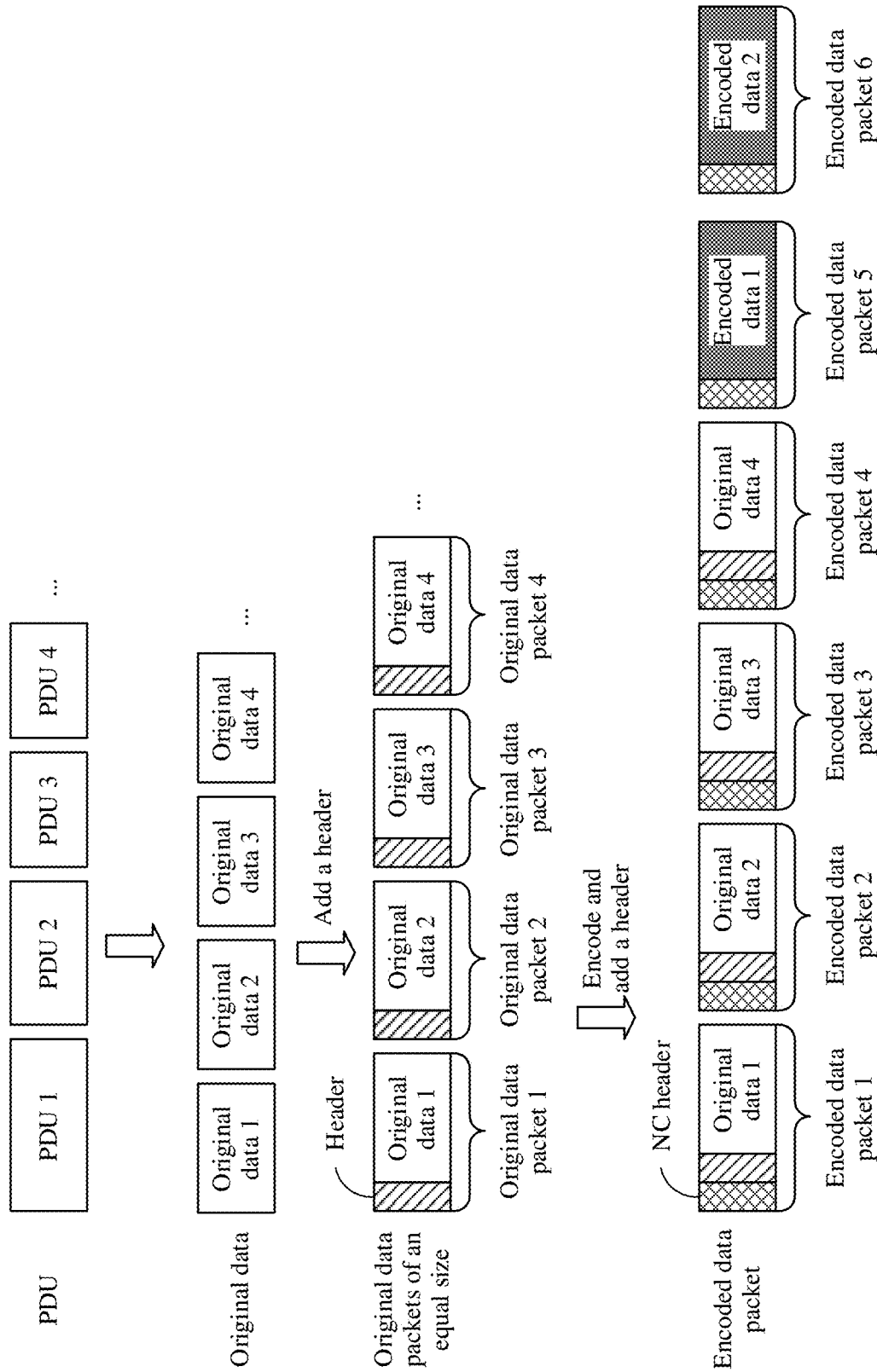
FIG. 1B is a schematic diagram 2 of an example network coding procedure according to an embodiment of this application.

In FIG. 1A and FIG. 1B, an example in which sizes of PDUs are unequal and the foregoing correspondence is carried by using a packet header is used for description. The PDU 1 to the PDU 4 are first processed to obtain original data 1 to original data 4. Herein, processing on the PDU may be one or more of operations such as segmentation, concatenation, and padding. Sizes of the original data may be equal or may be unequal. Then, an operation of adding a packet header is performed on the group of original data to obtain K original data packets, that is, an original data packet 1 to an original data packet 4 in FIG. 1A or FIG. 1B. The original data packets may be understood as data packets that are not encoded, and sizes of the original data packets are equal.

Then, a plurality of original data packets of an equal size are encoded. Specifically, there may be the following three coding schemes.

Coding Scheme 1

As shown in FIG. 1A, N-K encoded data packets may be obtained by encoding a group of K original data packets and adding a packet header of each encoded data packet. The encoded data packets herein may be referred to as check packets or redundant packets, where K is a positive integer, and N is a positive integer not less than K.

Through the foregoing operations, the transmitter finally sends K original data packets and N-K redundant packets.

A coding scheme 2 and a coding scheme 3 are shown in FIG. 1B. K original data packets are processed to obtain N encoded data packets, for example, an encoded data packet 1 to an encoded data packet 6 in FIG. 1B. The encoded data packets may be classified into system packets and check packets. The system packets may also be referred to as system data packets, and the check packets may be referred to as redundant packets. A packet header of each encoded data packet may include a coefficient factor field, and the coefficient factor field indicates that a coding coefficient used to obtain the encoded data packet. The system packets (the encoded data packet 1 to the encoded data packet 4) each includes a packet header and a payload of the encoded data packet, content of the payload is consistent with content of the original data packet, and a coefficient factor field included in the packet header is a unit vector. Therefore, a process of processing the original data packet to obtain the system packet may include two coding schemes: a coding scheme 2 and a coding scheme 3, where K is a positive integer, and N is a positive integer not less than K.

In the coding scheme 2, the system packet is generated by directly adding the packet header of the encoded data packet to the original data packet, that is, no coding processing is performed.

In the coding scheme 3, the system packet is generated by performing coding processing on the original data packet by using a coefficient factor that is a unit vector, and then adding a packet header of the encoded data packet.

A manner of generating a check packet in the coding scheme 2 is the same as that in the coding scheme 3: encoding an original data packet, and adding the packet header of the encoded data packet. As shown in FIG. 1B, N-K check packets (for example, an encoded data packet 5 to an encoded data packet 6) are generated by encoding K original data packets (for example, the original data packet 1 to the original data packet 4) and adding packet headers of the encoded data packets. Payloads (encoded data 1 to encoded data 2) of the check packets are results of multiplying the K original data packets by a coefficient factor and then adding up the K results, where the coefficient factor is a non-unit vector.

Through the foregoing operations, the transmitter finally sends the N encoded data packets.

Correspondingly, FIG. 1A is still used as an example. For the receiver, in the coding scheme 1, the receiver receives at least K data packets, and the K data packets are linearly independent, that is, a rank of a corresponding coefficient matrix is equal to K. In this way, the receiver may restore K original data packets through decoding, and then restore corresponding PDUs. All of the at least K data packets may be redundant packets; or some of the at least K data packets are original data packets, and some of the at least K data packets are redundant packets. This is not limited herein. It may be understood that, if the receiver receives K original data packets, decoding may not be performed.

In the coding scheme 2 and the coding scheme 3, FIG. 1B is still used as an example, and the receiver needs to receive at least K data packets, and the K data packets are linearly independent, that is, a rank of a corresponding coefficient matrix is equal to K. In this way, the receiver restores K original data packets through decoding, and then restores corresponding PDUs. All of the at least K data packets may be redundant packets; or some of the at least K data packets are system packets, and some of the at least K data packets are redundant packets. This is not limited herein. It may be understood that, if the receiver receives K system packets, the receiver may not perform decoding, but simply remove the packet headers of the encoded data packets.

In the foregoing network coding function, original data packets of an equal size are obtained by performing one or more of operations such as segmentation, concatenation, or padding on one or more PDUs/SDUs, where each original data packet carries a correspondence between the original data packet and one or more PDUs/SDUs corresponding to the original data packet.

The second possible network coding procedure is as follows:

In the second possible network coding procedure, original data packets of an equal size may be obtained by performing one or more of the following operations: virtual segmentation/concatenation and padding. In this manner, each PDU/SDU and header information of the PDU/SDU are first mapped to a buffer. The buffer may be a real (physical) buffer or a virtual buffer. The header information of each PDU/SDU indicates a location to which the PDU/SDU is mapped in the buffer. Then, a plurality of original data packets of an equal size are obtained from the buffer. In this way, a plurality of original data packets of an equal size are encoded to obtain encoded data packets. A manner of obtaining the plurality of original data packets of an equal size from the buffer may be preset, or indicated by the transmitter to the receiver, or determined by one controlling party in both parties in data transmission and then indicated by the controlling party to the other party. In this virtual manner, the original data packet does not include a packet header. However, in consideration of consistence with the description in the first manner, data segments of an equal size obtained from the buffer in this solution are still referred to as original data packets. It may be understood that the original data packet in this solution may also be referred to as an original data segment.

A manner of encoding the plurality of original data packets of an equal size to obtain the encoded data packet is similar to Manner 1 in the first possible network coding procedure, and a difference from Manner 1 lies in that after encoding is performed, the transmitter sends one or more PDUs/SDUs and header information of the one or more PDUs/SDUs, and one or more redundant packets obtained through encoding.

It may be understood that an input of the network coding layer may be one or more original data units, for example, one or more SDUs or PDUs, and an output of the network coding layer may be one or more PDUs. The one or more PDUs may include the foregoing original data packets and the foregoing redundant packets, or the foregoing system packets and the foregoing redundant packets. The outputting the one or more PDUs may be understood as outputting, by using a communication interface, the one or more PDUs in a terminal device or a network device to a module that subsequently processes the one or more PDUs. It may be understood that output in this application means to send a signal or data over an air interface, or output, in an apparatus (for example, a terminal device or a network device), a signal or data to another module in the apparatus through a communication interface. A specific process is described in detail in an application scenario.

A system packet is obtained by adding an encoded packet header to encoded data generated by multiplying an original data packet by using a coding coefficient that is a unit vector, or by directly adding an encoded packet header to an original data packet. For example, network coding is performed on an original data packet by using a coding coefficient matrix with a size of N×K (that is, $A^{N \times K}$ in FIG. 1C) to obtain N encoded data packets, where the coding coefficient matrix may be written as $$\begin{bmatrix} I_K \\ G_{(N-K) \times K} \end{bmatrix},$$

where a submatrix $I_K$ formed by the first K rows is a unit matrix and is formed by K unit vectors, K pieces of encoded data corresponding to a $I_K$ part in the obtained N encoded data are data parts of K system packets, and the system packets are obtained by adding packet header information to the encoded data.

A redundant packet is generated by performing network coding on an original data packet. A coding coefficient of the redundant packet is a non-unit vector. For example, a coding coefficient matrix with a size of N×K (that is, $A^{N \times K}$ in FIG. 1C) is used to perform network coding to obtain N pieces of encoded data, where the coding coefficient matrix may be written as $$\begin{bmatrix} I_K \\ G_{(N-K) \times K} \end{bmatrix},$$

N-K pieces of encoded data corresponding to a $G_{(N-K) \times K}$ part of the N pieces of encoded data are data parts of N-K redundant encoded packets, and the redundant packets are obtained by adding packet header information to the N-K pieces of encoded data. In embodiments of this application, the term "redundant packet" may also be referred to as "check packet", and the two terms may be used interchangeably.

Network coding block: a term related to a block code. In a block code, a network coding block is a set including a plurality of original data packets. For example, every K original data packets are grouped into one network coding block for independent network coding, so that encoded data corresponding to the network coding block may be obtained. In embodiments of this application, the term "network coding block" may also be referred to as "coding block".

Network coding window: The network coding window is a term used for a network coding scheme or convolutional coding that includes a sliding window. The network coding window is a set including a plurality of original data packets, and some of the original data packets included in different network coding windows may be the same. For example, for E original data packets, K original data packets are obtained in a sliding window manner, where both E and K are positive integers and E is not less than K, and are used as a current network coding window; network coding is performed on K original data packets in the network coding window to obtain encoded data corresponding to the network coding window; and the network coding window is slid to obtain another group of original data packets as to-be-encoded data packets. It should be noted that the size of the network coding window may be different before and after the sliding, where the size of the network coding window is the quantity of original data packets included in the network coding window; and some of the original data packets included before and after the network coding window is slid may be the same. In embodiments of this application, the term "network coding window" may also be referred to as "network coding sliding window", "coding window", or "sliding window".

Network coding depth: The network coding window is a term used for a network coding scheme or convolutional code that includes a sliding window, while the network coding depth is a quantity of original data packets encoded in the network coding window, or a size of the network coding window. For example, for E original data packets, K original data packets are obtained in a sliding window manner, where both E and K are positive integers and E is not less than K, and are used as a current network coding window; and network coding is performed on K original data packets in the network coding window to obtain encoded data corresponding to the network coding window. In this case, a current network coding depth is K. In embodiments of this application, the term "network coding depth" may also be referred to as "network coding convolution depth", "coding depth", "convolution depth", "sliding window size", "window size", or the like.

Network coding convolution depth: same as the "network coding depth".

Network coding sliding window: same as the "network coding window".

A finite field is also referred to as a Galois field, and is a field that includes only a limited quantity of elements. In the finite field, addition, subtraction, multiplication, and division operations may be performed, and a result of the addition, subtraction, multiplication, and division operations does not exceed a range of the field.

For a network decoding status corresponding to network coding, the decoding status indicates a success rate and/or a failure rate of decoding corresponding to a network coding block or a network coding sliding window in a time period. If all original data packets in the network coding block or the network coding sliding window are decoded successfully, the network coding block or the network coding sliding window is decoded successfully; otherwise, the network coding block or the network coding sliding window is decoded unsuccessfully. The success rate is a proportion of network coding blocks successfully decoded in a time period in all network coding blocks, or a proportion of network coding sliding windows successfully decoded in a time period in all network coding sliding windows. The failure rate is a ratio of network coding blocks that fail to be decoded in a time period in all network coding blocks, or a proportion of network coding sliding window that fails to be decoded in a time period in all network coding sliding windows.

Packet loss rate: The packet loss rate is a ratio of a quantity of data packets that are not successfully received to a total quantity of data packets. For a network coding scheme, the packet loss rate may also refer to a ratio of a quantity of original data packets that are not successfully received or that are not successfully decoded to a total quantity of original data packets. The total quantity of data packets or original data packets are a total quantity of data packets or original data packets that are sent or to be received.

Network coding code rate: The network coding code rate is a ratio of the quantity of original data packets to the quantity of encoded data packets; or the network coding code rate is a ratio of the quantity of original data packets newly participating in coding in the current coding window to the total quantity of data packets corresponding to the current coding window, or a ratio of the quantity of original data packets included in the current network coding window to the quantity of encoded data packets corresponding to the current network coding window. The quantity of original data packets newly participating in coding is a quantity of original data packets included after the sliding window is slid minus a quantity of original data packets that are the same as those included before the sliding window is slid. The quantity of encoded data packets is a sum of a quantity of system packets and a quantity of redundant packets, or is a quantity of redundant packets.

Codebook: A codebook is a set of coding coefficient vectors used for network coding or decoding. The term "codebook" may also be referred to as "a set of coding coefficient vectors".

Random linear network coding RLNC: Due to limitations of a transmission delay of an air interface, a data processing delay of a receiver, and feedback timing, a delay of a feedback-based retransmission mechanism is high. For example, round-trip time (RTT) of uplink HARQ processing for one time in a frequency-division duplex (FDD) system is eight transmission time intervals (TTIs). In blind retransmission, retransmission does not need to be performed based on feedback information. Although a delay can be reduced, a resource is occupied for retransmission regardless of whether initially transmitted data is correct. Consequently, spectral efficiency is low.

Figures 1C, 1D:
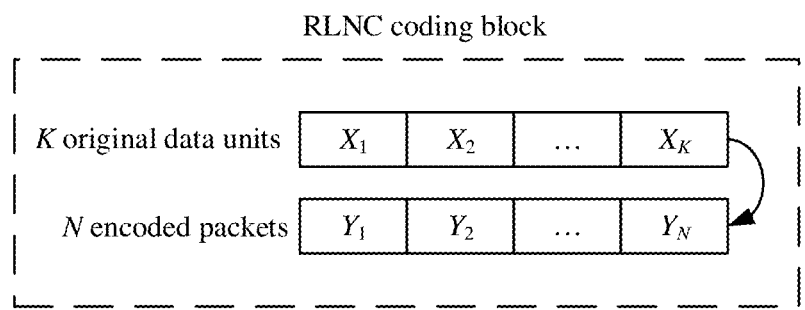
FIG. 1C is a schematic diagram 3 of an example network coding procedure according to an embodiment of this application.
FIG. 1D is a schematic diagram 4 of an example network coding procedure according to an embodiment of this application.

The RLNC technology provides a transmission mechanism for balancing a delay and spectral efficiency. FIG. 1D shows a basic principle of RLNC-based network coding.

A transmitter divides to-be-sent data packets into a plurality of RLNC coding blocks, where each RLNC coding block includes K original data units, which are respectively represented by $X_1, X_2, \ldots, X_K$. Then, the K original data units are encoded to obtain N (N≥K) encoded data packets. For example, the N encoded data packets may satisfy a formula $Y_i = \Sigma_{k=1}^{K} g_{i,k} \times X_k$. The N encoded data packets may be represented by $Y_1, Y_2, \ldots, Y_N$, where $Y_i$ represents an $i^{th}$ encoded data packet, $X_k$ represents a $k^{th}$ original data unit, $g_{i,k}$ represents a random coefficient of the $k^{th}$ original data unit in the $i^{th}$ encoded data packet, and $g_{i,k}$ may be randomly selected from a finite field or a GF field. The GF field is a field including a limited quantity of elements, and a GF field including Q elements may be represented by GF(Q). In addition, a header of each encoded data packet $Y_i$ carries a coding coefficient vector used to generate the encoded data packet, and a length of the coding coefficient vector is the same as the quantity K of original data units in the coding block.

The transmitter sends the N encoded data packets to the receiver for each RLNC coding block. If a quantity of encoded data packets received by the receiver is not less than a quantity of original data units in the coding block, and a rank of a matrix formed by coding coefficient vectors carried in packet headers of the received encoded data packets is a quantity of original data units (that is, the receiver receives M linearly independent encoded data packets), the receiver may obtain K original data units through decoding. For example, the receiver may construct a system of linear equations based on the coding coefficients; and in the system of linear equations, $X_k$, $k \in \{1, 2, \ldots K\}$, that is, there are K unknown numbers to be solved in the system of linear equations. Then, K original data units may be obtained through decoding according to a linear equation theory.

For example, if all the N encoded data packets $Y_1, Y_2, \ldots, Y_N$ are correctly received, the receiver may combine the received N coding coefficient vectors together to form a primary system of linear equations in K unknowns that is related to unknowns $X_1, X_2, \ldots, X_K$. A coefficient matrix of the system of equations may be shown as follows, where $[g_{i,1}, g_{i,2}, \ldots, g_{i,K}]$ is a coding coefficient vector of an $i^{th}$ encoded data packet:

$$\begin{bmatrix} g_{1,1} & g_{1,2} & \cdots & g_{1,K} \\ g_{2,1} & g_{2,2} & \cdots & g_{2,K} \\ \vdots & \vdots & \ddots & \vdots \\ g_{N,1} & g_{N,2} & \cdots & g_{N,K} \end{bmatrix}.$$

In a wireless channel environment, factors such as channel noise, fading caused by mobility, or user interference may cause errors in some encoded data packets received by the receiver. However, for a coding block, when a quantity U of correctly received encoded data packets is not less than the quantity K of original data units in the coding block, and a rank of a matrix formed by coding coefficient vectors carried in packet headers of the U encoded data packets is K, the receiver may still obtain K original data units through decoding, where U is a positive integer less than N. Therefore, in the RLNC technology, the transmitter does not need to wait for a feedback request from the receiver for retransmission, several encoded data units may be sent in advance to eliminate impact of wireless channels, so as to reduce a delay. In addition, no numerous resources need to be consumed for blind retransmission of TBs, thereby avoiding a waste of spectrum resources.

Base codebook and a method for determining a base codebook: A base codebook is a set of coding coefficients that can be used by a coder at a transmitter to generate encoded data packets. Any codeword in the base codebook includes a group of coding coefficients. An original data packet may be encoded according to the group of coding coefficients to generate an encoded data packet. For a decoder at a receiver, a coding coefficient corresponding to the encoded data packet may be obtained based on the base codebook and information indicated in the encoded data packet, so that the decoder can perform decoding to obtain the original data packet. The base codebook may be obtained in an online calculation manner, or may be directly obtained in a system storage manner.

The following describes a base codebook by using a system RS code based on a Vandermonde matrix as an example. It should be first noted that the system RS code based on the Vandermonde matrix may be represented by using a generator matrix (also referred to as a coding matrix): A generator matrix is a combination of a unit matrix and a submatrix that are transformed based on the Vandermonde matrix. In this manner, each codeword in the base codebook is each row or each column of the submatrix. Another generator matrix of the RS code of the system based on the Vandermonde matrix is directly a combination of a unit matrix and a Vandermonde matrix, and each codeword in the base codebook determined in this manner is each row or each column of the Vandermonde matrix.

Base codebook: A first method for determining a base codebook corresponding to a system RS code: A process of transforming a Vandermonde matrix into a combination of a unit matrix and a submatrix and then determining a base codebook is described in detail as follows: If a coder/decoder uses a finite field with a size of Q, that is, GF(Q) (where Q is usually $2^8$, or may be another value, which is not limited in this application), a Vandermonde matrix of the largest dimension in the finite field with the size of Q is a matrix $$\begin{bmatrix} a_1^0 & a_2^0 & \cdots & a_q^0 \\ a_1^1 & a_2^1 & \cdots & a_q^1 \\ \vdots & \vdots & \ddots & \vdots \\ a_1^{q-1} & a_2^{q-1} & \cdots & a_q^{q-1} \end{bmatrix}$$

with q rows and q columns (q=Q−1) (for example, a Vandermonde matrix with the largest GF($2^8$) is $$\begin{bmatrix} a_1^0 & a_2^0 & \cdots & a_{255}^0 \\ a_1^1 & a_2^1 & \cdots & a_{255}^1 \\ \vdots & \vdots & \ddots & \vdots \\ a_1^{254} & a_2^{254} & \cdots & a_{255}^{254} \end{bmatrix}),$$

where $[a_1, a_2, \ldots, a_q]$ are obtained from GF(Q) and are different from each other, and a Vandermonde matrix $$V_0 = \begin{bmatrix} a_1^0 & a_2^0 & \ldots & a_q^0 \\ a_1^1 & a_2^1 & \ldots & a_q^1 \\ \vdots & \vdots & \ddots & \vdots \\ a_1^{K-1} & a_2^{K-1} & \ldots & a_q^{K-1} \end{bmatrix}$$

of K rows is determined based on a quantity K of original data packets and a group of parameters $[a_1, a_2, \ldots, a_q]$. $V_0$ may be represented in a form of $V_0=[A_0|B_0]$, where $A_0$ is a submatrix with K rows and K columns in $V_0$, and $B_0$ is a submatrix with K rows and (q−K) columns in $V_0$. Therefore, a combination of a unit matrix and a submatrix may be obtained by using an inverse matrix $A_0^{-1}$ of $A_0$ to transform $V_0$, that is, $A_0^{-1}$ may be left-multiplied by $V_0$ to obtain a generator matrix $A_0^{-1}V_0=[I|A_0^{-1}B_0]=[I|G_0]$ of a system RS code, where a unit matrix I of $A_0^{-1}$ dimensions corresponds to a coding coefficient of a system packet, a matrix $G_0=A_0^{-1}B_0=[G_{0,0}\ G_{0,1}\ \ldots\ G_{0,q-K-1}]$ with K rows and (q−K) columns corresponds to a coding coefficient of an encoded data packet, and a row vector formed by the K original data packets may be left-multiplied by $G_0$ to generate (q−K) encoded data packets. Therefore, the (q−K) column coding coefficient vectors may be used as (q−K) codewords to form the base codebook.

Similarly, a Vandermonde matrix $$V_0 = \begin{bmatrix} a_1^0 & a_1^1 & \ldots & a_1^{K-1} \\ a_2^0 & a_2^1 & \ldots & a_2^{K-1} \\ \vdots & \vdots & \ddots & \vdots \\ a_q^0 & a_q^1 & \ldots & a_q^{K-1} \end{bmatrix}$$

with K columns may also be determined based on a quantity K of original data packets and a group of parameters $[a_1, a_2, \ldots, a_q]$. $V_0$ may be represented in a form of $$V_0 = \begin{bmatrix} A_0 \\ B_0 \end{bmatrix},$$

where $A_0$ is a submatrix with K rows and K columns in $V_0$, and $B_0$ is a submatrix with (q−K) rows and K columns in $V_0$. Therefore, a combination of a unit matrix and a submatrix may be obtained by using an inverse matrix $A_0^{-1}$ of $A_0$ to transform $V_0$, that is, $V_0$ may be left-multiplied by $A_0^{-1}$ to obtain a generator matrix $$V_0 A_0^{-1} = \begin{bmatrix} I \\ B_0 A_0^{-1} \end{bmatrix} = \begin{bmatrix} I \\ G_0 \end{bmatrix}$$

of a system RS code, where a unit matrix I of K×K dimensions corresponds to a coding coefficient of a system packet, and a matrix $G_0=B_0A_0^{-1}=[G_{0,0}\ G_{0,1}\ \ldots\ G_{0,q-K-1}]^T$ with (q−K) rows and K columns corresponds to a coding coefficient of an encoded data packet, and $G_0$ may be left-multiplied by a column vector formed by the original data packets to generate (q−K) encoded data packets. Therefore, the (q−K) row coding coefficients may be used as (q−K) codewords to form the base codebook.

Therefore, based on the first method for determining the base codebook corresponding to the system RS code, the base codebook may be determined based on the quantity K of original data packets and a group of parameters $[a_1, a_2, \ldots, a_q]$, that is, the base codebook is obtained in an online manner. Alternatively, the base codebook may be directly obtained in a system storage manner, and the base codebook may be represented in a form of a table, for example, as shown in Table 1.

As shown in Table 1, a coefficient vector $[g_{0,1}\ g_{0,2} \ldots g_{0,K}]_{K\times 1}^T$ corresponding to an index of 0 may be a column vector $G_{0,0}$ in a matrix $G_0$ with K rows and (q−K) columns, and by analogy, $[g_{r,1}\ g_{r,2} \ldots g_{r,K}]_{K\times 1}^T$ is $G_{0,r}$ in a matrix $G_0$ with K rows and (q−K) columns, or a relationship between an index and a coding coefficient is transformed, that is, positions of codewords are exchanged; or a serial number or an identifier of the codeword may be represented in another manner; or codewords in a base codebook table are some of codewords in $\{G_{0,0}\ G_{0,1}\ \ldots\ G_{0,q-K-1}\}$; or the codewords are presented in a form of row vectors other than in a form of column vectors $[\cdot]^T$ in Table 1; or the coding coefficients in the base codebook table may not be determined based on $G_0$, for example, the coding coefficients are determined based on a Cauchy matrix. This is not limited in this application. r is a natural number, and $0 \leq r \leq q-K-1$.

TABLE 1

| Index | Coefficient vector |
|---|---|
| 0 | $[g_{0,1}\ g_{0,2} \ldots g_{0,K}]_{K\times 1}^T$ |
| 1 | $[g_{1,1}\ g_{1,2} \ldots g_{1,K}]_{K\times 1}^T$ |
| . | . |
| . | . |
| . | . |
| r | $[g_{r,1}\ g_{r,2} \ldots g_{r,K}]_{K\times 1}^T$ |

A second method for determining a base codebook corresponding to a system RS code: A process of directly generating, based on a system RS code corresponding to a Vandermonde matrix, a matrix that is a combination of a unit matrix and a Vandermonde matrix and then determining a base codebook is as follows: If a coder or decoder uses a finite field with a size of Q, that is, GF(Q) (where Q is usually $2^8$, or may be another value, which is not limited in this application), a Vandermonde matrix of the largest dimension in the finite field with a size of Q is a matrix $$\begin{bmatrix} a_1^0 & a_2^0 & \ldots & a_q^0 \\ a_1^1 & a_2^1 & \ldots & a_q^1 \\ \vdots & \vdots & \ddots & \vdots \\ a_1^{q-1} & a_2^{q-1} & \ldots & a_q^{q-1} \end{bmatrix}$$

with q rows and q columns (q=Q−1) (for example, a Vandermonde matrix with the largest GF($2^8$) is $$\begin{bmatrix} a_1^0 & a_2^0 & \ldots & a_{255}^0 \\ a_1^1 & a_2^1 & \ldots & a_{255}^1 \\ \vdots & \vdots & \ddots & \vdots \\ a_1^{254} & a_2^{254} & \ldots & a_{255}^{254} \end{bmatrix}$$

with 255 rows and 255 columns), where $[a_1, a_2, \ldots, a_q]$ are obtained from GF(Q) and are different from each other, and q columns of coding coefficients in the matrix $V_0$ may be used as q codewords to form the base codebook. For a quantity K(K≤q) of original data packets, when the codewords of q×1 dimensions are extracted from the base codebook, the first K elements, the last K elements, or consecutive K elements in any positions may be truncated from the base codebook as coding coefficients, or the q rows of coding coefficients in the matrix $V_0$ may be used as q codewords to form the base codebook. For a quantity K(K≤q) of original data packets, when the codewords of 1×q dimensions are extracted from the base codebook, the first K elements, the last K elements, or consecutive K elements in any positions may be truncated from the base codebook as coding coefficients. Alternatively, a Vandermonde matrix $$V_0 = \begin{bmatrix} a_1^0 & a_2^0 & \cdots & a_q^0 \\ a_1^1 & a_2^1 & \cdots & a_q^1 \\ \vdots & \vdots & \ddots & \vdots \\ a_1^{K-1} & a_2^{K-1} & \cdots & a_q^{K-1} \end{bmatrix}$$

or K×K with K rows may be determined based on a quantity K of original data packets and a group of parameters [$a_1$, $a_2$, ..., $a_q$] or based only on a group of parameters [$a_1$, $a_2$, ..., $a_K$]. In this case, a generator matrix corresponding to a system RS code is [I|$V_0$], where a unit matrix I of K×K dimensions corresponds to a coding coefficient of a system packet, a Vandermonde matrix $V_0$ with q columns corresponds to a coding coefficient of an encoded data packet, and a row vector formed by K original data packets may be left-multiplied by $V_0$ to generate q encoded data packets. Therefore, the q columns of coding coefficients may be used as q codewords to form the base codebook. Alternatively, a Vandermonde matrix $$V_0 = \begin{bmatrix} a_1^0 & a_1^1 & \cdots & a_1^{K-1} \\ a_2^0 & a_2^1 & \cdots & a_2^{K-1} \\ \vdots & \vdots & \ddots & \vdots \\ a_q^0 & a_q^1 & \cdots & a_q^{K-1} \end{bmatrix} \text{ or } \begin{bmatrix} a_1^0 & a_2^0 & \cdots & a_K^0 \\ a_1^1 & a_2^1 & \cdots & a_K^1 \\ \vdots & \vdots & \ddots & \vdots \\ a_1^{q-1} & a_2^{q-1} & \cdots & a_K^{q-1} \end{bmatrix}$$

with K columns may be determined based on a quantity K of original data packets and a group of parameters [$a_1$, $a_2$, ..., $a_q$] or based on a group of parameters [$a_1$, $a_2$, ..., $a_K$]. In this case, a generator matrix corresponding to a system RS code is $$\begin{bmatrix} I \\ V_0 \end{bmatrix},$$

where a unit matrix I of K×K dimensions corresponds to a coding coefficient of a system packet, a Vandermonde matrix $V_0$ with q rows corresponds to a coding coefficient of an encoded data packet, and $V_0$ may be left-multiplied by a column vector formed by the original data packets to generate q encoded data packets. Therefore, the q rows of coding coefficients may be used as q codewords to form the base codebook.

Based on the second method for determining a base codebook corresponding to a system RS code, the base codebook may be determined based on a quantity K of original data packets and a group of parameters [$a_1$, $a_2$, ..., $a_q$] or [$a_1$, $a_2$, ..., $a_K$], that is, the base codebook is obtained in an online manner. Alternatively, the base codebook may be directly obtained in a system storage manner, and the base codebook may be represented in a form of a table, for example, as shown in Table 2 and Table 3.

TABLE 2

| Index | Coefficient vector |
|---|---|
| 0 | $[g_{0,1} \ g_{0,2} \cdots g_{0,q}]_{q\times 1}^T$ |
| 1 | $[g_{1,1} \ g_{1,2} \cdots g_{1,q}]_{q\times 1}^T$ |
| . | . |
| . | . |
| . | . |
| r | $[g_{r,1} \ g_{r,2} \cdots g_{r,q}]_{q\times 1}^T$ |

As shown in Table 2, a coefficient vector $[g_{0,1} \ g_{0,2} \cdots g_{0,q}]_{q\times 1}^T$ corresponding to an index of 0 may be $[a_1^0 \ a_2^0 \cdots a_q^0]^T$ in a matrix $V_0$ of the largest dimension in GF(Q), and by analogy, $[g_{r,1} \ g_{r,2} \cdots g_{r,q}]_{q\times 1}^T$ is $[a_1^r \ a_2^r \cdots a_q^r]^T$ in the matrix $V_0$; or the coding coefficient $[g_{0,1} \ g_{0,2} \cdots g_{0,q}]_{q\times 1}^T$ corresponding to an index of 0 is $[a_1^0 \ a_1^1 \cdots a_1^{q-1}]^T$ in the matrix $V_0$ of the largest dimension in GF(Q), and by analogy, $[g_{r,1} \ g_{r,2} \cdots g_{r,q}]_{q\times 1}^T$ is $[a_{r+1}^0 \ a_{r+1}^1 \cdots a_{r+1}^{q-1}]^T$; or a relationship between an index and a coding coefficient is transformed, that is, positions of codewords are exchanged; or a serial number or an identifier of the codeword may be represented in another manner; or codewords in a base codebook table are some or all of codewords in $V_0$; or the codewords are presented in a form of row vectors other than in a form of column vectors $[\cdot]^T$ in Table 2; or the coding coefficients in the base codebook table may not be determined based on $G_0$, for example, the coding coefficients are determined based on a Cauchy matrix. This is not limited in this application. r is a natural number, and 0≤r≤q−1.

TABLE 3

| Index | Coefficient vector |
|---|---|
| 0 | $g_{0,1} \ g_{0,2} \cdots g_{0,K}]_{K\times 1}^T$ |
| 1 | $g_{1,1} \ g_{1,2} \cdots g_{1,K}]_{K\times 1}^T$ |
| . | . |
| . | . |
| . | . |
| r | $g_{r,1} \ g_{r,2} \cdots g_{r,K}]_{K\times 1}^T$ |

As shown in Table 3, a coefficient vector $[g_{0,1} \ g_{0,2} \cdots g_{0,K}]_{K\times 1}^T$ corresponding to an index of 0 may be $[a_1^0 \ a_2^0 \cdots a_K^0]^T$, and by analogy, $[g_{r,1} \ g_{r,2} \cdots g_{r,K}]_{K\times 1}^T$ is $[a_1^r \ a_2^r \cdots a_K^r]_{K\times 1}^T$ in the matrix $V_0$; or the vector $[g_{0,1} \ g_{0,2} \cdots g_{0,K}]_{K\times 1}^T$ corresponding to an index of 0 may be $[a_1^0 \ a_1^1 \cdots a_1^{K-1}]^T$ in the matrix $V_0$, and by analogy, $[g_{r,1} \ g_{r,2} \cdots g_{r,K}]_{K\times 1}^T$ is $[a_q^0 \ a_q^1 \cdots a_q^{K-1}]^T$ in the matrix $V_0$; or a relationship between an index and a coding coefficient is transformed, that is, positions of codewords are exchanged; or a serial number or an identifier of the codeword may be represented in another manner; or codewords in a base codebook table are some or all of codewords in $V_0$; or the codewords are presented in a form of row vectors other than in a form of column vectors $[\cdot]^T$ in Table 3; or the coding coefficients in the base codebook table may not be determined based on $G_0$, for example, the coding coefficients are determined based on a Cauchy matrix. This is not limited in this application. r is a natural number, and 0≤r≤q−1.

The technical solutions in embodiments of this application may be applied to various communication systems. For example, the communication system may be a long term evolution (LTE) system, a 5th generation (5G) communication system, an NR system, a wireless fidelity (Wi-Fi) system, a communication system related to the 3rd generation partnership project (3GPP), a future evolved communication system, or the like. This is not limited. The terms "system" and "network" may be interchanged with each other. The 5G communication system is a next generation communication system under research. The 5G communication system includes a non-standalone (NSA) 5G mobile communication system and a standalone (SA) 5G mobile communication system. In addition, the communication system may be further applied to a future-oriented communication technology, and are all applicable to the technical solutions provided in embodiments of this application. The foregoing communication systems applicable to this application are merely examples for description, and the communication systems applicable to this application are not limited thereto. A unified description is provided herein.

Figure 2:
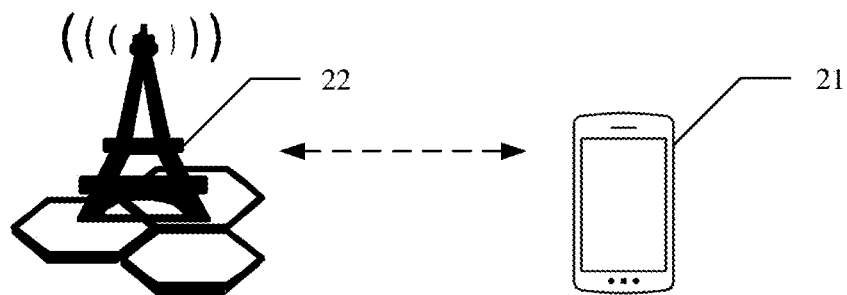
FIG. 2 is a schematic diagram 1 of an architecture of an example communication system according to an embodiment of this application.
Figure 3:
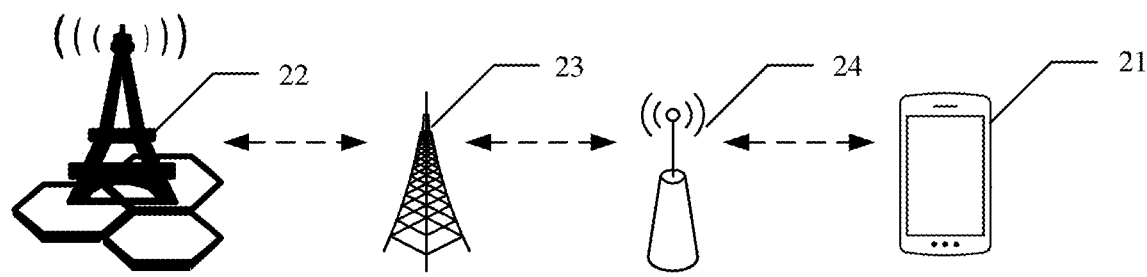
FIG. 3 is a schematic diagram 2 of an architecture of an example communication system according to an embodiment of this application.
Figure 4:
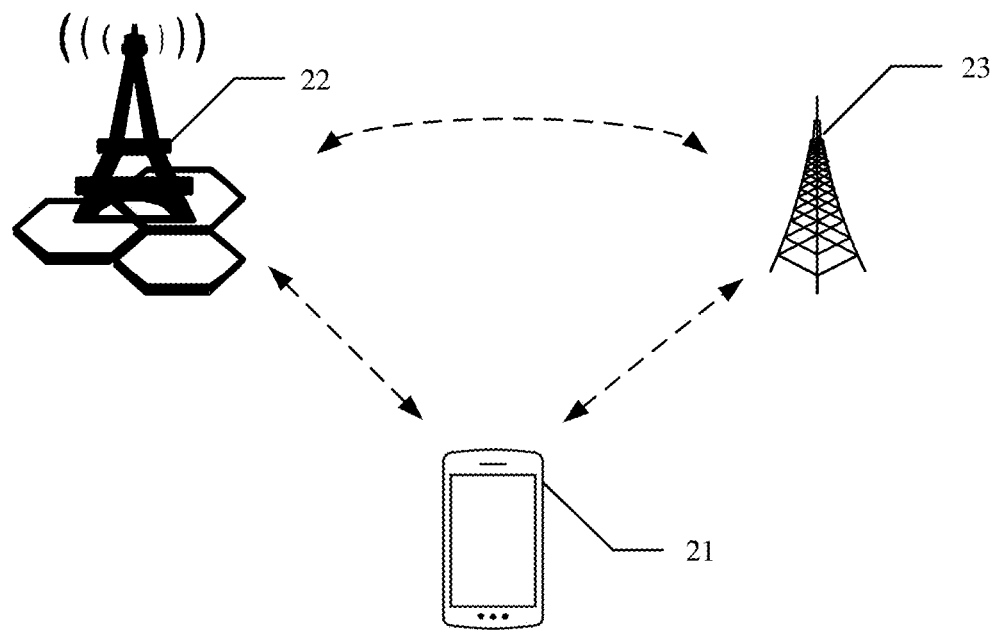
FIG. 4 is a schematic diagram 3 of an architecture of an example communication system according to an embodiment of this application.
Figure 5:
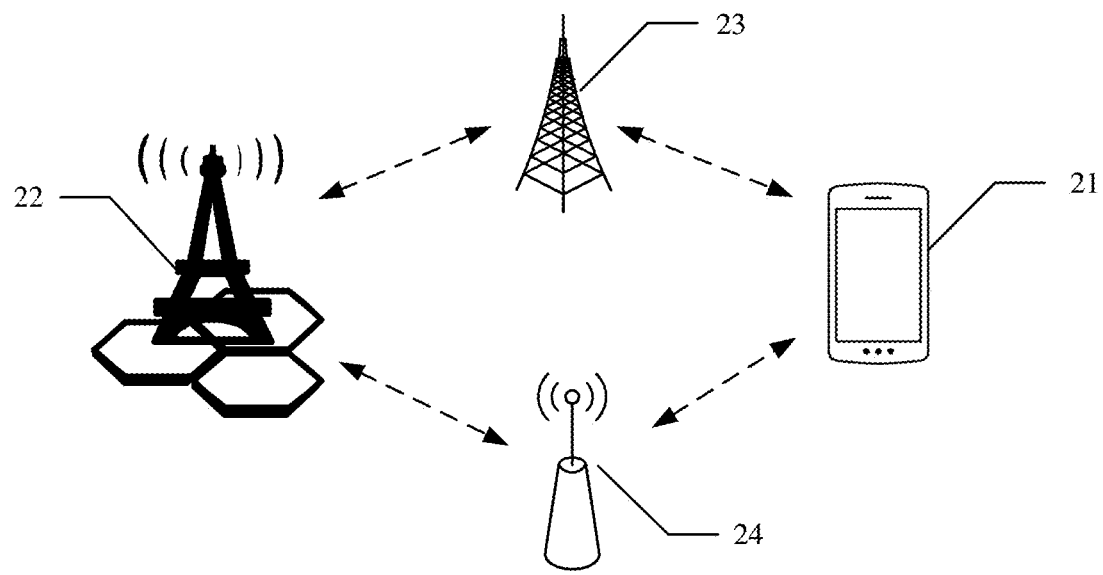
FIG. 5 is a schematic diagram 4 of an architecture of an example communication system according to an embodiment of this application.

The technical solutions in embodiments of this application may be applied to various mobile communication scenarios, including but not limited to: a point-to-point single-connectivity scenario, for example, point-to-point transmission between pieces of user equipment (UE), or point-to-point transmission between a base station 22 and UE 21 shown in FIG. 2; a multi-hop single-connectivity scenario, for example, multi-hop or relay transmission between the base station 22 and the UE 21 shown in FIG. 3, for example, multi-hop or relay transmission between a base station 23 and a base station 24; a dual connectivity (DC) scenario, for example, dual-connectivity transmission between two base stations (the base station 22 and the base station 23) and the UE 21 shown in FIG. 4; and a multi-hop multi-connectivity scenario, for example, multi-connectivity transmission between a plurality of base stations and UE shown in FIG. 5, for example, transmission between the base station 22 and the UE 21 by using the base station 23 and the base station 24.

It may be understood that the foregoing application scenarios of this application are only described as examples, and do not impose any limitation on a network architecture applicable to this application. In addition, transmission is not limited to uplink transmission, downlink transmission, access link transmission, backhaul link transmission, or sidelink transmission in this application.

Figure 6:
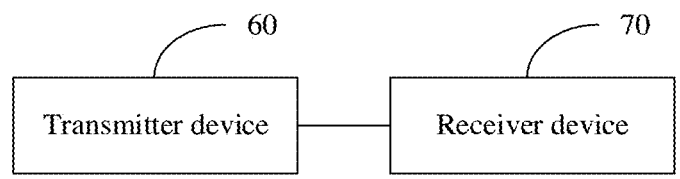
FIG. 6 is a schematic diagram 5 of an architecture of an example communication system according to an embodiment of this application.

The following uses only a communication system shown in FIG. 6 as an example to describe the method according to an embodiment of this application. FIG. 6 shows a communication system according to an embodiment of this application. The communication system includes a transmitter device 60. Optionally, the communication system may further include a receiver device 70.

Optionally, the transmitter device 60 and the receiver device 70 in this embodiment of this application may be devices of a same type. For example, both the transmitter device 60 and the receiver device 70 are terminal devices or network devices. Alternatively, the transmitter device 60 and the receiver device 70 may be devices of different types. For example, the transmitter device 60 is a terminal device and the receiver device 70 is a network device; or the transmitter device 60 is a network device and the receiver device 70 is a terminal device. This is not specifically limited in this embodiment of this application.

Optionally, the terminal device in the embodiments of this application may be a device for implementing a wireless communication function, such as a terminal device or a chip that can be used in the terminal device. The terminal device may be user equipment (user equipment, UE), an access terminal device, a terminal device unit, a terminal device station, a mobile station, a mobile console, a remote station, a remote terminal device, a mobile device, a wireless communication device, a terminal device agent, a terminal device, or the like in a 5G network or a future evolved public land mobile network (PLMN). The access terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a virtual reality (VR) terminal device, an augmented reality (AR) terminal device, a wireless terminal device in industrial control, a wireless terminal device in self driving, a wireless terminal device in telemedicine (remote medical), a wireless terminal device in a smart grid, a wireless terminal device in transportation safety, a wireless terminal device in a smart city, a wireless terminal device in a smart home (smart home), or the like. The terminal device may be mobile or fixed.

Optionally, the network device in embodiments of this application is a device that connects a terminal device to a wireless network, and may be an evolved NodeB (eNB or eNodeB) or a next generation evolved NodeB (ng-eNB) in long term evolution (LTE); or a next generation NodeB (gNB), a broadband network gateway (BNG), an aggregation switch, a non-3rd generation partnership project (3GPP) access device, or the like in a 5th generation (5G) network or a future evolved PLMN. This is not specifically limited in embodiments of this application. Optionally, the base station in this embodiment of this application may include base stations in various forms, for example, a macro base station, a micro base station (which is also referred to as a small cell), a relay station, and an access point. This is not specifically limited in this embodiment of this application.

The communication system shown in FIG. 6 is only used as an example, but is not intended to limit the technical solutions in this application. A person skilled in the art should understand that, in a specific implementation process, the communication system may further include another device. This is not limited.

Figure 7:
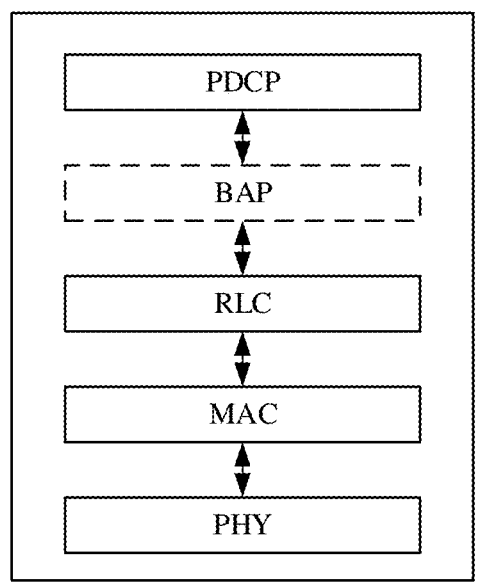
FIG. 7 is a diagram of an architecture of a protocol used in an example data processing method according to an embodiment of this application.

Optionally, a structure of a protocol stack of the transmitter device 60 or the receiver device 70 in this embodiment of this application is shown in FIG. 7, and sequentially includes a physical layer, a MAC layer, an RLC layer, and a packet data convergence protocol (PDCP) layer from bottom to top. Optionally, the protocol stack may further include a backhaul adaptation protocol (BAP) layer. The physical layer is mainly used for implementing a function of a physical layer, such as modulation, demodulation, and multi-antenna mapping. The MAC layer is mainly used for uplink and downlink scheduling and HARQ retransmission. The RLC layer is mainly used for segmentation and retransmission processing, and sequence control of higher-layer data. The BAP layer is mainly used for backhaul link routing and bearer mapping. The PDCP layer is mainly used for header compression and decompression to reduce bit traffic that needs to be transmitted over a radio interface.

With reference to FIG. 1A to FIG. 7, the following describes a data processing method, that is, a network coding or decoding method, according to an embodiment of this application.

It should be noted that a name of a message (or information), a name of a parameter in the message (or information), or the like in the following embodiments of this application is only an example, and may be another name during specific implementation. This is not specifically limited in embodiments of this application.

It may be understood that, in embodiments of this application, the transmitter device may perform some or all of steps in embodiments of this application. The steps are only examples. In embodiments of this application, other steps or variations of various steps may further be performed. In addition, the steps may be performed in a sequence different from a sequence presented in embodiments of this application, and not all the steps in embodiments of this application need to be performed.

In embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

Figure 8:
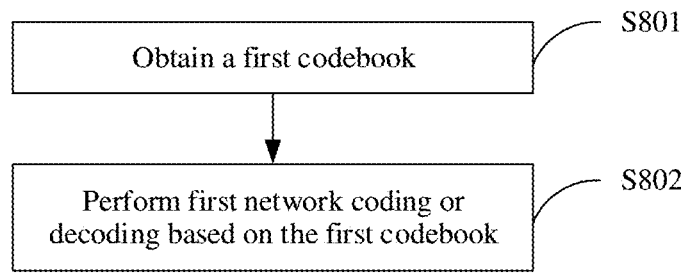
FIG. 8 is a schematic flowchart 1 of an example data processing method according to an embodiment of this application.
Figure 9:
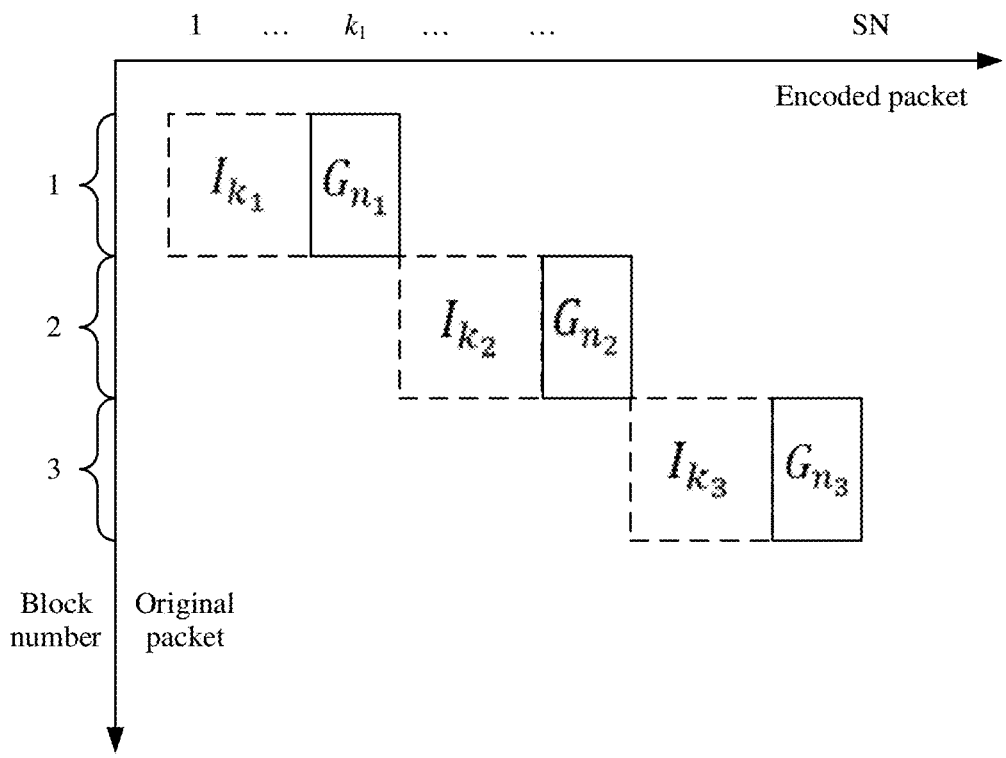
FIG. 9 is a schematic diagram 1 of an example scenario to which the data processing method shown in FIG. 8 is applicable.
Figure 10:
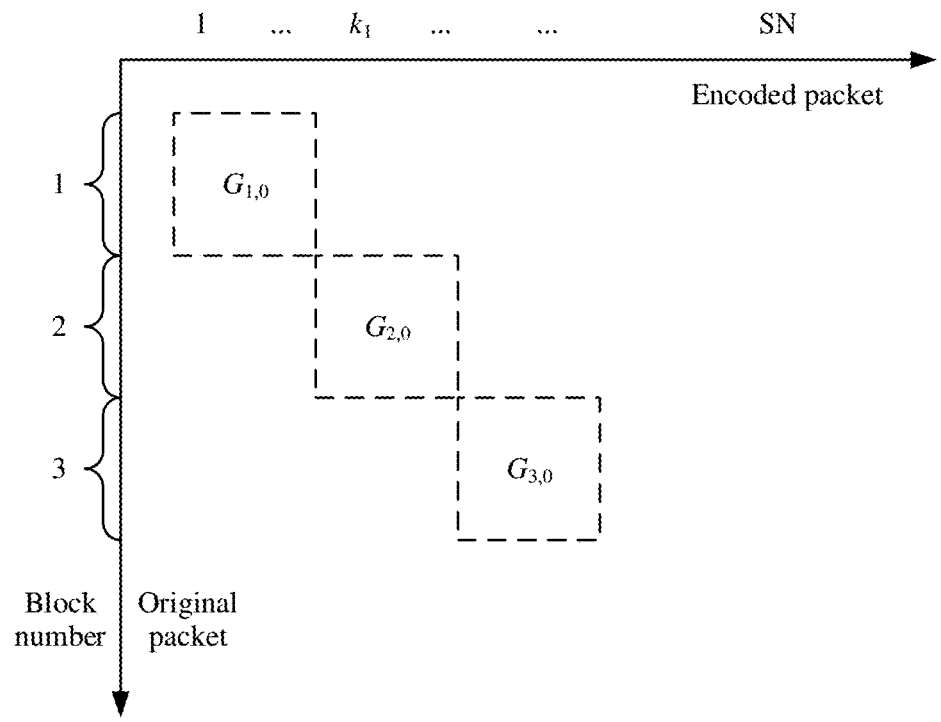
FIG. 10 is a schematic diagram 2 of an example scenario to which the data processing method shown in FIG. 8 is applicable.
Figure 11:
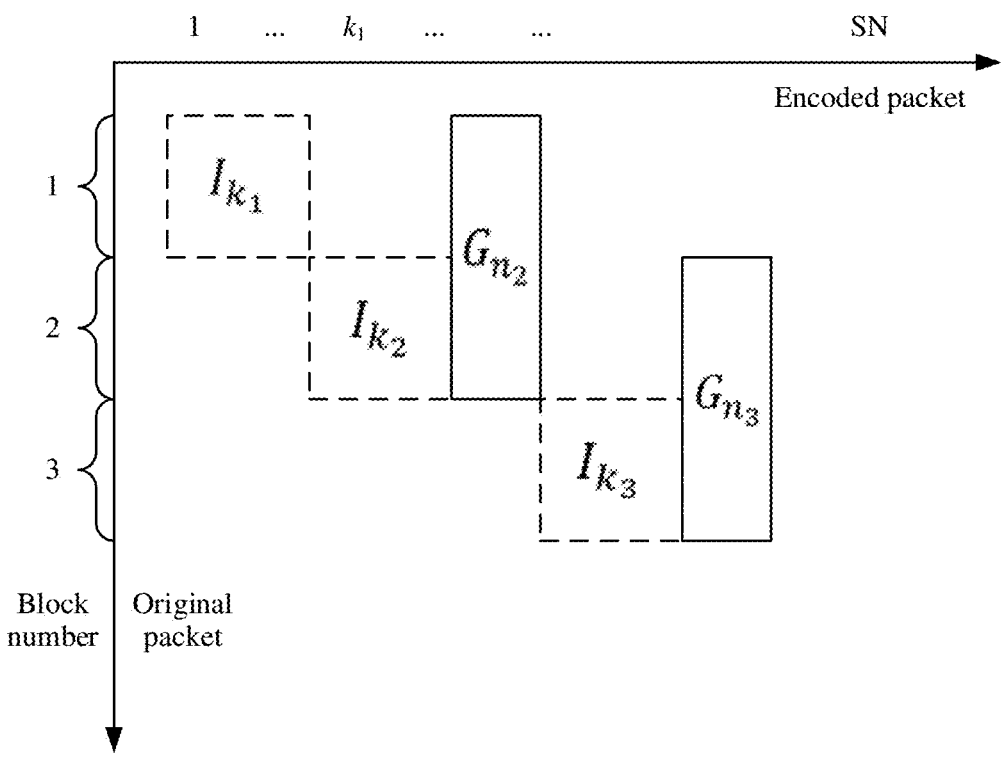
FIG. 11 is a schematic diagram 3 of an example scenario to which the data processing method shown in FIG. 8 is applicable.
Figure 12:
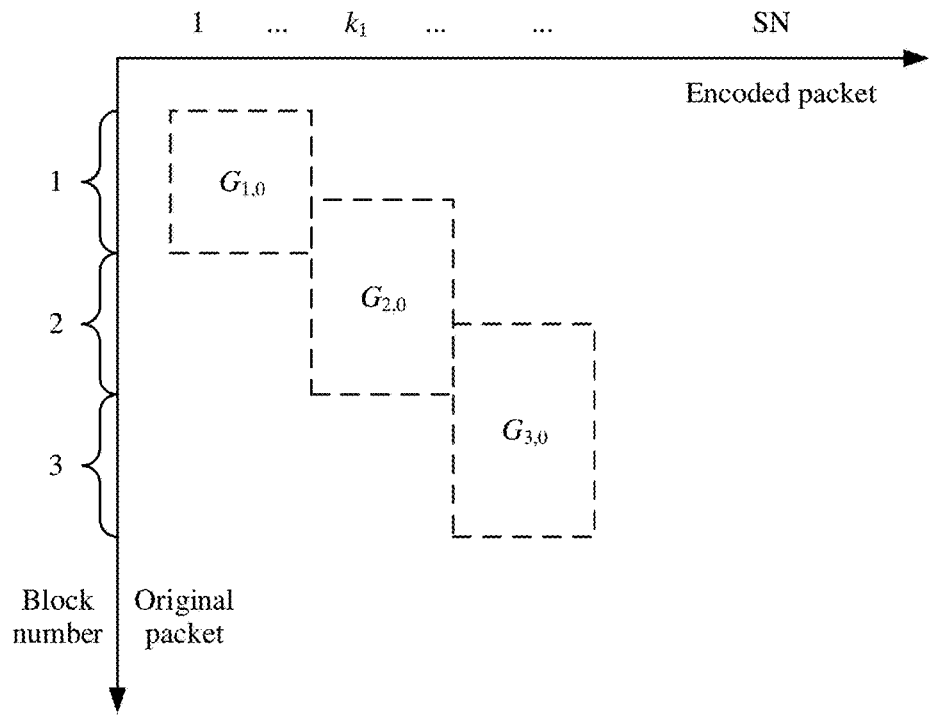
FIG. 12 is a schematic diagram 4 of an example scenario to which the data processing method shown in FIG. 8 is applicable.

FIG. 8 shows a data processing method according to an embodiment of this application. The method may be performed by a transmitter device (for example, a terminal device or a network device), or may be performed by a component of the transmitter device, for example, a processor, a chip, or a chip system of the transmitter device. Alternatively, the method may be performed by a receiver device (for example, a terminal device or a network device), or may be performed by a component of the receiver device, for example, a processor, a chip, or a chip system of the receiver device.

As shown in FIG. 8, the method includes the following steps.

S801: Obtain a first codebook.

The first codebook is a codebook that is actually used to perform first network coding or decoding on a to-be-transmitted data packet. In this embodiment of this application, the first codebook is a codebook obtained after the second codebook (also referred to as a base codebook) is extended according to a specified extension rule.

The word "specified" means that the extension rule is a rule that has been known in advance by both the transmitter device and the receiver device, and may be implemented in a manner of protocol predefinition, pre-configuration, or semi-static configuration. This is not specifically limited in this embodiment of this application.

It should be noted that "extension" may also be understood as "extension", and is a process of adding more codewords or increasing a length of a codeword based on the second codebook. The "length" of the codeword may also be understood as a "size" and a "dimension" of the codeword, and may be replaced with each other. A unified description is provided herein.

Specifically, S801 of obtaining a first codebook may be implemented by performing the following step 1 to step 3.

Step 1: Determine a second codebook.

For a method for determining the second codebook, refer to the "base codebook and a method for determining a base codebook" in the foregoing explanations of technical terms.

Step 2: Obtain a third codebook.

The third codebook may be determined based on the first matrix corresponding to the third codebook, or may be determined based on a relationship between the first matrix corresponding to the third codebook and the second matrix corresponding to the second codebook.

It should be noted that the third codebook is used to extend the second codebook to obtain the first codebook. Therefore, a codeword in the third codebook may be referred to as an extension codeword.

Specifically, the first matrix and the second matrix may be obtained in one or more of the following manners.

Manner 1: The first matrix is a random coefficient full-rank matrix, and the second matrix is a non-random coefficient full-rank matrix.

Specifically, the first matrix may be obtained in a manner in which a computer searches for a group of random coefficient vectors. For example, {1, 2, . . . } may be input to a pseudo-random generator as random seeds, a corresponding sequence of number is output for each random seed, and then a random coefficient vector including some or all elements of the sequence of number is used as a codeword in the first matrix.

A length of any random coefficient vector in the first matrix is greater than or equal to a quantity of original data packets or a length of any vector in the second codebook, or is greater than or equal to a quantity of codewords included in the second codebook.

For example, if a length of any random coefficient vector in the first matrix is M, and a quantity of original data packets or a length of any vector in the second codebook is s, M≥s. For another example, if a quantity of any random coefficient vector in the first matrix is w, and a quantity of codewords included in the second codebook is (r+1), w≥(r+1).

It should be noted that, if a rank corresponding to the output vector corresponding to the current random seed and the first matrix formed by the previously determined t−1 extension codewords is equal to min(M, t), a corresponding vector that is output based on the current random seed may be used as an extension codeword, otherwise the vector is abandoned, so as to ensure linear independence between the vectors in the first matrix.

In addition, when the random coefficient vector in the first matrix is used for network coding or decoding, an integer quantity of elements, for example, K or N elements, may be selected from the random coefficient vector as an actual coding coefficient vector.

In this way, the third codebook corresponds to a full-rank random matrix, so that a linear independence feature is maintained between codewords, and more valid redundant packets or check packets can be generated, so that flexible code rates or code lengths are supported; or flexible block lengths can be supported, or more original data packets can be efficiently encoded, to improve coding or decoding performance, thereby improving system spectral efficiency or improving system reliability.

Optionally, the second matrix is also a full-rank matrix, that is, each codeword in the base codebook also satisfies a linear independence requirement. In this way, both the first matrix and the second matrix are full-rank matrices, so that it can be ensured that both an original codeword and an extension codeword in the first codebook have linear independence, and it can be ensured that a generated redundant packet or check packet is a valid packet, thereby improving coding or decoding performance, and improving system spectral efficiency.

Manner 2: The first matrix and the second matrix satisfy one of the following relationships: A vector in the first matrix and a vector in the second matrix come from a set of row vectors in a same matrix A, and a length of the vector in the first matrix or a length of the vector in the second matrix is less than or equal to a length of a row vector of the matrix A; or a vector in the first matrix and a vector in the second matrix come from a set of column vectors in a same matrix A, and a length of the vector in the first matrix or a length of the vector in the second matrix is less than or equal to a length of a column vector in the matrix A, where one or more vectors in the first matrix are different from all vectors in the second matrix. In this way, both the third codebook and the second codebook come from a same full-rank matrix, so that a linear independence feature is maintained between a codeword in the third codebook and a codeword in the second codebook. More valid redundant packets or check packets can be generated than those generated in a manner in which network coding is performed based on only the second codebook, and flexible code rates or code lengths can be supported; or flexible block lengths can be supported, or more original data packets can be efficiently encoded, to improve coding or decoding performance, thereby improving system spectral efficiency or improving system reliability.

The following uses two examples for description.

Example 1

The matrix A satisfies $$\begin{bmatrix} a_1^0 & a_2^0 & \cdots & a_m^0 & \cdots & a_q^0 \\ a_1^1 & a_2^1 & \cdots & a_m^1 & \cdots & a_q^1 \\ \vdots & \vdots & \ddots & \vdots & \ddots & \vdots \\ a_1^l & a_2^l & \cdots & a_m^l & \cdots & a_q^l \\ \vdots & \vdots & \ddots & \vdots & \ddots & \vdots \\ a_1^{q-1} & a_2^{q-1} & \cdots & a_m^{q-1} & \cdots & a_q^{q-1} \end{bmatrix} \text{ or } \begin{bmatrix} a_1^0 & a_2^0 & \cdots & a_m^0 & \cdots & a_q^0 \\ a_1^1 & a_2^1 & \cdots & a_m^1 & \cdots & a_q^1 \\ \vdots & \vdots & \ddots & \vdots & \ddots & \vdots \\ a_1^l & a_2^l & \cdots & a_m^l & \cdots & a_q^l \\ \vdots & \vdots & \ddots & \vdots & \ddots & \vdots \\ a_1^{q-1} & a_2^{q-1} & \cdots & a_m^{q-1} & \cdots & a_q^{q-1} \end{bmatrix}^T.$$

q is a size of a finite field minus 1, $a_m$ is an element in the finite field, $1 \leq m \leq q$, $a_1, a_2, \ldots, a_m, \ldots, a_q$ are different elements in the finite field, $a_m^l$ is $a_m$ to the power of l, and $0 \leq l \leq q-1$. In this way, the third codebook and the second codebook come from a full-rank Vandermonde matrix, so that a linear independence feature can be maintained between a codeword in the third codebook and a codeword in the second codebook. More valid redundant packets or check packets can be generated than those generated in a manner in which network coding is performed based on only the second codebook, and flexible code rates or code lengths can be supported; or flexible block lengths can be supported, or more original data packets can be efficiently encoded, to improve coding or decoding performance, thereby further improving system spectral efficiency or improving system reliability.

Specifically, if the quantity of original data packets is K, K rows may be selected from the matrix A as the third codebook, and another K rows may be selected as the second codebook, where the K rows in the third codebook are different from the K rows in the second codebook; or K columns are selected from the matrix A as the third codebook, and another K columns are selected as the second codebook, where the K columns in the third codebook are different from the K columns in the second codebook.

Further, the K rows in the third codebook are different from the K rows in the second codebook, and the K columns in the third codebook are different from the K columns in the second codebook, so as to ensure that any two codewords in the third codebook and the second codebook are different, that is, the encoded data packets generated based on the third codebook and the second codebook are all valid redundant packet or check packets.

It should be noted that the matrix A may also be determined in another manner. This is not limited herein. For example, the matrix A may be a full-rank Cauchy matrix.

Example 2

The first matrix satisfies $$V_1 = \begin{bmatrix} b_1^0 & b_2^0 & \cdots & b_m^0 & \cdots & b_q^0 \\ b_1^1 & b_2^1 & \cdots & b_m^1 & \cdots & b_q^1 \\ \vdots & \vdots & \ddots & \vdots & \ddots & \vdots \\ b_1^l & b_2^l & \cdots & b_m^l & \cdots & b_q^l \\ \vdots & \vdots & \ddots & \vdots & \ddots & \vdots \\ b_1^{K-1} & b_2^{K-1} & \cdots & b_m^{K-1} & \cdots & b_q^{K-1} \end{bmatrix},$$

and the second matrix satisfies $$V_0 = \begin{bmatrix} a_1^0 & a_2^0 & \cdots & a_m^0 & \cdots & a_q^0 \\ a_1^1 & a_2^1 & \cdots & a_m^1 & \cdots & a_q^1 \\ \vdots & \vdots & \ddots & \vdots & \ddots & \vdots \\ a_1^l & a_2^l & \cdots & a_m^l & \cdots & a_q^l \\ \vdots & \vdots & \ddots & \vdots & \ddots & \vdots \\ a_1^{K-1} & a_2^{K-1} & \cdots & a_m^{K-1} & \cdots & a_q^{K-1} \end{bmatrix},$$

where $[b_1, b_2, \ldots, b_m, \ldots, b_q]$ and $[a_1, a_2, \ldots, a_m, \ldots, a_q]$ are different.

Alternatively, the first matrix satisfies $$V_1 = \begin{bmatrix} b_1^0 & b_2^0 & \cdots & b_m^0 & \cdots & b_q^0 \\ b_1^1 & b_2^1 & \cdots & b_m^1 & \cdots & b_q^1 \\ \vdots & \vdots & \ddots & \vdots & \ddots & \vdots \\ b_1^l & b_2^l & \cdots & b_m^l & \cdots & b_q^l \\ \vdots & \vdots & \ddots & \vdots & \ddots & \vdots \\ b_1^{K-1} & b_2^{K-1} & \cdots & b_m^{K-1} & \cdots & b_q^{K-1} \end{bmatrix}^T,$$

and the second matrix satisfies $$V_0 = \begin{bmatrix} a_1^0 & a_2^0 & \cdots & a_m^0 & \cdots & a_q^0 \\ a_1^1 & a_2^1 & \cdots & a_m^1 & \cdots & a_q^1 \\ \vdots & \vdots & \ddots & \vdots & \ddots & \vdots \\ a_1^l & a_2^l & \cdots & a_m^l & \cdots & a_q^l \\ \vdots & \vdots & \ddots & \vdots & \ddots & \vdots \\ a_1^{K-1} & a_2^{K-1} & \cdots & a_m^{K-1} & \cdots & a_q^{K-1} \end{bmatrix}^T,$$

where $[b_1, b_2, \ldots, b_m, \ldots, b_q]^T$ and $[a_1, a_2, \ldots, a_m, \ldots, a_q]^T$ are different. K is a quantity of original data packets corresponding to the first network coding or decoding, q is a field size of a finite field minus 1; $a_m$ is an element in the finite field, $1 \leq m \leq q$, $a_1, a_2, \ldots, a_m, \ldots, a_q$ are different elements in the finite field, $a_m^l$ is $a_m$ to the power of l, and $0 \leq l \leq K-1$; and $b_m$ is an element in the finite field, $1 \leq m \leq q$, $b_1, b_2, \ldots, b_m, \ldots, b_q$ are different elements in the finite field, $b_m^l$ is $b_m$ to the power of l, and $0 \leq l \leq K-1$.

In this way, the third codebook and the second codebook come from different Vandermonde matrices, so that a linear independence feature can be maintained between a codeword in the third codebook and a codeword in the second codebook as much as possible. More valid redundant packets or check packets can be generated than those generated in a manner in which network coding is performed based on only the second codebook, and flexible code rates or code lengths can be supported; or flexible block lengths can be supported, or more original data packets can be efficiently encoded, to improve coding or decoding performance, thereby further improving system spectral efficiency or improving system reliability.

Manner 3: The first matrix and the second matrix satisfy a functional relationship. The functional relationship may keep a linear independence feature between a codeword in the third codebook and a codeword in the second codebook. More valid redundant packets or check packets can be generated than those generated in a manner in which network coding is performed based on only the second codebook, and flexible code rates or code lengths can be supported; or flexible block lengths can be supported, or more original data packets can be efficiently encoded, to improve coding or decoding performance, thereby improving system spectral efficiency or improving system reliability.

In a possible design solution, that the first matrix and the second matrix satisfy a functional relationship may include: the first matrix is a product of the second matrix and a diagonal matrix corresponding to a non-zero row vector $[v_1, \ldots, v_K]$ or $[v_1, \ldots, v_q]$ or a non-zero column vector $v=[v_1, \ldots, v_K]^T$ or $[v_1, \ldots, v_q]^T$. In this way, the third codebook comes from an extension matrix of a matrix corresponding to the second codebook, so that a linear independence feature can be maintained between a codeword in the third codebook and a codeword in the second codebook as much as possible. More valid redundant packets or check packets can be generated than those generated in a manner in which network coding is performed based on only the second codebook, and flexible code rates or code lengths can be supported; or flexible block lengths can be supported, or more original data packets can be efficiently encoded, to improve coding or decoding performance, thereby further improving system spectral efficiency or improving system reliability. The following uses Example 3 to Example 6 for description.

Example 3

The second matrix satisfies $$V_0 = \begin{bmatrix} a_1^0 & a_2^0 & \ldots & a_m^0 & \ldots & a_q^0 \\ a_1^1 & a_2^1 & \ldots & a_m^1 & \ldots & a_q^1 \\ \vdots & \vdots & \ddots & \vdots & \ddots & \vdots \\ a_1^l & a_2^l & \ldots & a_m^l & \ldots & a_q^l \\ \vdots & \vdots & \ddots & \vdots & \ddots & \vdots \\ a_1^{K-1} & a_2^{K-1} & \ldots & a_m^{K-1} & \ldots & a_q^{K-1} \end{bmatrix},$$

the non-zero vector is a row vector $v=[v_1, \ldots, v_K]$ or a column vector $v=[v_1, \ldots, v_K]^T$, and the first matrix satisfies:

$$V_1 = \text{diag}(v) \times V_0 = \begin{bmatrix} v_1 a_1^0 & v_1 a_2^0 & \ldots & v_1 a_m^0 & \ldots & v_1 a_q^0 \\ v_2 a_1^1 & v_2 a_2^1 & \ldots & v_2 a_m^1 & \ldots & v_2 a_q^1 \\ \vdots & \vdots & \ddots & \vdots & \ddots & \vdots \\ v_m a_1^l & v_m a_2^l & \ldots & v_m a_m^l & \ldots & v_m a_q^l \\ \vdots & \vdots & \ddots & \vdots & \ddots & \vdots \\ v_K a_1^{K-1} & v_K a_2^{K-1} & \ldots & v_K a_m^{K-1} & \ldots & v_K a_q^{K-1} \end{bmatrix},$$

where $$\text{diag}(v) = \begin{bmatrix} v_1 & 0 & \ldots & 0 \\ 0 & v_2 & \ldots & 0 \\ \vdots & \vdots & \ddots & \vdots \\ 0 & 0 & \ldots & v_K \end{bmatrix}.$$

diag(v) is a diagonal matrix corresponding to v.

Example 4

The second matrix satisfies $$V_0 = \begin{bmatrix} a_1^0 & a_2^0 & \ldots & a_m^0 & \ldots & a_q^0 \\ a_1^1 & a_2^1 & \ldots & a_m^1 & \ldots & a_q^1 \\ \vdots & \vdots & \ddots & \vdots & \ddots & \vdots \\ a_1^l & a_2^l & \ldots & a_m^l & \ldots & a_q^l \\ \vdots & \vdots & \ddots & \vdots & \ddots & \vdots \\ a_1^{K-1} & a_2^{K-1} & \ldots & a_m^{K-1} & \ldots & a_q^{K-1} \end{bmatrix},$$

the non-zero vector is a row vector $v=[v_1, \ldots, v_q]$ or a column vector $v=[v_1, \ldots, v_q]^T$, and the first matrix satisfies:

$$V_1 = V_0 \times \text{diag}(v) = \begin{bmatrix} v_1 a_1^0 & v_1 a_2^0 & \ldots & v_m a_m^0 & \ldots & v_q a_q^0 \\ v_1 a_1^1 & v_2 a_2^1 & \ldots & v_m a_m^1 & \ldots & v_q a_q^1 \\ \vdots & \vdots & \ddots & \vdots & \ddots & \vdots \\ v_1 a_1^l & v_2 a_2^l & \ldots & v_m a_m^l & \ldots & v_q a_q^l \\ \vdots & \vdots & \ddots & \vdots & \ddots & \vdots \\ v_1 a_1^{K-1} & v_2 a_2^{K-1} & \ldots & v_m a_m^{K-1} & \ldots & v_q a_q^{K-1} \end{bmatrix},$$

where $$\text{diag}(v) = \begin{bmatrix} v_1 & 0 & \ldots & 0 \\ 0 & v_2 & \ldots & 0 \\ \vdots & \vdots & \ddots & \vdots \\ 0 & 0 & \ldots & v_q \end{bmatrix}.$$

diag(v) is a diagonal matrix corresponding to v.

Example 5

The second matrix satisfies $$V_0 = \begin{bmatrix} a_1^0 & a_2^0 & \ldots & a_m^0 & \ldots & a_q^0 \\ a_1^1 & a_2^1 & \ldots & a_m^1 & \ldots & a_q^1 \\ \vdots & \vdots & \ddots & \vdots & \ddots & \vdots \\ a_1^l & a_2^l & \ldots & a_m^l & \ldots & a_q^l \\ \vdots & \vdots & \ddots & \vdots & \ddots & \vdots \\ a_1^{K-1} & a_2^{K-1} & \ldots & a_m^{K-1} & \ldots & a_q^{K-1} \end{bmatrix}^T,$$

the non-zero vector is a row vector $v=[v_1, \ldots, v_K]$ or a column vector $v=[v_1, \ldots, v_K]^T$, and the first matrix satisfies $$V_1 = V_0 \times \operatorname{diag}(v) = \begin{bmatrix} v_1 a_1^0 & v_1 a_2^0 & \ldots & v_1 a_m^0 & \ldots & v_1 a_q^0 \\ v_2 a_1^1 & v_2 a_2^1 & \ldots & v_2 a_m^1 & \ldots & v_2 a_q^1 \\ \vdots & \vdots & \ddots & \vdots & \ddots & \vdots \\ v_m a_1^l & v_m a_2^l & \ldots & v_m a_m^l & \ldots & v_m a_q^l \\ \vdots & \vdots & \ddots & \vdots & \ddots & \vdots \\ v_K a_1^{K-1} & v_K a_2^{K-1} & \ldots & v_K a_m^{K-1} & \ldots & v_K a_q^{K-1} \end{bmatrix}^T,$$

where $$\operatorname{diag}(v) = \begin{bmatrix} v_1 & 0 & \ldots & 0 \\ 0 & v_2 & \ldots & 0 \\ \vdots & \vdots & \ddots & \vdots \\ 0 & 0 & \ldots & v_K \end{bmatrix}.$$

diag(v) is a diagonal matrix corresponding to v.

Example 6

The second matrix satisfies $$V_0 = \begin{bmatrix} a_1^0 & a_2^0 & \ldots & a_m^0 & \ldots & a_q^0 \\ a_1^1 & a_2^1 & \ldots & a_m^1 & \ldots & a_q^1 \\ \vdots & \vdots & \ddots & \vdots & \ddots & \vdots \\ a_1^l & a_2^l & \ldots & a_m^l & \ldots & a_q^l \\ \vdots & \vdots & \ddots & \vdots & \ddots & \vdots \\ a_1^{K-1} & a_2^{K-1} & \ldots & a_m^{K-1} & \ldots & a_q^{K-1} \end{bmatrix}^T,$$

the non-zero vector is a row vector $v=[v_1, \ldots, v_q]$ or a column vector $v=[v_1, \ldots, v_q]^T$, and the first matrix satisfies:

$$V_1 = \operatorname{diag}(v) \times V_0 = \begin{bmatrix} v_1 a_1^0 & v_2 a_2^0 & \ldots & v_m a_m^0 & \ldots & v_q a_q^0 \\ v_1 a_1^1 & v_2 a_2^1 & \ldots & v_m a_m^1 & \ldots & v_q a_q^1 \\ \vdots & \vdots & \ddots & \vdots & \ddots & \vdots \\ v_1 a_1^l & v_2 a_2^l & \ldots & v_m a_m^l & \ldots & v_q a_q^l \\ \vdots & \vdots & \ddots & \vdots & \ddots & \vdots \\ v_1 a_1^{K-1} & v_2 a_2^{K-1} & \ldots & v_m a_m^{K-1} & \ldots & v_q a_q^{K-1} \end{bmatrix}^T,$$

where $$\operatorname{diag}(v) = \begin{bmatrix} v_1 & 0 & \ldots & 0 \\ 0 & v_2 & \ldots & 0 \\ \vdots & \vdots & \ddots & \vdots \\ 0 & 0 & \ldots & v_q \end{bmatrix}.$$

diag(v) is a diagonal matrix corresponding to v.

In Example 3 and Example 6, K is a quantity of original data packets corresponding to the first network coding or decoding, q is a field size of a finite field minus 1, $a_m$ is an element in the finite field, $1 \leq m \leq q$, $\{a_1, a_2, \ldots, a_m, \ldots, a_q\}$ are different elements in the finite field, $a_m^l$ is $a_m$ raised to the power of l, $0 \leq l \leq K-1$, and diag(v) is a diagonal matrix corresponding to v. In this way, the third codebook may come from an extended Vandermonde matrix of a Vandermonde matrix corresponding to the second codebook, so that a linear independence feature can be maintained between a codeword in the third codebook and a codeword in the second codebook as much as possible. More valid redundant packets or check packets can be generated than those generated in a manner in which network coding is performed based on only the second codebook, and flexible code rates or code lengths can be supported; or flexible block lengths can be supported, or more original data packets can be efficiently encoded, to improve coding or decoding performance, thereby further improving system spectral efficiency or improving system reliability.

In another possible design solution, that the first matrix and the second matrix satisfy a functional relationship includes: the first matrix is a matrix obtained after elementary transformation is performed on the second matrix. The elementary transformation includes either or both of elementary row transformation and elementary column transformation.

The elementary row transformation includes one or more of the following: (1) multiplying a non-zero value by a row of a matrix; (2) multiplying a row of a matrix by c, and adding a result of the multiplication to another row, where c is any number; and (3) exchanging positions of any two rows in a matrix.

Similarly, the elementary column transformation includes one or more of the following: (1) multiplying a non-zero value by a column of a matrix; (2) multiplying a column of a matrix by c to add to another column, where c is any number; and (3) exchanging positions of any two columns in a matrix.

The following uses two examples for description.

Example 7

The second matrix of satisfies $$V_0 = \begin{bmatrix} a_1^0 & a_2^0 & \ldots & a_m^0 & \ldots & a_q^0 \\ a_1^1 & a_2^1 & \ldots & a_m^1 & \ldots & a_q^1 \\ \vdots & \vdots & \ddots & \vdots & \ddots & \vdots \\ a_1^l & a_2^l & \ldots & a_m^l & \ldots & a_q^l \\ \vdots & \vdots & \ddots & \vdots & \ddots & \vdots \\ a_1^{K-1} & a_2^{K-1} & \ldots & a_m^{K-1} & \ldots & a_q^{K-1} \end{bmatrix},$$

and the first matrix is a row transformation matrix of the second matrix. For example, the first matrix is a matrix obtained after the $i^{th}$ row and the $j^{th}$ row in the second matrix $V_0$ are exchanged, where $i \neq j$.

Example 8

The second matrix of satisfies $$V_0 = \begin{bmatrix} a_1^0 & a_2^0 & \ldots & a_m^0 & \ldots & a_q^0 \\ a_1^1 & a_2^1 & \ldots & a_m^1 & \ldots & a_q^1 \\ \vdots & \vdots & \ddots & \vdots & \ddots & \vdots \\ a_1^l & a_2^l & \ldots & a_m^l & \ldots & a_q^l \\ \vdots & \vdots & \ddots & \vdots & \ddots & \vdots \\ a_1^{K-1} & a_2^{K-1} & \ldots & a_m^{K-1} & \ldots & a_q^{K-1} \end{bmatrix}^T,$$

and the first matrix is a column transformation matrix of the second matrix. For example, the first matrix is a matrix obtained after the $i^{th}$ column and the $j^{th}$ column in the second matrix $V_0$ are exchanged, where $i \neq j$.

In Example 7 and Example 8, K is a quantity of original data packets corresponding to the first network coding or decoding, q is a field size of a finite field minus 1, $a_m$ is an element in the finite field, $1 \leq m \leq q$, $a_1, a_2, \ldots, a_m, \ldots, a_q$ are different elements in the finite field, $a_m^l$ is $a_m$ raised to the power of l, and $0 \leq l \leq K-1$.

In this way, the third codebook comes from an elementary transformation matrix of a matrix corresponding to the second codebook, and then a transformation operation is performed on the two matrices based on another matrix, so that a linear independence feature can be maintained between a codeword in the third codebook and a codeword in the second codebook as much as possible. More valid redundant packets or check packets can be generated than those generated in a manner in which network coding is performed based on only the second codebook, and flexible code rates or code lengths can be supported; or flexible block lengths can be supported, or more original data packets can be efficiently encoded, to improve coding or decoding performance, thereby further improving system spectral efficiency or improving system reliability.

Manner 4: A field size of a finite field corresponding to the first matrix is greater than a field size of a finite field corresponding to the second matrix. In this way, when the network coding is performed based on the first codebook, more valid redundant packets or check packets can be generated than those generated in a manner in which network coding is performed based on only the second codebook, and flexible code rates or code lengths can be supported; or flexible block lengths can be supported, or more original data packets can be efficiently encoded. Further, based on a feature of the third codebook, a linear independence feature may be maintained between codewords as much as possible, to improve coding or decoding performance, thereby improving system spectral efficiency or improving system reliability. The following uses Example 9 and Example 10 for description.

Example 9

That a field size of a finite field corresponding to the first matrix is greater than a field size of a finite field corresponding to the second matrix may include: the second matrix satisfies $$V_0 = \begin{bmatrix} a_1^0 & a_2^0 & \ldots & a_{q2}^0 \\ a_1^1 & a_2^1 & \ldots & a_{q2}^1 \\ \vdots & \vdots & \ddots & \vdots \\ a_1^{K-1} & a_2^{K-1} & \ldots & a_{q2}^{K-1} \end{bmatrix},$$

the first matrix satisfies $$V_1 = \begin{bmatrix} c_1^0 & c_2^0 & \ldots & c_{q1}^0 \\ c_1^1 & c_2^1 & \ldots & c_{q1}^1 \\ \vdots & \vdots & \ddots & \vdots \\ c_1^{K-1} & c_2^{K-1} & \ldots & c_{q1}^{K-1} \end{bmatrix},$$

and a field size $Q_1$ of a finite field in which $[c_1, c_2, \ldots, c_{q_1}]$ is located is greater than a field size $Q_2$ of a finite field in which $[a_1, a_2, \ldots, a_{q_2}]$ is located. Alternatively, the second matrix satisfies $$V_0 = \begin{bmatrix} a_1^0 & a_2^0 & \ldots & a_{q2}^0 \\ a_1^1 & a_2^1 & \ldots & a_{q2}^1 \\ \vdots & \vdots & \ddots & \vdots \\ a_1^{K-1} & a_2^{K-1} & \ldots & a_{q2}^{K-1} \end{bmatrix}^T,$$

the first matrix satisfies $$V_1 = \begin{bmatrix} c_1^0 & c_2^0 & \ldots & c_{q1}^0 \\ c_1^1 & c_2^1 & \ldots & c_{q1}^1 \\ \vdots & \vdots & \ddots & \vdots \\ c_1^{K-1} & c_2^{K-1} & \ldots & c_{q1}^{K-1} \end{bmatrix}^T,$$

and a field size $Q_1$ of a finite field in which $[c_1, c_2, \ldots, c_{q_1}]^T$ is located is greater than a field size $Q_2$ of a finite field in which $[a_1, a_2, \ldots, a_{q_2}]^T$ is located. K is a quantity of original data packets corresponding to the first network coding or decoding, $q_1 = Q_1 - 1$, $q_2 = Q_2 - 1$, $a_1, a_2, \ldots, a_{q_2}$ are different elements in the finite field whose field size is $Q_2$, and $c_1, c_2, \ldots, c_{q_1}$ are different elements in the finite field whose field size is $Q_1$. In this way, the third codebook and the second codebook correspond to different finite fields, and the codebooks are extended in a number field dimension. More valid redundant packets or check packets can be generated than those generated in a manner in which network coding is performed based on only the second codebook, and flexible code rates or code lengths can be supported; or flexible block lengths can be supported, or more original data packets can be efficiently encoded, to improve coding or decoding performance, thereby further improving system spectral efficiency or improving system reliability.

It should be noted that the foregoing four manners of obtaining the first matrix and a plurality of specific implementations in one or more of the manners may be separately performed, or may be performed in combination. This is not limited in this embodiment of this application, provided that it can be ensured that more valid redundant packets or check packets are generated based on the third codebook that is determined based on the first matrix. In other words, any combination solution is feasible, provided that a rank of a matrix corresponding to the first codebook can be increased or linear independence between codewords in the first codebook can be improved.

In this embodiment of this application, after the first matrix is obtained in one or more of Manner 1 to Manner 4, a corresponding extension codeword may be determined based on the first matrix, to determine the third codebook. The following provides detailed descriptions with reference to Example 11.

Example 11

It is assumed that the first matrix determined in one or more of Manner 1 to Manner 4 is a matrix $V_1$, an extension codeword may be determined with reference to the first method for determining a base codebook (refer to the section of technical terms).

Specifically, $V_1$ may be represented in a form of $V_1 = [A_1|B_1]$, or a submatrix with K rows in $V_1$ may be represented in a form of $[A_1|B_1]$, where K is a quantity of original data packets corresponding to the first network coding or decoding, $A_1$ is a submatrix with K rows and K columns in $V_1$, $B_1$ is a submatrix with K rows and F columns in $V_1$, a column vector of $B_1$ and a column vector of $A_1$ are different column vectors from $V_1$, a sum of K and F is a total quantity of columns in $V_1$, and F may be unequal to K. Therefore, a reverse matrix $A_1^{-1}$ of $A_1$ may be used to transform $V_1$ to obtain a combination of a unit matrix I and a submatrix, that is, $A_1^{-1}$ may be left-multiplied by $V_1$ to obtain a generator matrix $A_1^{-1}V_1=[I|A_1^{-1}B_1]=[I|G_1]$ corresponding to a system RS code, where a unit matrix I of K×K dimensions corresponds to a coding coefficient of a system packet, a matrix $G_1=A_1^{-1}B_1$ corresponds to a coding coefficient of a redundant packet or a check packet, and the coding coefficient vector corresponding to each column in $G_1$ is an extension codeword.

Optionally, the extension codeword may be determined according to the second method for determining a base codebook (refer to the section of technical terms), that is, each row or each column in $V_1$ is directly used as the extension codewords.

Alternatively, optionally, $A_0^{-1}$ may be left-multiplied by $V_1$ based on an inverse matrix $A_0^{-1}$ of a submatrix $A_0$ in a matrix $V_0$ corresponding to a base codeword and the first matrix $V_1$ obtained in one or more of Manners 1 to 4, to obtain a matrix $G_1=A_0^{-1}V_1$. Therefore, the coding coefficient vector corresponding to each column in $G_1$ is an extension codeword.

Optionally, the extension codeword obtained in Example 11 may be extended into the first codebook as a codeword, to increase a quantity of codewords, or some or all of elements in the extension codeword are extended into a codeword in the second codebook, to increase a length of the codeword. For specific implementation, refer to the following extension rule 1 and extension rule 2.

Step 3: Generate a first codebook based on the second codebook, the third codebook, and an extension rule.

The extension rule may include the following extension rule 1 and extension rule 2. Details are described below.

Extension rule 1: The first codebook includes a codeword in the third codebook, the third codebook is different from the second codebook, and the second codebook is used to perform second network coding or decoding. In other words, the first codebook is a codebook obtained by adding some or all codewords in the third codebook based on the second codebook. In this case, the second codebook may be referred to as a base codebook of the first codebook, and the first codebook may be referred to as an extension codebook of the second codebook.

Specifically, the first codebook may be a codebook, and the codebook includes a codeword in the second codebook and some or all of the codewords in the third codebook. The following provides detailed descriptions by using Example 11.

Example 11

It is assumed that the second codebook is a base codebook shown in Table 1, and the third codebook is a codebook determined in one or more of Manner 1 to Manner 4. If $[g'_{0,1}\ g'_{0,2} \cdots g'_{0,K}]_{K\times 1}^T$ represents a first extension codeword in the third codebook, $[g'_{1,1}\ g'_{1,2} \cdots g'_{1,K}]_{K\times 1}^T$ represents a second extension codeword, . . . , and $[g'_{r',1}\ g'_{r',2} \cdots g'_{r',K}]_{K\times 1}^T$ represents a $(r'+1)^{th}$ extension codeword, Table 4 shows that the first codebook is a codebook obtained after codewords are extended in the base codebook. r is a natural number, $0 \leq r \leq q-K-1$, and r' is a positive integer.

It should be noted that Table 4 shows only a case in which codewords in the third codebook are added to the end of the second codebook. In actual application, there may be another implementation. For example, one or more codewords in the third codebook may be inserted before and/or after any codeword in the second codebook. This is not limited in this embodiment of this application.

TABLE 4

| Index | Coefficient vector |
|---|---|
| 0 | $[g_{0,1}\ g_{0,2} \cdots g_{0,K}]_{K\times 1}^T$ |
| 1 | $[g_{1,1}\ g_{1,2} \cdots g_{1,K}]_{K\times 1}^T$ |
| . | . |
| . | . |
| . | . |
| r | $[g_{r,1}\ g_{r,2} \cdots g_{r,K}]_{K\times 1}^T$ |
| r + 1 | $[g'_{0,1}\ g'_{0,2} \cdots g'_{0,K}]_{K\times 1}^T$ |
| r + 2 | $[g'_{1,1}\ g'_{1,2} \cdots g'_{1,K}]_{K\times 1}^T$ |
| . | . |
| . | . |
| . | . |
| r + r' + 1 | $[g'_{r',1}\ g'_{r',2} \cdots g'_{r',K}]_{K\times 1}^T$ |

Alternatively, the first codebook may include two sub-codebooks, where one sub-codebook includes a codeword in the second codebook, and the other sub-codebook includes some or all of the codewords in the third codebook. This is not specifically limited herein. The following provides detailed descriptions by using Example 12.

Example 12

It is assumed that the second codebook is a base codebook shown in Table 1, and the third codebook is a codebook determined in one or more of Manner 1 to Manner 4. If $[g'_{0,1}\ g'_{0,2} \cdots g'_{0,K}]_{K\times 1}^T$ represents a first extension codeword in the third codebook, $[g'_{1,1}\ g'_{1,2} \cdots g'_{1,K}]_{K\times 1}^T$ represents a second extension codeword, . . . , and $[g'_{r',1}\ g'_{r',2} \cdots g'_{r',K}]_{K\times 1}^T$ represents a $(r'+1)^{th}$ extension codeword, the first codebook may include two sub-codebooks: One sub-codebook is the base codebook (that is, the second codebook) shown in Table 1, and the other sub-codebook is the third codebook shown in Table 5. r' is a positive integer.

TABLE 5

| Index | Coefficient vector |
|---|---|
| 0 | $[g'_{0,1}\ g'_{0,2} \cdots g'_{0,K}]_{K\times 1}^T$ |
| 1 | $[g'_{1,1}\ g'_{1,2} \cdots g'_{1,K}]_{K\times 1}^T$ |
| . | . |
| . | . |
| . | . |
| r' | $[g'_{r',1}\ g'_{r',2} \cdots g'_{r',K}]_{K\times 1}^T$ |

It should be noted that Example 11 and Example 12 show only a case in which a length of a codeword in the third codebook is equal to a length of a codeword in the second codebook. Actually, when the codebook is extended by using the extension rule 1, a length of a vector in the first matrix obtained in the four manners in step 1 may also be greater than the length of the codeword in the second codebook. When the length of the vector in the first matrix is greater than the length s of the codeword in the second codebook, any K elements may be selected from a vector in the first matrix to form an extension codeword, for example, first s elements, last s elements, middle consecutive s elements, or random s elements are selected.

Extension rule 2: Any codeword in the first codebook includes: s elements in one codeword in the second codebook, where s is a length of one codeword in the second codebook, and s is a positive integer; and all elements or some elements in one codeword in the third codebook or one codeword in the second codebook, where a quantity of all the elements is a length of one codeword in the third codebook or the second codebook, and values of different elements in the codeword are the same or different. In other words, any codeword in the first codebook is extended by adding an element included in one codeword to the second codebook, and the added element may come from one codeword in the third codebook, or may come from any codeword in the second codebook. In this case, the second codebook may be referred to as a base codebook of the first codebook, and the first codebook may be referred to as an extension codebook of the second codebook.

Specifically, the first codebook may be a codebook, and a length of any codeword in the codebook is greater than a length of any codeword in the second codebook. The following provides detailed descriptions by using Example 13 and Example 14.

Example 13

It is assumed that the second codebook is a base codebook shown in Table 1, and the third codebook is a codebook determined in one or more of Manner 1 to Manner 4. If $[g'_{0,1} \ g'_{0,2} \cdots g'_{0,K}]_{K \times 1}^T$ represents a first extension codeword in the third codebook, $[g'_{1,1} \ g'_{1,2} \cdots g'_{1,K}]_{K \times 1}^T$ represents a second extension codeword, . . . , and $[g'_{r',1} \ g'_{r',2} \cdots g'_{r',K}]_{K \times 1}^T$ represents a $(r'+1)^{th}$ extension codeword, the first codebook may be a codebook shown in Table 6. For example, codewords corresponding to an index of 0 in Table 6 include a codeword corresponding to an index of 0 in Table 1 and a first extension codeword in the third codebook, that is, a length of a codeword in Table 6 is a sum of a length of a codeword in the second codebook and a length of a codeword in the third codebook. In Table 6, a length of a codeword in the second codebook and a length of a codeword in the third codebook are both K, and therefore a length of a codeword in the first codebook is 2*K. r is a natural number, and r' is a positive integer.

Optionally, during extension of a codeword length, some elements in a codeword in the third codebook may be further extended into a codeword in the second codebook, to generate a codeword in the first codebook, as shown in Example 14.

Example 14

It is assumed that the second codebook is the second codebook in Example 13, and the third codebook is the third codebook in Example 13. Table 7 shows a case in which K' (0<K'≤K) elements in a codeword in the third codebook are extended into a codeword in the second codebook, to generate a codeword in the first codebook. r is a natural number, and r' is a positive integer.

TABLE 6

| Index | Coefficient vector |
|---|---|
| 0 | $[g_{0,1} \ g_{0,2} \cdots g_{0,K} \ g'_{0,1} \ g'_{0,2} \cdots g'_{0,K}]_{2K \times 1}^T$ |
| 1 | $[g_{1,1} \ g_{1,2} \cdots g_{1,K} \ g'_{1,1} \ g'_{1,2} \cdots g'_{1,K}]_{2K \times 1}^T$ |
| . | . |
| . | . |
| . | . |
| r | $[g_{r,1} \ g_{r,2} \cdots g_{r,K} \ g'_{r,1} \ g'_{r,2} \cdots g'_{r,K}]_{2K \times 1}^T$ |

TABLE 7

| Index | Coefficient vector |
|---|---|
| 0 | $[g_{0,1} \ g_{0,2} \cdots g_{0,K} \ g'_{0,1} \ g'_{0,2} \cdots g'_{0,K'}]_{K+K'}^T$ |
| 1 | $[g_{1,1} \ g_{1,2} \cdots g_{1,K} \ g'_{1,1} \ g'_{1,2} \cdots g'_{1,K'}]_{K+K'}^T$ |
| . | . |
| . | . |
| . | . |
| r | $[g_{r,1} \ g_{r,2} \cdots g_{r,K} \ g'_{r,1} \ g'_{r,2} \cdots g'_{r,K'}]_{K+K'}^T$ |

Optionally, when the codeword length is extended, a codeword in the second codebook may be further copied and extended into a codeword in the second codebook, to generate a codeword in the first codebook, as shown in Example 15.

Example 15

It is assumed that the second codebook is the second codebook in Example 13, and the third codebook is also the second codebook in Example 13. Table 8 shows a case in which a codeword in the second codebook is copied and extended into a codeword in the second codebook, to generate a codeword in the first codebook. r is a natural number.

TABLE 8

| Index | Coefficient vector |
|---|---|
| 0 | $[g_{0,1} \ g_{0,2} \cdots g_{0,K} \ g_{0,1} \ g_{0,2} \cdots g_{0,K}]_{2K \times 1}^T$ |
| 1 | $[g_{1,1} \ g_{1,2} \cdots g_{1,K} \ g_{1,1} \ g_{1,2} \cdots g_{1,K}]_{2K \times 1}^T$ |
| . | . |
| . | . |
| . | . |
| r | $[g_{r,1} \ g_{r,2} \cdots g_{r,K} \ g_{r,1} \ g_{r,2} \cdots g_{r,K}]_{2K \times 1}^T$ |

It should be noted that Example 13 to Example 15 merely show a case in which some or all elements of an extension codeword are added to the end of the codeword in the second codebook, but embodiments of this application are not limited thereto. Actually, one or more elements in a corresponding extension codeword may be added before and/or after any element in a codeword in the second codebook.

In addition, one element in the foregoing codeword is one member in the codeword, and values of different members may be the same or may be different. This is not specifically limited herein.

For example, the codeword in the second codebook may be one or more of the following: a Reed-Solomon RS code, a maximum distance separable MDS code, a low density parity check LDPC code, and a Bose-Chaudhuri-Hocquenghem BCH code. In this way, the codeword having a structural characteristic may be extended to design a third codebook that is as linearly independent as possible of the codeword. More valid redundant packets or check packets can be generated than those generated in a manner in which network coding is performed based on only the second codebook, and flexible code rates or code lengths can be supported; or flexible block lengths can be supported, or more original data packets can be efficiently encoded, to improve coding or decoding performance, thereby further improving system spectral efficiency or improving system reliability.

S802: Perform first network coding or decoding based on the first codebook.

The first codebook is obtained based on the method provided in S801, and there may be a plurality of methods for generating an encoded data packet. The following uses four types of codes that are shown in FIG. 9 to FIG. 12 as examples for description: a system block code, a non-system block code, a systematic convolutional code, and a non-systematic convolutional code.

FIG. 9 to FIG. 12 show structures of generator matrices of various types of codes. A row vector formed by original data packets is left-multiplied by a generator matrix. Each solid box indicates a coding coefficient corresponding to an encoded data packet of each block (BLK), a quantity of columns corresponds to a quantity of encoded data packets of each block, and a quantity of rows corresponds to a quantity of original data packets of each block. The following methods for generating encoded data packets based on the first codebook are all applicable to the foregoing different types of codes.

It should be noted that, for a system block code or systematic convolutional code, a corresponding generator matrix includes a unit submatrix, that is, a generated encoded data packet includes a system packet. For specific implementation, refer to the description of a "system packet" in the NC background and term introduction.

In addition, for a non-system block code or non-systematic convolutional code, a corresponding generator matrix does not include a unit submatrix, that is, the generated encoded data packet does not include system packets that are in a one-to-one correspondence with all original packets. The following uses the system block code shown in FIG. 9 as an example for detailed description. For the other three types of codes shown in FIG. 10 to FIG. 12, refer to the description of a system block code shown in FIG. 9.

First, start codewords used by generator matrices Gs corresponding to the redundant parts in the blocks are the same, that is, the first columns in different Gs include a same codeword in a same codebook. For example, the first column of any G is a coding coefficient vector corresponding to an index of 0 in the codebook, and the subsequent columns are sequentially coefficient vectors corresponding to indexes of 1, 2, . . . .

Secondly, each encoded data packet is associated with an index corresponding to a codeword by using a serial number (SN) of the encoded data packet. For example, the index is mod(SN,L), where mod(SN,L) is a remainder of SN divided by L, and L is a quantity of codewords included in the first codebook.

Then, different Gs use different redundant versions (RV). Specifically, adjacent Gs use different parts in the first codebook, so that the first codebook is divided into sub-codebooks that are in a one-to-one correspondence with a plurality of RVs. For example, the first codebook may be divided into four parts, where a part including codewords whose indexes are in a range of $[0, \lfloor W/4 \rfloor)$ corresponds to RV0, a part including codewords whose indexes are in a range of $[\lfloor W/4 \rfloor, 2*\lfloor W/4 \rfloor)$ corresponds to RV1, a part including codewords whose indexes are in a range of $[2*\lfloor W/4 \rfloor, 3*\lfloor W/4 \rfloor)$ corresponds to RV2, a part including codewords whose indexes in a range of $[3*\lfloor W/4 \rfloor, W)$ corresponds to RV4, and adjacent Gs use different RVs when generating encoded data packets. For example, $G_{n_1}$, $G_{n_2}$, and $G_{n_3}$ in FIG. 9 all correspond to codewords whose indexes are in the range of $[0, \lfloor W/4 \rfloor)$, where W is a total quantity of codewords in the first codebook, and indexes of the codewords are 0 to W−1.

It should be noted that, if the third codebook is not obtained by extending the length of the codeword based on the second codebook, that is, the third codebook is a newly added codebook, or a value range of an index used in the third codebook overlaps a value range of an index used in the second codebook, different Gs may use different codebooks. In this case, a codebook index used by the encoded data packet and a codeword index in the codebook used by the encoded data packet need to be indicated in the encoded data packet.

When any one of the foregoing encoded data packet generation manners is used, if all available codewords in the first codebook are traversed for a codeword used for a block, and more redundant packets or check packets need to be generated, more extension codewords may still be obtained according to the foregoing extension rule, or the codewords in the first codebook are cyclically used to generate more redundant packets or check packets.

Figure 13:
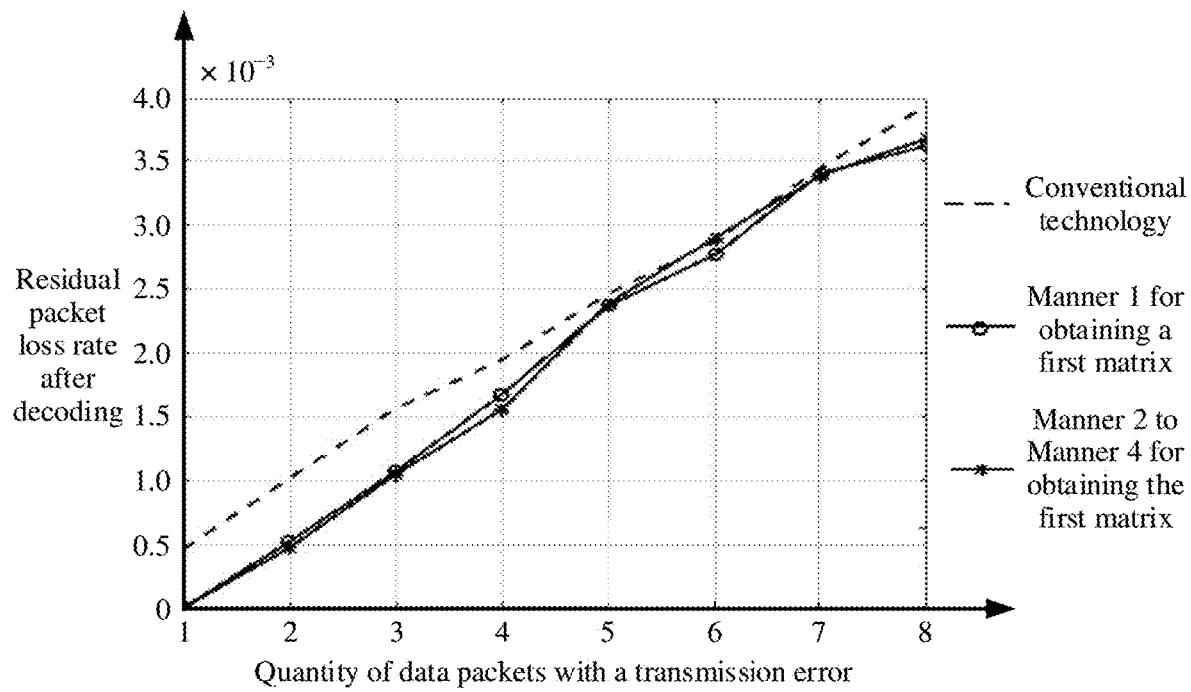
FIG. 13 is a schematic diagram 1 of an example performance comparison between the data processing method shown in FIG. 8 and an existing network coding or decoding method.

FIG. 13 is a schematic diagram 1 of a performance comparison between a network coding or decoding method according to an embodiment of this application and an existing network coding or decoding method. A horizontal coordinate indicates a quantity of data packets with a transmission error, and a vertical coordinate is a final residual packet loss rate after error correction is performed in a packet loss scenario by using different solutions. A person skilled in the art should understand that, under a same quantity of lost packets, a lower residual packet loss rate in different solutions indicates better coding or decoding performance, and improvement of coding or decoding performance can improve system spectral efficiency or improve system reliability. As shown in FIG. 13, a dashed line in the figure corresponds to an RLNC method in the conventional technology, a curve marked with a hollow circle corresponds to the method in Manner 1 of obtaining the first matrix, and a curve marked with an asterisk corresponds to the method in Manner 2 to Manner 4 of obtaining the first matrix. It can be learned that coding or decoding performance of the first codebook obtained according to the technical solution of this application is better than coding or decoding performance in the conventional technology.

Figure 14:
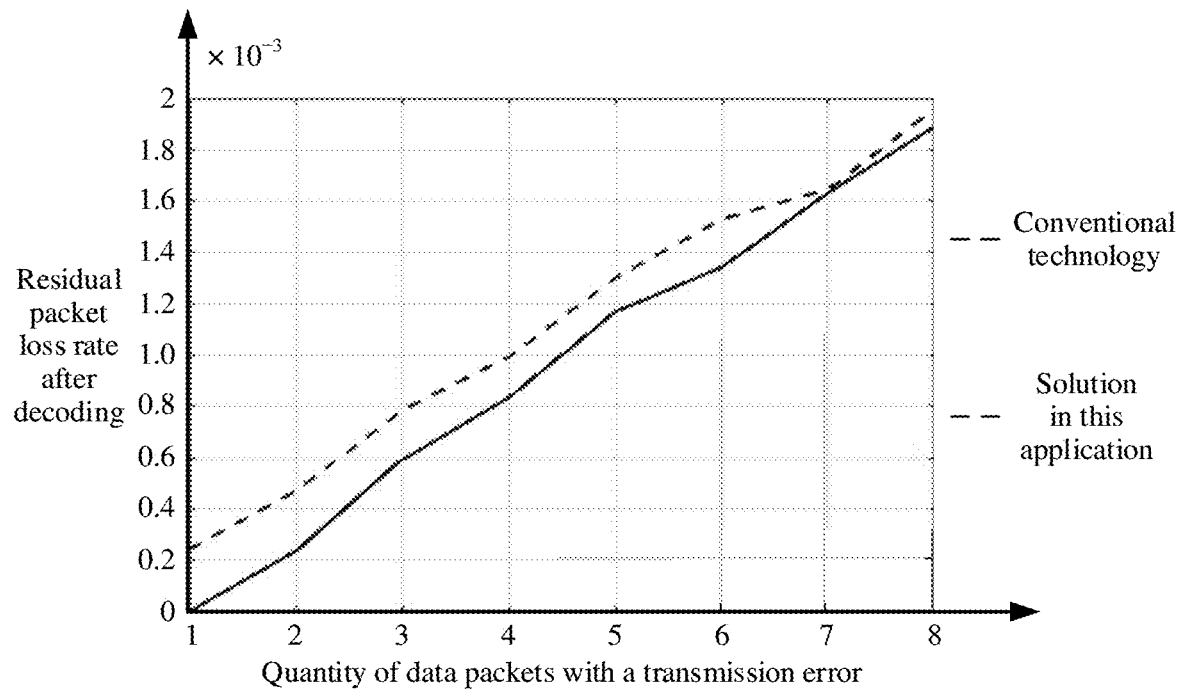
FIG. 14 is a schematic diagram 2 of an example performance comparison between the data processing method shown in FIG. 8 and an existing network coding or decoding method.

FIG. 14 is a schematic diagram 2 of a performance comparison between a network coding or decoding method according to an embodiment of this application and an existing network coding or decoding method. It may be understood that the first codebook is designed based on the second codebook and the extension rule from a perspective of codeword dimension extension, so that a linear independence feature can be maintained between codewords in the first codebook as much as possible. Because a length of a codeword in the first codebook is greater than a length of a codeword in the second codebook, flexible block lengths can be supported, or network coding or decoding can be performed on more original data packets. As shown in FIG. 14, a horizontal coordinate indicates a quantity of data packets with a transmission error, and a vertical coordinate is a final residual packet loss rate after error correction is performed in a packet loss scenario by using different solutions. A person skilled in the art should understand that, under a same quantity of lost packets, a lower residual packet loss rate in different solutions indicates better coding or decoding performance, and improvement of coding or decoding performance can improve system spectral efficiency or improve system reliability. A dashed line in the figure corresponds to an RLNC method in the conventional technology, and a solid line corresponds to the codeword length extension method according to embodiments of this application. It can be learned that a relatively good linear independence feature can be maintained between codewords in the first codebook by using the codeword length extension method according to embodiments of this application, and flexible block lengths can be supported, or more original data packets can be encoded or decoded.

Based on the data processing method shown in FIG. 8, codebook extension may be implemented by increasing a codeword quantity and/or increasing a codeword size, so that more valid redundant packets or check packets can be generated, and flexible code rates or code lengths can be supported, or flexible block lengths can be supported, or more original data packets can be efficiently encoded, to improve coding or decoding performance, thereby improving system spectral efficiency or improving system reliability.

It should be noted that the data processing method shown in FIG. 8 is applicable to network coding or decoding at a fixed code rate or a fixed block length, for example, network coding or decoding based on a block code, and is also applicable to network coding or decoding at a non-fixed code rate or a non-fixed block length (also referred to as a variable code rate or a variable block length), for example, network coding or decoding based on a variable convolutional coding depth.

It is assumed that a length of a codeword in a predefined codebook is less than a quantity of original data packets, that is, a quantity of coding coefficients of the predefined codeword is less than the quantity of the original data packets. In this case, the original data packets cannot be encoded based on the codebook. A person skilled in the art should understand that, regardless of whether the codebook uses a block code or a convolutional code, such a problem may exist.

To resolve this problem, an embodiment of this application provides another data processing method. For details, refer to the data processing method shown in FIG. 15. The method may be performed by a transmitter device (for example, a terminal device or a network device), or may be performed by a component of the transmitter device, for example, a processor, a chip, or a chip system of the transmitter device, to complete network coding, generate an encoded data packet, and send the encoded data packet. Alternatively, the method may be performed by a receiver device (for example, a terminal device or a network device), or may be performed by a component of the receiver device, for example, a processor, a chip, or a chip system of the receiver device, to receive an encoded data packet from the transmitter device, and complete network decoding, so as to restore an original data packet.

Figure 15:
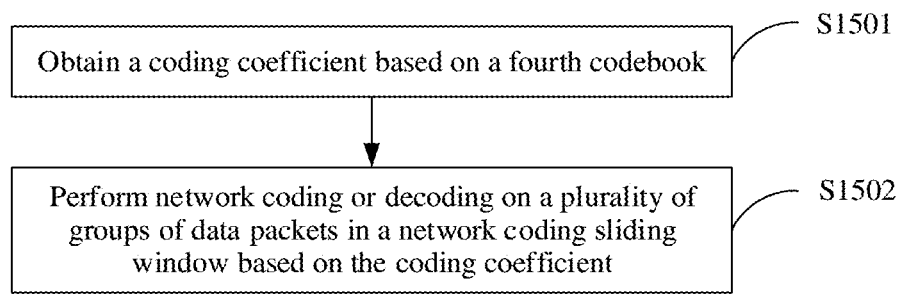
FIG. 15 is a schematic flowchart 2 of an example data processing method according to an embodiment of this application.

As shown in FIG. 15, the method includes the following steps.

S1501: Obtain a coding coefficient based on a fourth codebook.

The fourth codebook may be one or more of the first codebook, the second codebook, or the third codebook described above, or may be a codebook obtained in another manner, for example, a codebook predefined in a protocol, a codebook pre-stored in a transmitter device and a receiver device, or a codebook pre-configured by a network device. This is not limited in this embodiment of this application.

Optionally, a length of any codeword in the fourth codebook is less than a total quantity of data packets in the plurality of groups of original data packets, and is greater than or equal to a quantity of data packets in any group of data packets in the plurality of groups of original data packets. The plurality of groups of original data packets belong to a same network coding sliding window, and the plurality of groups of original data packets include data packets from an upper-layer protocol layer of a network coding protocol layer, and need to participate in network coding for generating encoded data packets and being sent.

In this embodiment of this application, an operation of dividing all original data packets in a same network coding sliding window into blocks may be performed by a protocol layer that performs network coding, or may be performed by a higher layer of a protocol layer that performs network coding. In addition, quantities of original data packets included in different blocks may be the same or may be different. This is not limited.

For example, it is assumed that C original data packets in a network coding sliding window need to be grouped into D blocks. A quantity of original data packets included in one block may be $\lceil C/D \rceil$. When C is not divisible by D, different packets can include different quantities of original data packets.

In actual application, the operation of dividing the original data packets into blocks may alternatively be completed in another manner. This is not limited in this application. For example, in a retransmission scenario, original data packets corresponding to a transmission may include initially transmitted data packets and data packets that are incorrectly transmitted previously.

The coding coefficient includes a plurality of groups of elements, the plurality of groups of elements are in a one-to-one correspondence with a plurality of groups of original data packets, any group of elements in the plurality of groups of elements come from one codeword in the fourth codebook, and any two groups of elements come from different codewords in the fourth codebook. The coding coefficient may be represented in a form of a matrix, that is, a coding coefficient matrix. In this case, a group of elements may correspond to one coding coefficient vector, and the coding coefficient vector corresponds to one codeword in the fourth codebook.

The following provides detailed descriptions with reference to a matrix decomposition idea.

Because a maximum dimension of a codeword in the fourth codebook is limited, if a quantity of original data packets that need to be encoded exceeds a maximum dimension of a codeword, especially for convolutional network coding, if better system performance is obtained by using an adaptive convolution depth based on channel quality, the adaptive convolution depth may flexibly change a quantity of original data packets that are encoded. If the quantity of original data packets exceeds a length of a codeword in the fourth codebook, a generator matrix may be decomposed to obtain a plurality of submatrices, and each submatrix includes a corresponding codeword in the fourth codebook.

Figure 16:
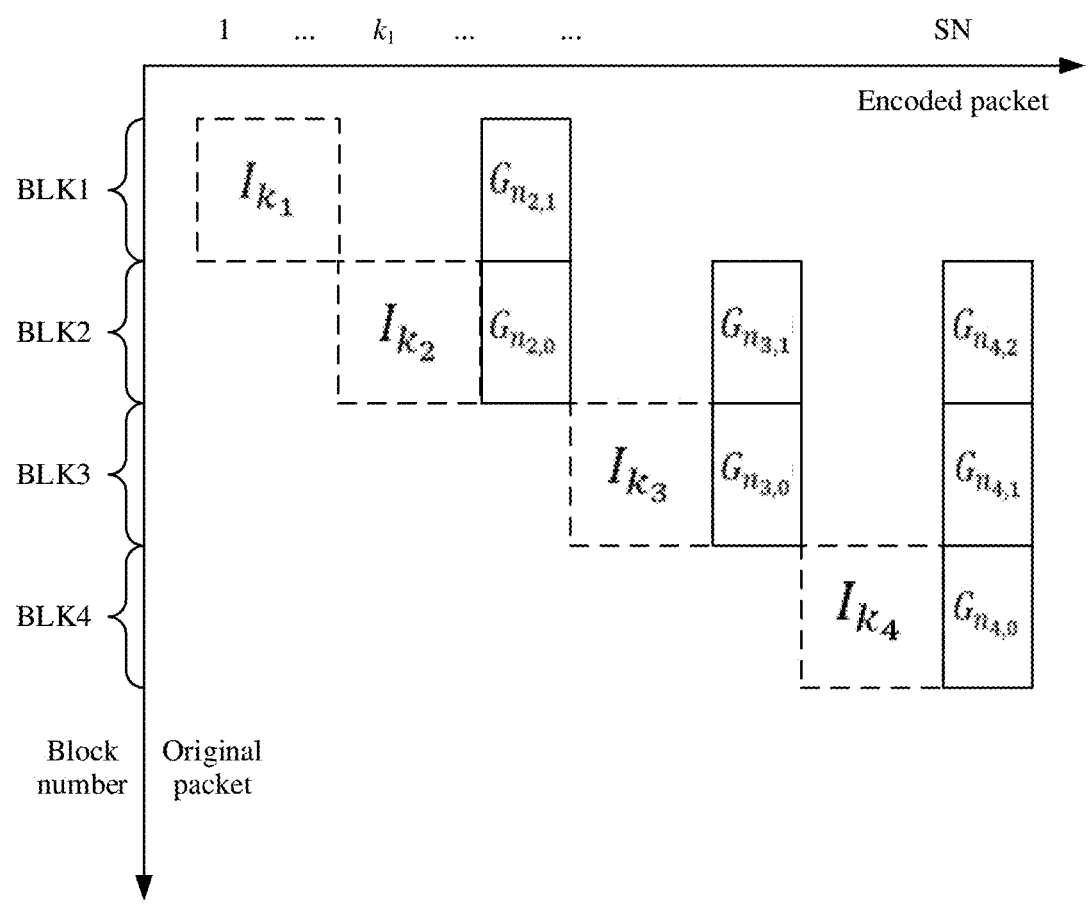
FIG. 16 is a schematic diagram 1 of an example scenario to which the data processing method shown in FIG. 15 is applicable.
Figure 17:
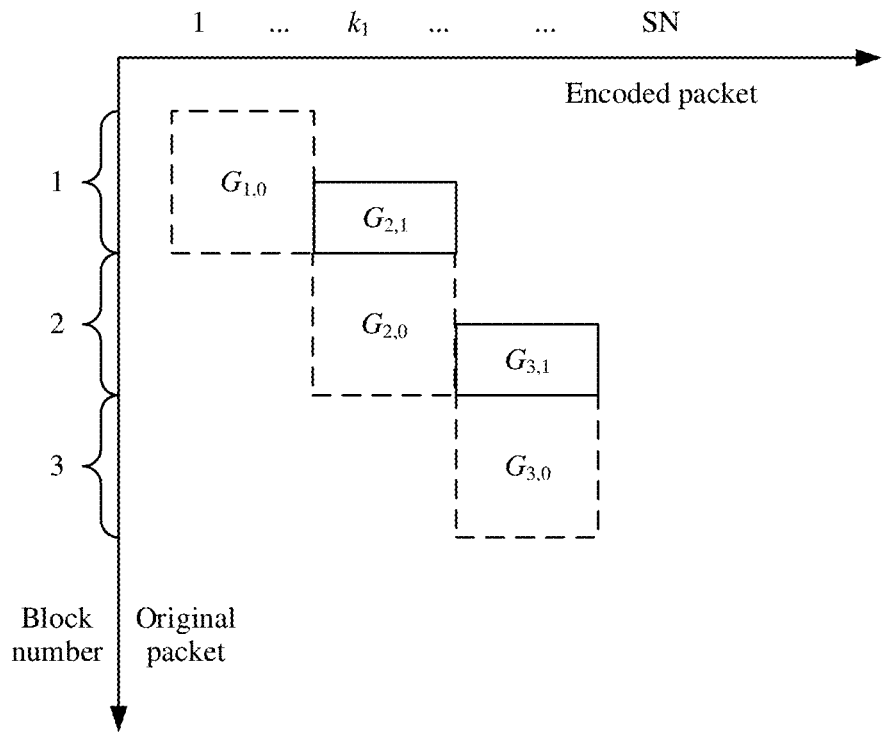
FIG. 17 is a schematic diagram 2 of an example scenario to which the data processing method shown in FIG. 15 is applicable.
Figure 18:
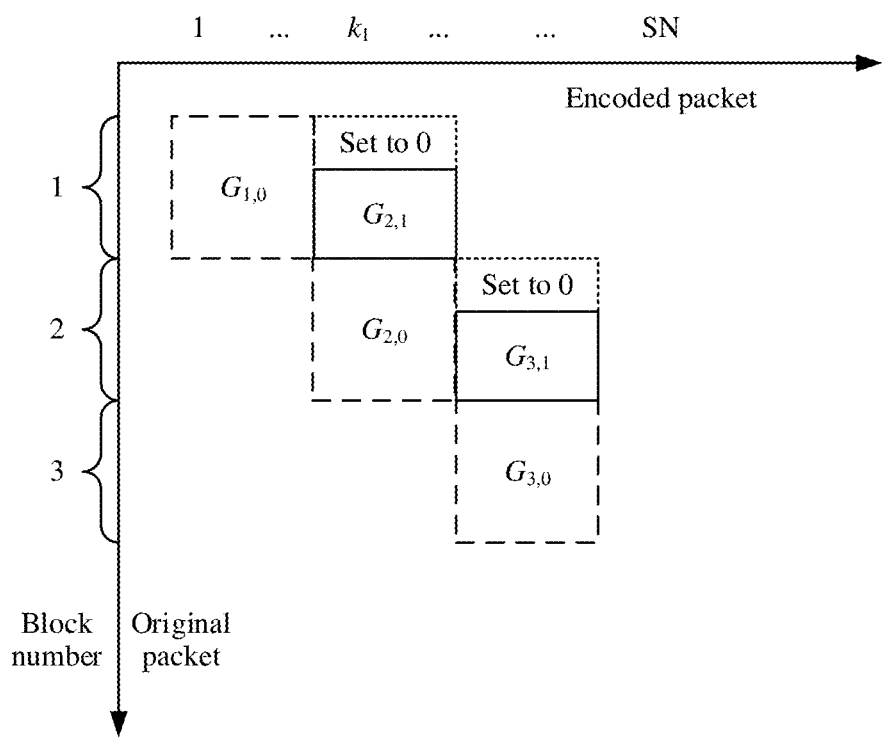
FIG. 18 is a schematic diagram 3 of an example scenario to which the data processing method shown in FIG. 15 is applicable.

FIG. 16 is a schematic exploded view of a generator matrix of a redundant part of a systematic convolutional network code according to an embodiment of this application. FIG. 17 and FIG. 18 are respectively a schematic exploded view 1 and a schematic exploded view 2 of a non-systematic convolutional code generator matrix according to embodiments of this application.

As shown in FIG. 16, BLKb (b=1, 2, 3, . . . ) is used in vertical coordinates in the figure to identify different data blocks, that is, b is an index of the BLK. Different data blocks are different original data packet sets. Quantities of original data packets included in the data blocks may be different. A horizontal coordinate in the figure corresponds to a serial number SN of an encoded data packet. Each dashed-line box in the figure corresponds to a generator matrix of an encoded data packet, and a dashed-line box represented by $I_{k_b}$ in the figure represents a generator matrix of a system packet corresponding to an original packet in the BLK b, that is a unit matrix, where $k_b$ represents a quantity of original data packets included in the BLK b, and a generator matrix corresponding to the redundant packet in FIG. 16 is a solid box in the figure. Original data packets in a network coding sliding window may include original data packets in a plurality of data blocks. For example, redundant packets corresponding to a data block BLK2 in FIG. 16 may be generated by encoding original data packets in the BLK2 and original data packets of a historical data block (for example, the BLK1). In this case, $G_{n_2,0}$ and $G_{n_2,1}$ in the figure form a generator matrix (if represented by G) with a structure shown in FIG. 16, that is, the generator matrix of the redundant packet corresponding to the BLK2. Because a quantity of original data packets in the BLK2 or the BLK1 is less than the length of any codeword in the fourth codebook, that is, a quantity of coding elements corresponding to any codeword in the fourth codebook is less than a total quantity of original data packets included in the plurality of BLKs, the fourth codebook is no longer applicable to convolutional coding or decoding of the plurality of BLKs. In this case, it may be considered that the matrix G is formed by a plurality of submatrices, that is, a generator matrix of a redundant packet corresponding to BLK2 is formed by $G_{n_2,0}$ and $G_{n_2,1}$. $G_{n_2,0}$ corresponds to a coding coefficient corresponding to an original data packet in the BLK2, $G_{n_2,1}$ corresponds to a coding coefficient corresponding to an original data packet in the BLK1, each column in $G_{n_2,0}$ may correspond to one codeword in the fourth codebook, each column in $G_{n_2,1}$ may correspond to one codeword in the fourth codebook, and a coding coefficient vector corresponding to each column in the generator matrix G formed by combining $G_{n_2,0}$ and $G_{n_2,1}$ corresponds to a coding coefficient vector of a redundant packet corresponding to the BLK2. Further, a matrix (if represented by G) formed by submatrices $G_{n_b,0}$, $G_{n_b,1}$, and $G_{n_b,2}$ ... represents a generator matrix of an encoded data packet corresponding to the BLK b, and a coding coefficient vector corresponding to each column in the matrix G represents a coding coefficient vector corresponding to an encoded data packet, where np represents a quantity of columns in G, that is, a quantity of encoded data packets corresponding to the BLK b. A quantity of submatrices included in the matrix G depends on a convolutional network coding depth, and the convolutional network coding depth may be fixed, semi-statically configured, or dynamically changed, which is not limited herein.

Still refer to FIG. 16. The generator matrix of the redundant packet part is further decomposed into at least two submatrices. The decomposition may be performed based on BLKs obtained through division. In other words, encoded data packets are generated by encoding original data packets of a plurality of BLKs. In this case, the submatrix obtained after the generator matrix is decomposed is corresponding to each BLK, and the submatrix is formed by coding coefficient vectors corresponding to codewords in the fourth codebook.

S1502: Perform network coding or decoding on a plurality of groups of original data packets in a network coding sliding window based on the coding coefficient.

In a possible design solution, in different network coding sliding windows, coding coefficients corresponding to a same group of data packets are different from each other, that is, codewords corresponding to the coding coefficients in the fourth codebook are different from each other. In this way, flexible block lengths can be supported, or more original data packets can be efficiently encoded, to improve coding or decoding performance, thereby improving system spectral efficiency or improving system reliability.

Optionally, for a same BLK, indexes of codewords corresponding to the coding coefficients in the submatrix in the fourth codebook may be sequentially arranged. As shown in FIG. 16, it is assumed that any $G_{n_b,0}$ or $G_{n_b,1}$ corresponds to $p_0$ encoded data packets (a quantity of columns in $G_{n_b,i}$, where i is a natural number), $G_{n_b+1,1}$ or $G_{n_b+1,0}$ corresponds to $p_1$ encoded data packets (a quantity of columns in $G_{n_b+1,i}$). That the indexes of the codewords in the fourth codebook corresponding to the coding coefficients in the submatrix are sequentially arranged may be understood that coding coefficients corresponding to $G_{n_b,0}$ correspond to codewords whose codeword indexes range from 0 to $p_0-1$ in the fourth codebook, coding coefficients corresponding to $G_{n_b+1,1}$ correspond to codewords whose codeword indexes range from $p_0$ to $p_0+p_1-1$ in the fourth codebook, and if $G_{n_b+2,2}$ also exists, that is, when a same BLK is encoded for a plurality of times, codewords in the fourth codebook may be sequentially used.

Refer to FIG. 16. The BLK2 is used as an example. Original data packets in the BLK2 participate in coding of three network coding sliding windows. The first network coding window in which the original data packets in the BLK2 participate includes the original data packets in the BLK2 and the BLK1, the second network coding window in which the original data packets in the BLK2 participate includes the original data packets in the BLK3 and the BLK2, and the third network coding window in which the original data packets in the BLK2 participate includes the original data packets in the BLK4, the BLK3, and the BLK2. The coding coefficient matrices corresponding to the original data packets in the BLK2 in the three network coding windows are respectively $G_{n_2,0}$, $G_{n_3,1}$, and $G_{n_4,2}$. Assuming that the quantity of columns in $G_{n_2,0}$ is 3, that is, the quantity of redundant packets corresponding to the BLK2 is 3, codeword indexes of corresponding coding coefficient vectors in the fourth codebook are 0 to 2. Assuming that the quantity of columns in $G_{n_3,1}$ is 4, that is, the quantity of redundant packets corresponding to the BLK3 is 4, codeword indexes of coding coefficient vectors corresponding to columns in $G_{n_3,1}$ in the fourth codebook are 3 to 6. Assuming that the quantity of columns in $G_{n_4,2}$ is 2, that is, the quantity of redundant packets corresponding to the BLK4 is 2, codeword indexes of coding coefficient vectors corresponding to columns in $G_{n_4,2}$ in the fourth codebook are 7 to 8.

In a possible design solution, in different network coding sliding windows, network coding or decoding is performed on a same group of data packets by using different redundant versions. In this way, flexible block lengths can be supported, or more original data packets can be efficiently encoded, to improve coding or decoding performance, thereby improving system spectral efficiency or improving system reliability.

Specifically, for a same block, different RV versions are used in different network coding windows. Optionally, the fourth codebook may be divided into a defined quantity of RV versions based on a defined quantity of RVs. For example, if the quantity of RVs is 4, in the fourth codebook, a codeword whose codeword index is in a range of [0, $\lfloor W/4 \rfloor$) belongs to RV0, a codeword whose codeword index is in a range of [$\lfloor W/4 \rfloor$, $2*\lfloor W/4 \rfloor$) belongs to RV1, a codeword whose codeword index is in a range of [$2*\lfloor W/4 \rfloor$, $3*\lfloor W/4 \rfloor$) belongs to RV2, a codeword whose codeword index is in a range of [$3*\lfloor W/4 \rfloor$, W) belongs to RV4, submatrices of a same BLK in different network coding sliding windows use different RV versions, and submatrices of different BLKs in a same network coding sliding window (corresponding to a same column in FIG. 16 to FIG. 18) use different RV versions. W is the total quantity of codewords, and the codeword indexes are 0 to W−1. Specifically, in FIG. 16 to FIG. 18, any corresponding coefficient vector $G_{n_b,0}$ is obtained from RV0, any coefficient vector $G_{n_b,1}$ is obtained from RV1, any coefficient vector $G_{n_b,2}$ is obtained from RV2, and the like.

For example, the codebook is divided into four parts, that is, four RVs. FIG. 16 is still used as an example for description. The BLK2 is used as an example. Original data packets in the BLK2 participate in coding of three network coding windows. The first network coding window in which the original data packets in the BLK2 participate includes the original data packets in the BLK2 and the BLK1, and the second network coding window in which the original data packets in the BLK2 participate includes the original data packets in the BLK3 and the BLK2, and the third network coding window in which the original data packets of the BLK2 participate includes the original data packets in the BLK4, the BLK3, and the BLK2. Therefore, coding coefficient matrices corresponding to the original data packets in the BLK2 in the three network coding windows are respectively $G_{n_2,0}$, $G_{n_3,1}$, and $G_{n_4,2}$. In this case, a coding coefficient vector corresponding to each column in $G_{n_2,0}$ is selected from the codewords corresponding to RV0, a coding coefficient vector corresponding to each column in $G_{n_3,1}$ is selected from the codewords corresponding to RV1, and a coding coefficient vector corresponding to each column in $G_{n_4,2}$ are selected from the codewords corresponding to RV2.

The non-system codes shown in FIG. 17 and FIG. 18 are similar to the system codes shown in FIG. 16, and a difference lies in that: in FIG. 16, submatrices of a matrix G include $I_{k_b}$ and $G_{n_b,z}$, where $I_{k_b}$ is a unit matrix and is used to generate a system packet (a data part is the same as that of an original data packet), and Ganz is used to generate a redundant packet or a check packet, where z=0, 1, 2, . . . , Z−1 and Z is a positive integer greater than 1. However, in FIG. 17 and FIG. 18, the submatrix of the matrix G does not include the unit matrix $I_{k_b}$, and includes only $G_{n_b,z}$. In other words, when network coding is performed based on the matrices in FIG. 17 and FIG. 18, only redundant packets or check packets will be generated, and no system packet will be generated.

Further, in a retransmission scenario based on a feedback mechanism, if the transmitter device has learned which original data packets in the historical BLK fail to be transmitted, network coding may be performed on the original data packets that fail to be transmitted in the historical BLK and the original data packets in the current BLK together, and the original data packets that are successfully transmitted in the historical BLK no longer participate in network coding, thereby saving resources and improving spectral efficiency. For example, in FIG. 17 and FIG. 18, a network coding sliding window corresponding to the BLK2 is used as an example, and $G_{2,0}$ and $G_{2,1}$ are used to perform network coding on the original data packets in the BLK2 and some of the original data packets in the BLK1.

In addition, the difference between FIG. 17 and FIG. 18 is as follows: In FIG. 17, for any $G_{n_b,1}$, a corresponding quantity of coding coefficients are truncated from the fourth codebook based on the quantity (the quantity of rows in $G_{n_b,1}$, which is assumed to be K) of original data packets of the BLK corresponding to $G_{n_b,1}$, for example, when codewords of w×1 dimensions are obtained from the fourth codebook, the first K codewords may be truncated as the coding coefficients, while in FIG. 18, for any $G_{n_b,1}$, the codewords of w×1 dimensions are obtained from the fourth codebook, then the upper half part is set to 0 based on the quantity of the original data packets, and only the coding coefficients in the lower half part (K rows) are reserved.

It should be understood that, in FIG. 17 and FIG. 18, a coding coefficient used to perform network coding on the original data packets in both the BLK2 and the BLK1 may be a coding coefficient corresponding to any K rows of codewords selected from the fourth codebook. For example, only K rows of coding coefficients in the upper half may be reserved, or K consecutive rows of coding coefficients in the middle may be reserved, which is not limited in this application.

It should be noted that, if encoded data packets are generated based on the fourth codebook shown in any one of FIG. 16 to FIG. 18, if available codewords have been traversed for codewords used for a block, and more encoded data packets need to be generated, more extension codewords may be obtained according to one or more extension rules provided in the data processing method shown in FIG. 8, so as to generate more redundant packets.

Based on the data processing method shown in FIG. 15, a plurality of groups of elements that are in a one-to-one correspondence with a plurality of groups of original data packets in a network coding sliding window may be obtained based on a codebook of a limited size, and all to-be-transmitted data packets in the network coding sliding window are encoded or decoded together by using a coding coefficient obtained after the plurality of groups of elements are combined, so that flexible block lengths are supported and more original data packets can be encoded. In addition, any two groups in the plurality of groups of elements come from different codewords in a fourth codebook, so that in different network coding sliding windows, coding coefficients corresponding to a same group of data packets come from different codewords in the fourth codebook. In this way, a redundant packet or a check packet generated for the same group of data packets is valid, to improve coding or decoding performance, thereby improving system spectral efficiency or improving system reliability.

It may be understood that in the foregoing embodiments, the methods and/or steps implemented by the transmitter device may be alternatively implemented by a component (for example, a chip or a circuit) that can be used in the transmitter device, and the methods and/or steps implemented by the receiver device may be alternatively implemented by a component (for example, a chip or a circuit) that can be used in the receiver device.

Corresponding to the methods provided in the foregoing method embodiments, embodiments of this application further provide corresponding apparatuses. The apparatuses include corresponding modules configured to perform the foregoing data processing methods. The module may be software, hardware, or a combination of software and hardware.

Figure 19:
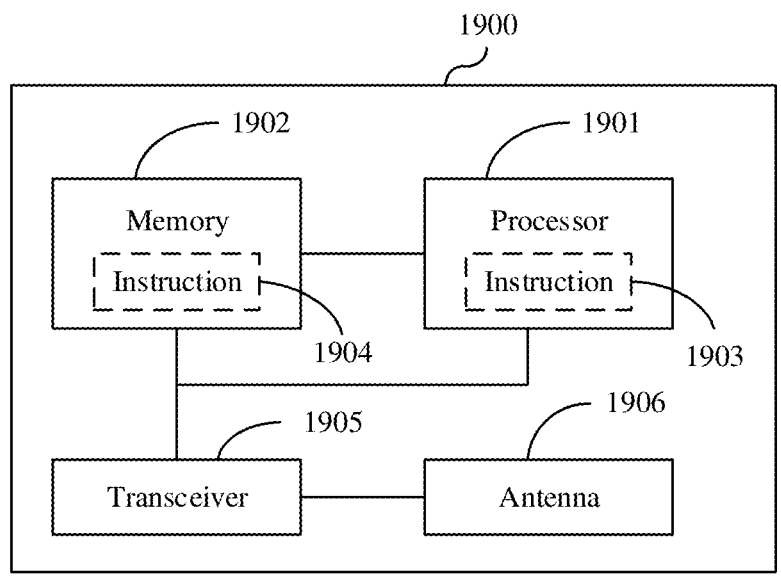
FIG. 19 is a schematic diagram 1 of a structure of an example data processing apparatus according to an embodiment of this application.

FIG. 19 is a schematic diagram of a structure of an apparatus. The apparatus 1900 may be a terminal device, or may be a chip, a chip system, a processor, or the like that supports the terminal device in implementing the foregoing method. Alternatively, the apparatus 1900 may be a network device, or may be a chip, a chip system, a processor, or the like that supports the network device in implementing the foregoing method. The apparatus 1900 may be configured to implement the methods described in the foregoing method embodiments. For details, refer to the descriptions in the foregoing method embodiments.

The apparatus 1900 may include one or more processors 1901. The processor 1901 may also be referred to as a processing unit, and may implement a specific control function. The processor 1901 may be a general-purpose processor, a dedicated processor, or the like. For example, the processor may be a baseband processor or a central processing unit. The baseband processor may be configured to process a communication protocol and communication data. The central processing unit may be configured to control the data processing apparatus (for example, a base station, a baseband chip, a terminal device, a terminal device chip, a DU, or a CU), execute a software program, and process data of the software program.

In an optional design, the processor 1901 may alternatively store instructions 1903, and the instructions 1903 may be executed by the processor, so that the apparatus 1900 performs the methods described in the foregoing method embodiments.

In another optional design, the processor 1901 may include a transceiver unit configured to implement a receiving function and a sending function. For example, the transceiver unit may be a transceiver circuit, an interface, or an interface circuit. The transceiver circuit, the interface, or the interface circuit configured to implement the receiving and sending functions may be separated, or may be integrated together. The transceiver circuit, the interface, or the interface circuit may be configured to read and write code or data. Alternatively, the transceiver circuit, the interface, or the interface circuit may be configured to transmit or transfer a signal.

In still another possible design, the apparatus 1900 may include a circuit. The circuit may implement a sending, receiving, or communication function in the foregoing method embodiments.

Optionally, the apparatus 1900 may include one or more memories 1902. The memory 1902 may store instructions 1904. The instructions 1904 may be run on the processor, so that the apparatus 1900 performs the methods described in the foregoing method embodiments. Optionally, the memory may further store data. Optionally, the processor may also store instructions and/or data. The processor and the memory may be separately disposed, or may be integrated together. For example, the extension rules and any codebook described in the foregoing method embodiments may be stored in a memory or stored in a processor.

Optionally, the apparatus 1900 may further include a transceiver 1905 and/or an antenna 1906. The processor 1901 may control the apparatus 1900. The transceiver 1905 may be referred to as a transceiver unit, a transceiver device, a transceiver circuit, a transceiver apparatus, a transceiver module, or the like, and is configured to implement a receiving function and a sending function.

Optionally, the apparatus 1900 in this embodiment of this application may be configured to perform the method described in FIG. 8 or FIG. 15 in embodiments of this application.

The T processor and the transceiver that are described in this application may be implemented on an integrated circuit (IC), an analog IC, a radio frequency integrated circuit RFIC, a hybrid signal IC, an application-specific integrated circuit (ASIC), a printed circuit board (PCB), an electronic device, or the like. The processor and the transceiver may alternatively be manufactured by using various IC process technologies, for example, a complementary metal oxide semiconductor (CMOS), an N-metal oxide semiconductor (NMOS), a positive channel metal oxide semiconductor (PMOS), a bipolar junction transistor (BJT), a bipolar CMOS (BiCMOS), silicon germanium (SiGe), and gallium arsenide (GaAs).

The apparatus described in the foregoing embodiments may be a transmitter device or a receiver device (for example, a network device or a terminal device). However, a scope of the apparatus described in this application is not limited thereto, and a structure of the apparatus may not be limited by FIG. 19. The apparatus 1900 may be an independent device or may be a part of a large device. For example, the apparatus 1900 may be:

(1) an independent integrated circuit IC, a chip, or a chip system or subsystem;
(2) a set of one or more ICs, where optionally, the IC set may also include a storage component configured to store data and/or instructions;
(3) an ASIC, for example, a modem (MSM);
(4) a module that can be embedded in another device;
(5) a receiver, a terminal device, an intelligent terminal device, a cellular phone, a wireless device, a handheld device, a mobile unit, a vehicle-mounted device, a network device, a cloud device, an artificial intelligence device, a machine device, a household device, a medical device, an industrial device, and the like; and
(6) others.

Figure 20:
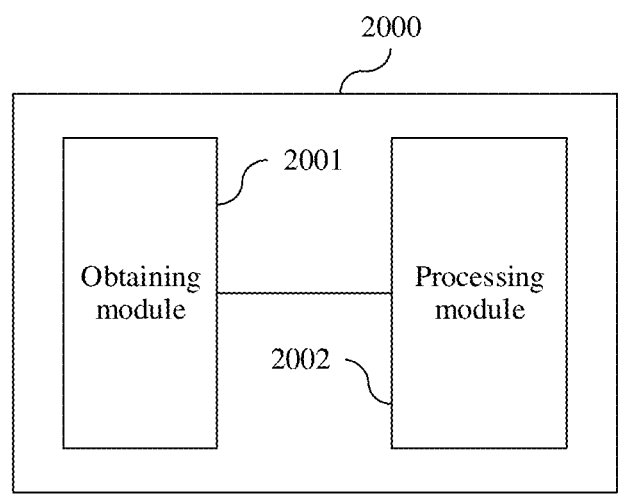
FIG. 20 is a schematic diagram 2 of a structure of an example data processing apparatus according to an embodiment of this application.

As shown in FIG. 20, another embodiment of this application provides a data processing apparatus 2000. The apparatus may be a terminal device; or may be a component (for example, an integrated circuit or a chip) of a terminal device. Alternatively, the apparatus may be a network device, or may be a component (for example, an integrated circuit or a chip) of the network device. Alternatively, the apparatus may be another communication module configured to implement the methods in the method embodiments of this application. The apparatus 2000 may include an obtaining module 2001 and a processing module 2002. Optionally, the apparatus 2000 may further include a transceiver module (or referred to as a transceiver unit, which is not shown in FIG. 20) or a storage module (or referred to as a storage unit, which is not shown in FIG. 20). For ease of description, FIG. 20 shows only main components of the data processing apparatus.

In a possible design, one or more modules in FIG. 20 may be implemented by using one or more processors, may be implemented by using one or more processors and memories, may be implemented by using one or more processors and transceivers, or may be implemented by using one or more processors, memories, and transceivers. This is not limited in this embodiment of this application. The processor, the memory, and the transceiver may be disposed separately, or may be integrated.

The apparatus has a function of implementing the transmitter device described in embodiments of this application. For example, the apparatus includes a corresponding module, unit, or means (means) used by the transmitter device to perform the steps related to the transmitter device and described in embodiments of this application. The function, the unit, or the means (means) may be implemented by software or hardware, may be implemented by hardware executing corresponding software, or may be implemented by a combination of software and hardware.

Similarly, the apparatus has a function of implementing the receiver device described in embodiments of this application. For example, the apparatus includes a corresponding module, unit, or means (means) used by the receiver device to perform the steps related to the receiver device and described in embodiments of this application. The function, the unit, or the means (means) may be implemented by software or hardware, may be implemented by hardware executing corresponding software, or may be implemented by a combination of software and hardware.

In some embodiments, the apparatus 2000 may be applied to the communication system shown in any one of FIG. 2 to FIG. 6, to perform the coding or decoding method shown in FIG. 8.

The obtaining module 2001 is configured to obtain a first codebook.

The processing module 2002 is configured to perform first network coding or decoding based on the first codebook.

The first codebook may be obtained by using one or more of the following extension rules.

Extension rule 1: The first codebook includes a codeword in the third codebook, the third codebook is different from the second codebook, and the second codebook is used to perform second network coding or decoding. In other words, the first codebook is a codebook obtained by adding some or all codewords in the third codebook based on the second codebook. In this case, the second codebook may be referred to as a base codebook of the first codebook, and the first codebook may be referred to as an extension codebook of the second codebook. Specifically, the first codebook may be a codebook, and the codebook includes a codeword in the second codebook and some or all of the codewords in the third codebook. Alternatively, the first codebook may include two sub-codebooks, where one sub-codebook includes a codeword in the second codebook, and the other sub-codebook includes some or all of the codewords in the third codebook. This is not specifically limited herein.

Extension rule 2: Any codeword in the first codebook includes: s elements in one codeword in the second codebook, where s is a length of one codeword in the second codebook, and s is a positive integer; and all elements or some elements in one codeword in the third codebook or one codeword in the second codebook, where a quantity of all the elements is a length of one codeword in the third codebook or the second codebook, and values of different elements in the codeword are the same or different. In other words, any codeword in the first codebook is extended by adding an element included in one codeword to the second codebook, and the added element may come from one codeword in the third codebook, or may come from any codeword in the second codebook. In this case, the second codebook may be referred to as a base codebook of the first codebook, and the first codebook may be referred to as an extension codebook of the second codebook. Specifically, the first codebook may be a codebook, and a size (size, which may also be referred to as a dimension or a length) of any codeword in the codebook is greater than a size of any codeword in the second codebook.

It should be noted that one element in the foregoing codeword is one member in the codeword, and values of different members may be the same or may be different. This is not specifically limited herein.

In this embodiment of this application, the third codebook in the foregoing two extension rules may be determined based on a first matrix corresponding to the third codebook, or may be determined based on a relationship between the first matrix corresponding to the third codebook and a second matrix corresponding to the second codebook.

Specifically, the first matrix and the second matrix may be obtained in one or more of the following manners.

Manner 1: The first matrix is a random coefficient full-rank matrix, and the second matrix is a non-random coefficient full-rank matrix.

Manner 2: The first matrix and the second matrix satisfy one of the following relationships: A vector in the first matrix and a vector in the second matrix come from a set of row vectors in a same matrix A, and a length of the vector in the first matrix or a length of the vector in the second matrix is less than or equal to a length of a row vector of the matrix A; or a vector in the first matrix and a vector in the second matrix come from a set of column vectors in a same matrix A, and a length of the vector in the first matrix or a length of the vector in the second matrix is less than or equal to a length of a column vector in the matrix A, where one or more vectors in the first matrix are different from all vectors in the second matrix.

Manner 3: The first matrix and the second matrix satisfy a functional relationship. With the functional relationship, a codeword in the third codebook and a codeword in the second codebook are linearly independent.

Manner 4: A field size of a finite field corresponding to the first matrix is greater than a field size of a finite field corresponding to the second matrix.

The following describes Manner 1 to Manner 4 in detail.

For Manner 1, optionally, the second matrix is also a full-rank matrix, that is, both the first matrix and the second matrix are full-rank matrices.

For Manner 2, in a possible implementation, the matrix A satisfies $$\begin{bmatrix} a_1^0 & a_2^0 & \ldots & a_m^0 & \ldots & a_q^0 \\ a_1^1 & a_2^1 & \ldots & a_m^1 & \ldots & a_q^1 \\ \vdots & \vdots & \ddots & \vdots & \ddots & \vdots \\ a_1^l & a_2^l & \ldots & a_m^l & \ldots & a_q^l \\ \vdots & \vdots & \ddots & \vdots & \ddots & \vdots \\ a_1^{q-1} & a_2^{q-1} & \ldots & a_m^{q-1} & \ldots & a_q^{q-1} \end{bmatrix}$$

or $$\begin{bmatrix} a_1^0 & a_2^0 & \ldots & a_m^0 & \ldots & a_q^0 \\ a_1^1 & a_2^1 & \ldots & a_m^1 & \ldots & a_q^1 \\ \vdots & \vdots & \ddots & \vdots & \ddots & \vdots \\ a_1^l & a_2^l & \ldots & a_m^l & \ldots & a_q^l \\ \vdots & \vdots & \ddots & \vdots & \ddots & \vdots \\ a_1^{q-1} & a_2^{q-1} & \ldots & a_m^{q-1} & \ldots & a_q^{q-1} \end{bmatrix}^T.$$

q is a size of a finite field minus 1, $a_m$ is an element in the finite field, $1 \leq m \leq q$, $a_1, a_2, \ldots, a_m, \ldots, a_q$ are different elements in the finite field, $a_m^l$ is $a_m$ to the power of l, and $0 \leq l \leq q-1$.

In another possible implementation, the first matrix satisfies $$V_1 = \begin{bmatrix} b_1^0 & b_2^0 & \ldots & b_m^0 & \ldots & b_q^0 \\ b_1^1 & b_2^1 & \ldots & b_m^1 & \ldots & b_q^1 \\ \vdots & \vdots & \ddots & \vdots & \ddots & \vdots \\ b_1^l & b_2^l & \ldots & b_m^l & \ldots & b_q^l \\ \vdots & \vdots & \ddots & \vdots & \ddots & \vdots \\ b_1^{K-1} & b_2^{K-1} & \ldots & b_m^{K-1} & \ldots & b_q^{K-1} \end{bmatrix},$$

and the second matrix satisfies $$V_0 = \begin{bmatrix} a_1^0 & a_2^0 & \ldots & a_m^0 & \ldots & a_q^0 \\ a_1^1 & a_2^1 & \ldots & a_m^1 & \ldots & a_q^1 \\ \vdots & \vdots & \ddots & \vdots & \ddots & \vdots \\ a_1^l & a_2^l & \ldots & a_m^l & \ldots & a_q^l \\ \vdots & \vdots & \ddots & \vdots & \ddots & \vdots \\ a_1^{K-1} & a_2^{K-1} & \ldots & a_m^{K-1} & \ldots & a_q^{K-1} \end{bmatrix},$$

where $[b_1, b_2, \ldots, b_m, \ldots, b_q]$ and $[a_1, a_2, \ldots, a_m, \ldots, a_q]$ are different. Alternatively, the first matrix satisfies $$V_1 = \begin{bmatrix} b_1^0 & b_2^0 & \ldots & b_m^0 & \ldots & b_q^0 \\ b_1^1 & b_2^1 & \ldots & b_m^1 & \ldots & b_q^1 \\ \vdots & \vdots & \ddots & \vdots & \ddots & \vdots \\ b_1^l & b_2^l & \ldots & b_m^l & \ldots & b_q^l \\ \vdots & \vdots & \ddots & \vdots & \ddots & \vdots \\ b_1^{K-1} & b_2^{K-1} & \ldots & b_m^{K-1} & \ldots & b_q^{K-1} \end{bmatrix}^T,$$

and the second matrix satisfies $$V_0 = \begin{bmatrix} a_1^0 & a_2^0 & \ldots & a_m^0 & \ldots & a_q^0 \\ a_1^1 & a_2^1 & \ldots & a_m^1 & \ldots & a_q^1 \\ \vdots & \vdots & \ddots & \vdots & \ddots & \vdots \\ a_1^l & a_2^l & \ldots & a_m^l & \ldots & a_q^l \\ \vdots & \vdots & \ddots & \vdots & \ddots & \vdots \\ a_1^{K-1} & a_2^{K-1} & \ldots & a_m^{K-1} & \ldots & a_q^{K-1} \end{bmatrix}^T,$$

where $[b_1, b_2, \ldots, b_m, \ldots, b_q]^T$ and $[a_1, a_2, \ldots, a_m, \ldots, a_q]^T$ are different. K is a quantity of original data packets corresponding to the first network coding or decoding, q is a field size of a finite field minus 1; $a_m$ is an element in the finite field, $1 \le m \le q$, $a_1, a_2, \ldots, a_m, \ldots, a_q$ are different elements in the finite field, $a_m^l$ is $a_m$ to the power of l, and $0 \le l \le K-1$; and $b_m$ is an element in the finite field, $1 \le m \le q$, $b_1, b_2, \ldots, b_m, \ldots, b_q$ are different elements in the finite field, $b_m^l$ is $b_m$ to the power of l, and $0 \le l \le K-1$.

For Manner 3, that the first matrix and the second matrix satisfy a functional relationship may include: the first matrix is a product of the second matrix and a diagonal matrix corresponding to a non-zero row vector $[v_1, \ldots, v_K]$ or $[v_1, \ldots, v_q]$ or a non-zero column vector $v=[v_1, \ldots, v_K]^T$ or $[v_1, \ldots, v_q]^T$.

Optionally, that the first matrix and the second matrix satisfy a functional relationship may include: the second matrix satisfies $$V_0 = \begin{bmatrix} a_1^0 & a_2^0 & \ldots & a_m^0 & \ldots & a_q^0 \\ a_1^1 & a_2^1 & \ldots & a_m^1 & \ldots & a_q^1 \\ \vdots & \vdots & \ddots & \vdots & \ddots & \vdots \\ a_1^l & a_2^l & \ldots & a_m^l & \ldots & a_q^l \\ \vdots & \vdots & \ddots & \vdots & \ddots & \vdots \\ a_1^{K-1} & a_2^{K-1} & \ldots & a_m^{K-1} & \ldots & a_q^{K-1} \end{bmatrix},$$

the non-zero vector is a row vector $v=[v_1, \ldots, v_K]$ or a column vector $v=[v_1, \ldots, v_K]^T$, and the first matrix satisfies $$V_1 = \mathrm{diag}(v) \times V_0 = \begin{bmatrix} v_1 a_1^0 & v_1 a_2^0 & \ldots & v_1 a_m^0 & \ldots & v_1 a_q^0 \\ v_2 a_1^1 & v_2 a_2^1 & \ldots & v_2 a_m^1 & \ldots & v_2 a_q^1 \\ \vdots & \vdots & \ddots & \vdots & \ddots & \vdots \\ v_m a_1^l & v_m a_2^l & \ldots & v_m a_m^l & \ldots & v_m a_q^l \\ \vdots & \vdots & \ddots & \vdots & \ddots & \vdots \\ v_K a_1^{K-1} & v_K a_2^{K-1} & \ldots & v_K a_m^{K-1} & \ldots & v_K a_q^{K-1} \end{bmatrix},$$

where $$\mathrm{diag}(v) = \begin{bmatrix} v_1 & 0 & \ldots & 0 \\ 0 & v_2 & \ldots & 0 \\ \vdots & \vdots & \ddots & \vdots \\ 0 & 0 & \ldots & v_K \end{bmatrix}.$$

Alternatively, the second matrix satisfies $$V_0 = \begin{bmatrix} a_1^0 & a_2^0 & \ldots & a_m^0 & \ldots & a_q^0 \\ a_1^1 & a_2^1 & \ldots & a_m^1 & \ldots & a_q^1 \\ \vdots & \vdots & \ddots & \vdots & \ddots & \vdots \\ a_1^l & a_2^l & \ldots & a_m^l & \ldots & a_q^l \\ \vdots & \vdots & \ddots & \vdots & \ddots & \vdots \\ a_1^{K-1} & a_2^{K-1} & \ldots & a_m^{K-1} & \ldots & a_q^{K-1} \end{bmatrix},$$

the non-zero vector is a row vector $v=[v_1, \ldots, v_q]$ or a column vector $v=[v_1, \ldots, v_q]^T$, and the first matrix satisfies $$V_1 = V_0 \times \mathrm{diag}(v) = \begin{bmatrix} v_1 a_1^0 & v_2 a_2^0 & \ldots & v_m a_m^0 & \ldots & v_q a_q^0 \\ v_1 a_1^1 & v_2 a_2^1 & \ldots & v_m a_m^1 & \ldots & v_q a_q^1 \\ \vdots & \vdots & \ddots & \vdots & \ddots & \vdots \\ v_1 a_1^l & v_2 a_2^l & \ldots & v_m a_m^l & \ldots & v_q a_q^l \\ \vdots & \vdots & \ddots & \vdots & \ddots & \vdots \\ v_1 a_1^{K-1} & v_2 a_2^{K-1} & \ldots & v_m a_m^{K-1} & \ldots & v_q a_q^{K-1} \end{bmatrix},$$

where $$\mathrm{diag}(v) = \begin{bmatrix} v_1 & 0 & \ldots & 0 \\ 0 & v_2 & \ldots & 0 \\ \vdots & \vdots & \ddots & \vdots \\ 0 & 0 & \ldots & v_q \end{bmatrix}.$$

Alternatively, the second matrix satisfies $$V_0 = \begin{bmatrix} a_1^0 & a_2^0 & \ldots & a_m^0 & \ldots & a_q^0 \\ a_1^1 & a_2^1 & \ldots & a_m^1 & \ldots & a_q^1 \\ \vdots & \vdots & \ddots & \vdots & \ddots & \vdots \\ a_1^l & a_2^l & \ldots & a_m^l & \ldots & a_q^l \\ \vdots & \vdots & \ddots & \vdots & \ddots & \vdots \\ a_1^{K-1} & a_2^{K-1} & \ldots & a_m^{K-1} & \ldots & a_q^{K-1} \end{bmatrix}^T,$$

the non-zero vector is a row vector $v=[v_1, \ldots, v_K]$ or a column vector $v=[v_1, \ldots, v_K]^T$, and the first matrix satisfies $$V_1 = V_0 \times \text{diag}(v) = \begin{bmatrix} v_1 a_1^0 & v_1 a_2^0 & \ldots & v_1 a_m^0 & \ldots & v_1 a_q^0 \\ v_2 a_1^1 & v_2 a_2^1 & \ldots & v_2 a_m^1 & \ldots & v_2 a_q^1 \\ \vdots & \vdots & \ddots & \vdots & \ddots & \vdots \\ v_m a_1^l & v_m a_2^l & \ldots & v_m a_m^l & \ldots & v_m a_q^l \\ \vdots & \vdots & \ddots & \vdots & \ddots & \vdots \\ v_K a_1^{K-1} & v_K a_2^{K-1} & \ldots & v_K a_m^{K-1} & \ldots & v_K a_q^{K-1} \end{bmatrix}^T,$$

where $$\text{diag}(v) = \begin{bmatrix} v_1 & 0 & \ldots & 0 \\ 0 & v_2 & \ldots & 0 \\ \vdots & \vdots & \ddots & \vdots \\ 0 & 0 & \ldots & v_K \end{bmatrix}.$$

Alternatively, the second matrix satisfies $$V_0 = \begin{bmatrix} a_1^0 & a_2^0 & \ldots & a_m^0 & \ldots & a_q^0 \\ a_1^1 & a_2^1 & \ldots & a_m^1 & \ldots & a_q^1 \\ \vdots & \vdots & \ddots & \vdots & \ddots & \vdots \\ a_1^l & a_2^l & \ldots & a_m^l & \ldots & a_q^l \\ \vdots & \vdots & \ddots & \vdots & \ddots & \vdots \\ a_1^{K-1} & a_2^{K-1} & \ldots & a_m^{K-1} & \ldots & a_q^{K-1} \end{bmatrix}^T,$$

the non-zero vector is a row vector $v=[v_1, \ldots, v_q]$ or a column vector $v=[v_1, \ldots, v_q]^T$, and the first matrix satisfies $$V_1 = \text{diag}(v) \times V_0 = \begin{bmatrix} v_1 a_1^0 & v_2 a_2^0 & \ldots & v_m a_m^0 & \ldots & v_q a_q^0 \\ v_1 a_1^1 & v_2 a_2^1 & \ldots & v_m a_m^1 & \ldots & v_q a_q^1 \\ \vdots & \vdots & \ddots & \vdots & \ddots & \vdots \\ v_1 a_1^l & v_2 a_2^l & \ldots & v_m a_m^l & \ldots & v_q a_q^l \\ \vdots & \vdots & \ddots & \vdots & \ddots & \vdots \\ v_1 a_1^{K-1} & v_2 a_2^{K-1} & \ldots & v_m a_m^{K-1} & \ldots & v_q a_q^{K-1} \end{bmatrix}^T,$$

where $$\text{diag}(v) = \begin{bmatrix} v_1 & 0 & \ldots & 0 \\ 0 & v_2 & \ldots & 0 \\ \vdots & \vdots & \ddots & \vdots \\ 0 & 0 & \ldots & v_q \end{bmatrix}.$$

K is a quantity of original data packets corresponding to the first network coding or decoding, q is a field size of a finite field minus 1, $a_m$ is an element in the finite field, $1 \leq m \leq q$, $a_1$, $a_2, \ldots, a_m, \ldots, a_q$ are different elements in the finite field, $a_m^l$ is $a_m$ raised to the power of l, $0 \leq l \leq K-1$, and diag(v) is a diagonal matrix corresponding to v.

Alternatively, in still another possible design solution, that the first matrix and the second matrix satisfy a functional relationship may include: the first matrix is a matrix obtained after elementary transformation is performed on the second matrix, and the elementary transformation includes one or more of elementary row transformation, elementary column transformation, row-change transformation, or column-change transformation. In addition, a transformation operation may be further performed on the first matrix and the second matrix based on an inverse matrix. With the inverse matrix, a codeword in the third codebook and a codeword in the second codebook may be as linearly independent as possible. In this case, the elementary transformation may further include a non-zero number multiplied by a row or a column of the matrix.

For example, the second matrix satisfies $$V_0 = \begin{bmatrix} a_1^0 & a_2^0 & \ldots & a_m^0 & \ldots & a_q^0 \\ a_1^1 & a_2^1 & \ldots & a_m^1 & \ldots & a_q^1 \\ \vdots & \vdots & \ddots & \vdots & \ddots & \vdots \\ a_1^l & a_2^l & \ldots & a_m^l & \ldots & a_q^l \\ \vdots & \vdots & \ddots & \vdots & \ddots & \vdots \\ a_1^{K-1} & a_2^{K-1} & \ldots & a_m^{K-1} & \ldots & a_q^{K-1} \end{bmatrix},$$

and the first matrix is a row transformation matrix of the second matrix; or the second matrix satisfies $$V_0 = \begin{bmatrix} a_1^0 & a_2^0 & \ldots & a_m^0 & \ldots & a_q^0 \\ a_1^1 & a_2^1 & \ldots & a_m^1 & \ldots & a_q^1 \\ \vdots & \vdots & \ddots & \vdots & \ddots & \vdots \\ a_1^l & a_2^l & \ldots & a_m^l & \ldots & a_q^l \\ \vdots & \vdots & \ddots & \vdots & \ddots & \vdots \\ a_1^{K-1} & a_2^{K-1} & \ldots & a_m^{K-1} & \ldots & a_q^{K-1} \end{bmatrix}^T,$$

and the first matrix is a column transformation matrix of the second matrix, where K is a quantity of original data packets corresponding to the first network coding or decoding, q is a field size of a finite field minus 1, $a_m$ is an element in the finite field, $1 \leq m \leq q$, $a_1, a_2, \ldots, a_m, \ldots, a_q$ are different elements in the finite field, $a_m^l$ is $a_m$ raised to the power of l, and $0 \leq l \leq K-1$.

For Manner 4, that a field size of a finite field corresponding to the first matrix is greater than a field size of a finite field corresponding to the second matrix may include: the second matrix satisfies $$V_0 = \begin{bmatrix} a_1^0 & a_2^0 & \ldots & a_{q_2}^0 \\ a_1^1 & a_2^1 & \ldots & a_{q_2}^1 \\ \vdots & \vdots & \ddots & \vdots \\ a_1^{K-1} & a_2^{K-1} & \ldots & a_{q_2}^{K-1} \end{bmatrix},$$

the first matrix satisfies $$V_1 = \begin{bmatrix} c_1^0 & c_2^0 & \ldots & c_{q_1}^0 \\ c_1^1 & c_2^1 & \ldots & c_{q_1}^1 \\ \vdots & \vdots & \ddots & \vdots \\ c_1^{K-1} & c_2^{K-1} & \ldots & c_{q_1}^{K-1} \end{bmatrix},$$

and a field size $Q_1$ of a finite field in which $[c_1, c_2, \ldots, c_{q_1}]$ is located is greater than a field size $Q_2$ of a finite field in which $[a_1, a_2, \ldots, a_{q_2}]$ is located. Alternatively, the first matrix satisfies $$V_0 = \begin{bmatrix} a_1^0 & a_2^0 & \cdots & a_{q_2}^0 \\ a_1^1 & a_2^1 & \cdots & a_{q_2}^1 \\ \vdots & \vdots & \ddots & \vdots \\ a_1^{K-1} & a_2^{K-1} & \cdots & a_{q_2}^{K-1} \end{bmatrix}^T,$$

the second matrix satisfies $$V_1 = \begin{bmatrix} c_1^0 & c_2^0 & \cdots & c_{q_1}^0 \\ c_1^1 & c_2^1 & \cdots & c_{q_1}^1 \\ \vdots & \vdots & \ddots & \vdots \\ c_1^{K-1} & c_2^{K-1} & \cdots & c_{q_1}^{K-1} \end{bmatrix}^T,$$

and a field size $Q_1$ of a finite field in which $[c_1, c_2, \ldots, c_{q_1}]^T$ is located is greater than a field size $Q_2$ of a finite field in which $[a_1, a_2, \ldots, a_{q_2}]^T$ is a quantity of original data packets corresponding to the first network coding or decoding, $q_1 = Q_1 - 1$, $q_2 = Q_2 - 1$, $a_1, a_2, \ldots, a_{q_2}$ are different elements in the finite field whose field size is $Q_2$, and $c_1, c_2, \ldots, c_{q_1}$ are different elements in the finite field whose field size is $Q_1$.

For example, the codeword in the second codebook may be one or more of the following: a Reed-Solomon RS code, a maximum distance separable MDS code, a low density parity check LDPC code, and a Bose-Chaudhuri-Hocquenghem BCH code.

In some embodiments, the apparatus 2000 may be applied to the communication system shown in any one of FIG. 2 to FIG. 6, to perform the coding or decoding method shown in FIG. 15.

The obtaining module 2001 is configured to obtain a coding coefficient based on a fourth codebook.

The processing module 2002 is configured to perform network coding or decoding on a plurality of groups of original data packets in one network coding sliding window based on the coding coefficient.

The coding coefficient includes a plurality of groups of elements, the plurality of groups of elements are in a one-to-one correspondence with a plurality of groups of original data packets, any group of elements in the plurality of groups of elements come from one codeword in the fourth codebook, and any two groups of elements come from different codewords in the fourth codebook.

The fourth codebook may be one or more of the first codebook, the second codebook, or the third codebook in the method embodiments, or may be a codebook obtained in another manner. This is not limited in this embodiment of this application.

Optionally, a length of any codeword in the fourth codebook is less than a total quantity of data packets in the plurality of groups of original data packets, and is greater than or equal to a quantity of data packets in any group of data packets in the plurality of groups of original data packets.

In a possible design solution, in different network coding sliding windows, coding coefficients corresponding to a same group of data packets are different.

In a possible design solution, in different network coding sliding windows, network coding or decoding is performed on a same group of data packets by using different redundant versions.

The following uses a terminal device and a network device as an example to describe in detail a specific structure of the foregoing data processing apparatus.

Figure 21:
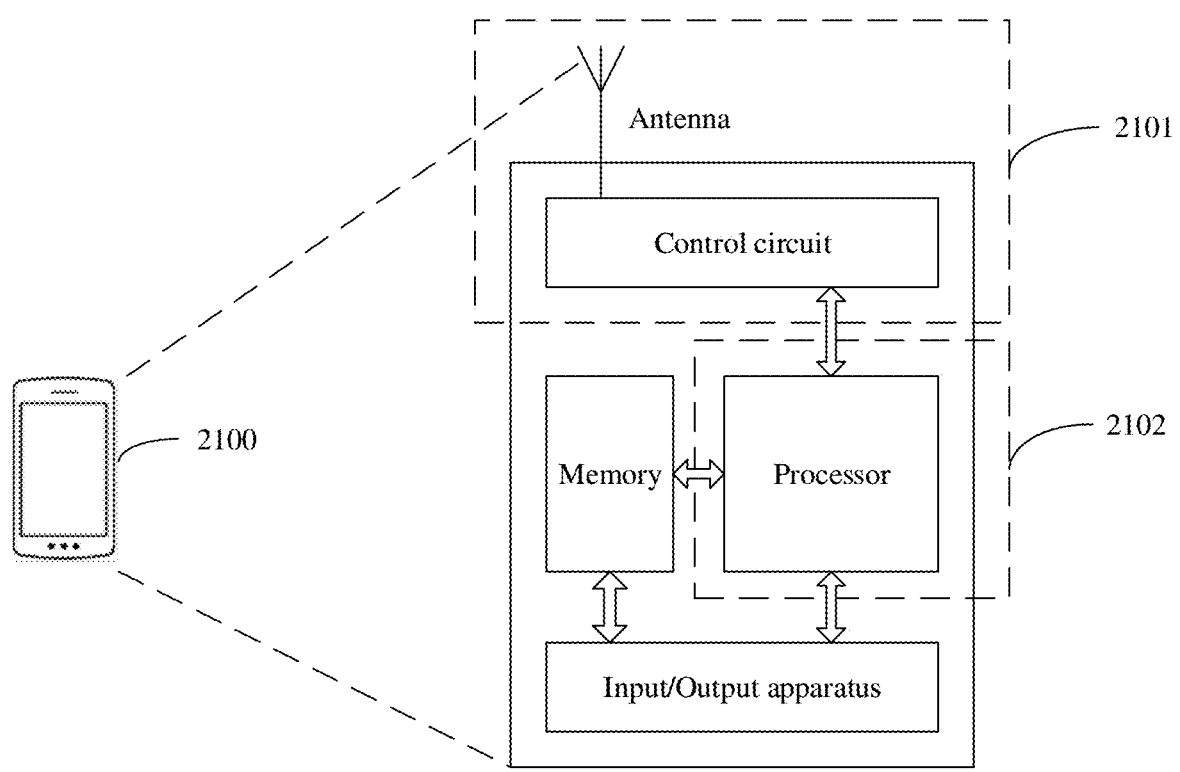
FIG. 21 is a schematic diagram of a structure of an example terminal device according to an embodiment of this application.

FIG. 21 is a schematic diagram of a structure of a terminal device. The terminal device may be used in the scenario shown in any one of FIG. 2 to FIG. 6 to perform a function of the transmitter device or the receiver device in the foregoing method embodiments. For ease of description, FIG. 21 shows only main components of the terminal device. As shown in FIG. 21, the terminal device 2100 includes a processor, a memory, a control circuit, an antenna, and an input/output apparatus. The processor is mainly configured to: process a communication protocol and communication data, control the entire terminal device, execute a software program, and process data of the software program. The memory is configured to store the software program and the data. A radio frequency circuit is mainly configured to: perform conversion between a baseband signal and a radio frequency signal, and process the radio frequency signal. The antenna is mainly configured to receive and transmit the radio frequency signal in a form of an electromagnetic wave. The input/output apparatus, such as a touchscreen, a display, or a keyboard, is mainly configured to: receive data input by a user and output data to the user.

After the terminal device is powered on, the processor may read a software program in a storage unit, parse and execute instructions of the software program, and process data of the software program. When data needs to be sent in a wireless manner, the processor performs baseband processing on the to-be-sent data, and outputs a baseband signal to the radio frequency circuit. The radio frequency circuit processes the baseband signal to obtain a radio frequency signal, and sends the radio frequency signal to the outside in a form of an electromagnetic wave through the antenna. When data is sent to the terminal device, the radio frequency circuit receives a radio frequency signal by using the antenna, further converts the radio frequency signal into a baseband signal, and outputs the baseband signal to the processor. The processor converts the baseband signal into data, and processes the data.

For ease of description, only one memory and one processor are shown in FIG. 21. In an actual terminal device, there may be a plurality of processors and memories. The memory may also be referred to as a storage medium, a storage device, or the like. This is not limited in embodiments of this application.

In an optional implementation, the processor may include a baseband processor and a central processing unit. The baseband processor is mainly configured to process the communication protocol and the communication data. The central processing unit is mainly configured to control the entire terminal device, execute the software program, and process the data of the software program. The processor in FIG. 21 integrates functions of the baseband processor and the central processing unit. A person skilled in the art may understand that the baseband processor and the central processing unit may alternatively be processors independent of each other, and are interconnected by using a technology such as a bus. A person skilled in the art may understand that the terminal device may include a plurality of baseband processors to adapt to different network standards, and the terminal device may include a plurality of central processing units to enhance a processing capability of the terminal device, and components of the terminal device may be connected by using various buses. The baseband processor may alternatively be expressed as a baseband processing circuit or a baseband processing chip. The central processing unit may alternatively be expressed as a central processing circuit or a central processing chip. A function of processing the communication protocol and the communication data may be built in the processor, or may be stored in the storage unit in a form of a software program, and the processor executes the software program to implement a baseband processing function.

In an example, the antenna and the control circuit that have a receiving or sending function may be considered as a transceiver unit of the terminal device, and the processor having a processing function may be considered as a processing unit of the terminal device. As shown in FIG. 21, the terminal device 2100 includes the transceiver unit 2101 and the processing unit 2102. The transceiver unit may also be referred to as a transceiver, a transceiver apparatus, a transceiver module, a transceiver circuit, or the like. Optionally, a component that is in the transceiver unit 2101 and that is configured to implement a receiving function may be considered as a receiving unit, and a component that is in the transceiver unit 2101 and that is configured to implement a sending function may be considered as a sending unit. In other words, the transceiver unit 2101 includes the receiving unit and the sending unit. For example, the receiving unit may alternatively be referred to as a receiver, a receiving circuit, or the like. The sending unit may alternatively be referred to as a transmitter, a transmitter circuit, or the like. Optionally, the receiving unit and the sending unit may be one integrated unit, or may be a plurality of independent units. The receiving unit and the sending unit may be located at one geographical position, or may be distributed at a plurality of geographical positions.

Optionally, the terminal device 2100 may further include a storage unit, where the storage unit stores a program or instructions. When the processing unit 2102 executes the program or the instructions, the terminal device 2100 may perform a function of the transmitter device or the receiver device in the coding or decoding methods in the foregoing method embodiments.

It should be noted that the terminal device 2100 may be a terminal device or a network device, or may be a chip (system) or another component or component that may be disposed in a terminal device or a network device, or may be an apparatus including a terminal device or a network device. This is not limited in this application.

Figure 22:
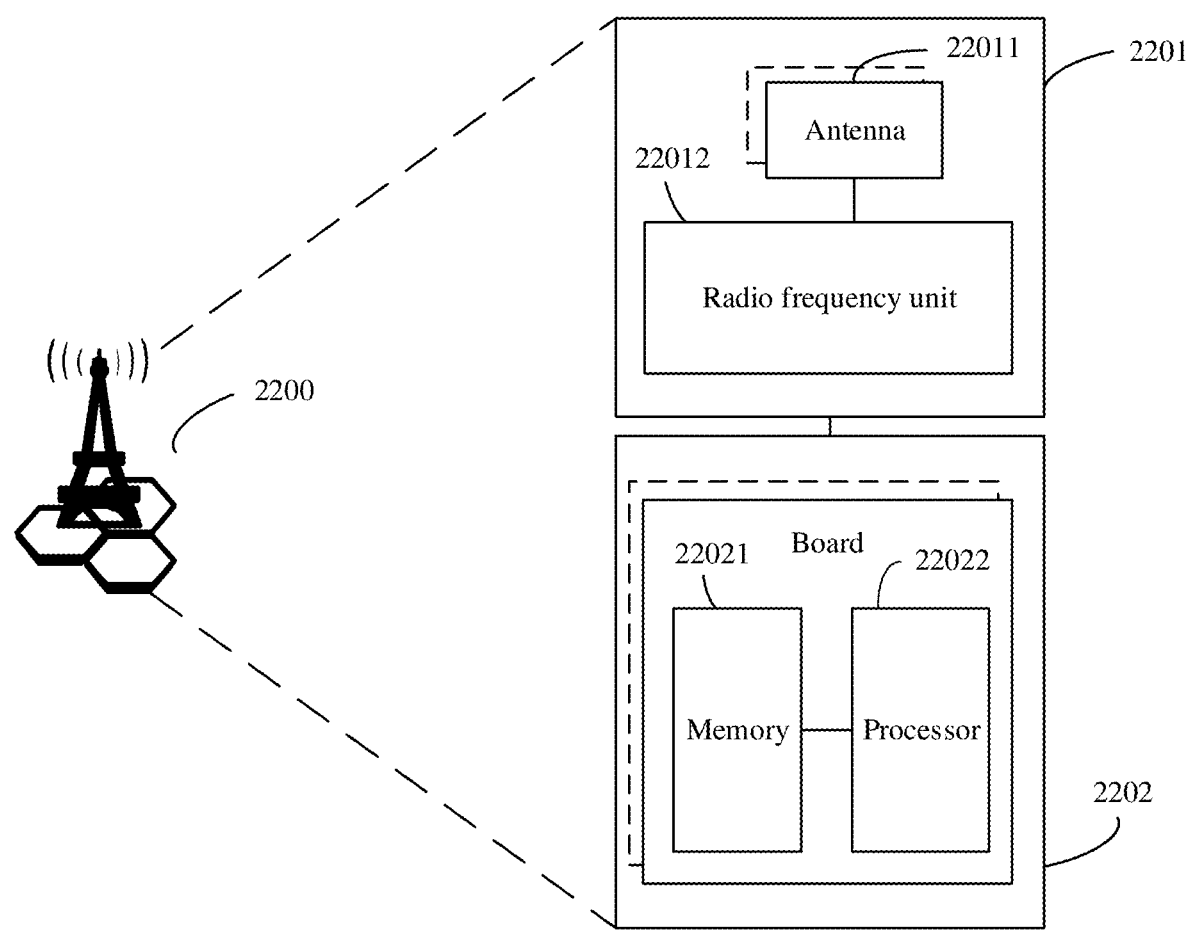
FIG. 22 is a schematic diagram of a structure of an example network device according to an embodiment of this application.

FIG. 22 is a schematic diagram of a structure of a network device according to an embodiment of this application. For example, FIG. 22 may be a schematic diagram of a structure of a base station. As shown in FIG. 22, the base station may be used in the communication system shown in any one of FIG. 2 to FIG. 6 to perform a function of the transmitter device or the receiver device in the foregoing method embodiments. The base station 2200 may include one or more radio frequency units, for example, a remote radio unit (remote radio unit, RRU) 2201 and one or more baseband units (baseband units, BBUs) 2202. The RRU 2201 may be referred to as a transceiver unit, a transceiver, a transceiver circuit, or the like. The RRU 2201 may include at least one antenna 22011 and a radio frequency unit 22012. The RRU 2201 is mainly configured to receive and transmit a radio frequency signal and perform conversion between a radio frequency signal and a baseband signal, for example, configured to send an encoded data packet in the foregoing embodiments to a receiver device, or receive an encoded data packet from a transmitter device. The BBU 2202 is mainly configured to perform baseband processing, control the base station, and the like. The RRU 2201 and the BBU 2202 may be physically disposed together, or may be physically disposed separately, that is, the base station is a distributed base station.

The BBU 2202 is a control center of the base station 2200, may also be referred to as a processing unit, and is mainly configured to complete a baseband processing function, such as network coding or decoding, channel coding or decoding, multiplexing, modulation, and spectrum spreading. For example, the BBU 2202 may be configured to control the base station to perform an operation procedure in the foregoing method embodiments when the network device is used as a transmitter device or a receiver device.

In an example, the BBU 2202 may include one or more boards, and a plurality of boards may jointly support a radio access network (for example, an LTE network) having a single access standard, or may separately support radio access networks (for example, the LTE network, a 5G network, or another network) complying with different access standards. The BBU 2202 further includes a memory 22021 and a processor 22022. The memory 22021 is configured to store necessary instructions and data. For example, the memory 22021 stores one or more of the first codebook, the second codebook, the third codebook, or the fourth codebook in the foregoing embodiments. The processor 22022 is configured to control the base station to perform a necessary action. For example, the processor 22022 is configured to control the base station to perform an operation procedure in the foregoing method embodiments when the network device is used as a transmitter device or a receiver device. The memory 22021 and the processor 22022 may serve one or more boards. In other words, a memory and a processor may be disposed on each board. Alternatively, a plurality of boards may share a same memory and a same processor. In addition, a necessary circuit may be disposed on each board.

It should be noted that the terminal device shown in FIG. 21 and the network device shown in FIG. 22 are merely examples, and should not be considered as a limitation on the data processing apparatus provided in this embodiment of this application. In other words, the data processing apparatus provided in this embodiment of this application may be another type of communication device, for example, a core network device, or another device that supports a wired or wireless communication manner, for example, a CU or a DU.

It may be understood that, in some scenarios, some optional features in embodiments of this application may be independently implemented without depending on another feature, for example, a solution on which the optional features are currently based, to resolve a corresponding technical problem and achieve a corresponding effect. Alternatively, in some scenarios, the optional features may be combined with other features based on requirements. Correspondingly, the apparatus provided in embodiments of this application may also correspondingly implement these features or functions.

A person skilled in the art may further understand that various illustrative logical blocks (illustrative logical blocks) and steps (steps) that are listed in embodiments of this application may be implemented by electronic hardware, computer software, or a combination thereof. Whether the functions are implemented by using hardware or software depends on particular applications and a design requirement of the entire system. A person skilled in the art may use various methods to implement the functions for corresponding application, but it should not be considered that the implementation goes beyond the protection scope of embodiments of this application.

It may be understood that the processor in embodiments of this application may be an integrated circuit chip, and has a signal processing capability. In an implementation process, the steps in the foregoing method embodiments may be completed by an integrated logic circuit in a form of hardware or instructions in a form of software in the processor. The foregoing processor may be a general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or a transistor logic device, or a discrete hardware component.

The solutions described in this application may be implemented in various manners. For example, the technologies may be implemented by hardware, software, or a combination thereof. For hardware-based implementation, a processing unit configured to perform these technologies on a data processing apparatus (for example, a base station, a terminal device, a network entity, or a chip) may be implemented in one or more general-purpose processors, a DSP, a digital signal processor, an ASIC, a programmable logic device, an FPGA or another programmable logic apparatus, a discrete gate or transistor logic device, a discrete hardware component, or any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors with a digital signal processor core, or any other similar configuration.

It may be understood that, in embodiments of this application, the memory may be a volatile memory or a non-volatile memory, or may include both a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. By using an example description but not a restrictive description, RAMs in many forms may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory of the system and methods described in this specification includes but is not limited to these and any memory of another proper type.

This application further provides a computer-readable medium storing a computer program. When the computer program is executed by a computer, a function of any one of the foregoing method embodiments is implemented.

This application further provides a computer program product. When the computer program product is executed by a computer, a function of any one of the foregoing method embodiments is implemented.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid state disk (solid state disk, SSD)), or the like.

It may be understood that "an embodiment" mentioned in the entire specification means that particular features, structures, or characteristics related to the embodiment are included in at least one embodiment of this application. Therefore, embodiments in the entire specification do not necessarily refer to a same embodiment. In addition, these particular features, structures, or characteristics may be combined in one or more embodiments in any appropriate manner. It may be understood that sequence numbers of the foregoing processes do not mean an execution sequence in various embodiments of this application. The execution sequence of the processes should be determined based on functions and internal logic of the processes, and should not be construed as any limitation on the implementation processes of embodiments of this application.

It may be understood that, in this application, "when" and "if" mean that an apparatus performs corresponding processing in an objective situation, and are not intended to limit time. The terms do not mean that the apparatus is required to have a determining action during implementation, and do not mean any other limitation.

"Simultaneously" in this application may be understood as being at a same time point, may be understood as being within a time period, or may be understood as being within a same period.

A person skilled in the art may understand that various numbers such as "first" and "second" in this application are merely used for differentiation for ease of description, and are not used to limit the scope of embodiments of this application. A specific value of a number (which may also be referred to as an index), a specific value of a quantity, and a position in this application are merely used as examples, but are not unique representation forms, and are not used to limit the scope of embodiments of this application. Various numbers such as "first" and "second" in this application are merely used for differentiation for ease of description, and are not used to limit the scope of embodiments of this application.

In this application, an element represented in a singular form is intended to represent "one or more", but does not represent "one and only one", unless otherwise specified. In this application, unless otherwise specified, "at least one" is intended to represent "one or more", and "a plurality of" is intended to represent "two or more".

In addition, the terms "system" and "network" in this specification may be used interchangeably in this specification. The term "and/or" in this specification is only used to describe an association relationship between associated objects, and indicates that any one of three relationships may exist. For example, A and/or B may indicate any of the following: Only A exists, both A and B exist, and only B exists, where A may indicate a singular or plural form, and B may indicate a singular or plural form. The character "/" generally indicates that the associated objects are in an "or" relationship, but does not exclude a case in which the associated objects are in an "and" relationship. A specific meaning may be understood with reference to the context.

The term "at least one of . . . " in this specification represents all or any combination of the listed items, for example, "at least one of A, B, or C", and may represent the following six cases: Only A exists, only B exists, only C exists, both A and B exist, both B and C exist, and A, B, and C all exist, where A may be indicate a singular or plural form, B may indicate a singular or plural form, and C may indicate a singular or plural form.

It may be understood that, in embodiments of this application, "B corresponding to A" should indicate that B is associated with A, and B may be determined based on A. However, it should be further understood that determining B based on A does not mean that B is determined based only on A. B may alternatively be determined based on A and/or other information.

The correspondences shown in the tables in this application may be configured, or may be predefined. Values of the information in the tables are merely examples, and other values may be configured. This is not limited in this application. When a correspondence between the information and the parameters is configured, not all the correspondences shown in the tables need to be configured. For example, in the tables in this application, correspondences shown in some rows may alternatively not be configured. For another example, proper deformations and adjustments such as splitting and combination may be performed based on the foregoing tables. Names of the parameters shown in titles of the foregoing tables may alternatively be other names that can be understood by a data processing apparatus, and values or representation manners of the parameters may alternatively be other values or representation manners that can be understood by the data processing apparatus. During implementation of the foregoing tables, another data structure, such as an array, a queue, a container, a stack, a linear table, a pointer, a linked list, a tree, a graph, a structure, a class, a pile, or a hash table, may alternatively be used.

"Predefine" in this application may be understood as "define", "predefine", "store", "pre-store", "pre-negotiate", "pre-configure", "solidify", or "pre-burn".

A person of ordinary skill in the art may understand that units and algorithm steps in the examples described with reference to embodiments disclosed in this specification can be implemented by electronic hardware or a combination of computer software and electronic hardware. Whether these functions are performed by hardware or software depends on particular applications and design constraints of the technical solutions. A person skilled in the art may use different methods to implement the described functions for each particular application, but it should not be considered that the implementation goes beyond the scope of this application.

A person of ordinary skill in the art may understand that, for the purpose of convenient and brief description, for a detailed working process of the foregoing system, apparatuses, and units, reference may be made to a corresponding process in the foregoing method embodiments.

It may be understood that the system, the apparatus, and the method described in this application may alternatively be implemented in another manner. For example, the described apparatus embodiment is merely an example. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may or may not be physical units, and may be located in one position, or may be distributed on a plurality of network units. Some or all of the units may be selected depending on actual requirements to achieve the objectives of the solutions in the embodiments.

In addition, functional units in embodiments of this application may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions in this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

For same or similar parts in embodiments of this application, refer to each other. In embodiments of this application and the implementations/implementation methods in embodiments, unless otherwise specified or a logical conflict occurs, terms and/or descriptions are consistent and may be mutually referenced between different embodiments and between the implementations/implementation methods in embodiments. Technical features in the different embodiments and the implementations/implementation methods in embodiments may be combined to form a new embodiment, implementation, or implementation method based on an internal logical relationship thereof. The foregoing descriptions are implementations of this application, but are not intended to limit the protection scope of this application.

The foregoing descriptions are merely non-limiting examples of specific implementations and are not intended to limit the protection scope, which is intended to cover any variation or replacement readily determined by a person of ordinary skill in the art.

What is claimed is:

1. A data processing method, comprising:
    obtaining a first codebook; and
    performing first network coding or decoding based on the first codebook, wherein
    the first codebook comprises a codeword in a third codebook, the third codebook is different from a second codebook, and the second codebook is used to perform second network coding or decoding;
    any codeword in the first codebook comprises: s elements in one codeword in the second codebook, and at least some elements in one codeword in the third codebook or one codeword in the second codebook, wherein s is a length of one codeword in the second codebook, s is a positive integer, and a quantity of all the elements is a length of one codeword in the third codebook or the second codebook;
    the third codebook corresponds to a first matrix, the first matrix is a random coefficient full-rank matrix, the second codebook corresponds to a second matrix, and the second matrix is a non-random coefficient full-rank matrix; or
    the third codebook corresponds to the first matrix, the second codebook corresponds to the second matrix, wherein
    the first matrix satisfies $$V_1 = \begin{bmatrix} b_1^0 & b_2^0 & \ldots & b_m^0 & \ldots & b_q^0 \\ b_1^1 & b_2^1 & \ldots & b_m^1 & \ldots & b_q^1 \\ \vdots & \vdots & \ddots & \vdots & \ddots & \vdots \\ b_1^l & b_2^l & \ldots & b_m^l & \ldots & b_q^l \\ \vdots & \vdots & \ddots & \vdots & \ddots & \vdots \\ b_1^{K-1} & b_2^{K-1} & \ldots & b_m^{K-1} & \ldots & b_q^{K-1} \end{bmatrix},$$

and the second matrix satisfies $$V_0 = \begin{bmatrix} a_1^0 & a_2^0 & \ldots & a_m^0 & \ldots & a_q^0 \\ a_1^1 & a_2^1 & \ldots & a_m^1 & \ldots & a_q^1 \\ \vdots & \vdots & \ddots & \vdots & \ddots & \vdots \\ a_1^l & a_2^l & \ldots & a_m^l & \ldots & a_q^l \\ \vdots & \vdots & \ddots & \vdots & \ddots & \vdots \\ a_1^{K-1} & a_2^{K-1} & \ldots & a_m^{K-1} & \ldots & a_q^{K-1} \end{bmatrix},$$

wherein $[b_1, b_2, \ldots b_m, \ldots, b_q]$ and $[a_1, a_2, \ldots, a_m, \ldots, a_q]$ are different; or
the first matrix satisfies $$V_1 = \begin{bmatrix} b_1^0 & b_2^0 & \ldots & b_m^0 & \ldots & b_q^0 \\ b_1^1 & b_2^1 & \ldots & b_m^1 & \ldots & b_q^1 \\ \vdots & \vdots & \ddots & \vdots & \ddots & \vdots \\ b_1^l & b_2^l & \ldots & b_m^l & \ldots & b_q^l \\ \vdots & \vdots & \ddots & \vdots & \ddots & \vdots \\ b_1^{K-1} & b_2^{K-1} & \ldots & b_m^{K-1} & \ldots & b_q^{K-1} \end{bmatrix}^T,$$

and the second matrix satisfies $$V_0 = \begin{bmatrix} a_1^0 & a_2^0 & \ldots & a_m^0 & \ldots & a_q^0 \\ a_1^1 & a_2^1 & \ldots & a_m^1 & \ldots & a_q^1 \\ \vdots & \vdots & \ddots & \vdots & \ddots & \vdots \\ a_1^l & a_2^l & \ldots & a_m^l & \ldots & a_q^l \\ \vdots & \vdots & \ddots & \vdots & \ddots & \vdots \\ a_1^{K-1} & a_2^{K-1} & \ldots & a_m^{K-1} & \ldots & a_q^{K-1} \end{bmatrix}^T,$$

wherein $[b_1, b_2, \ldots, b_m, \ldots, b_q]^T$ and $[a_1, a_2, \ldots, a_m, \ldots, a_q]^T$ are different, wherein
    K is a quantity of original data packets corresponding to the first network coding or decoding, and q is a field size of a finite field minus 1;
    $a_m$ is an element in the finite field, $1 \leq m \leq q$, $a_1, a_2, \ldots, a_m, \ldots, a_q$ are different elements in the finite field, $a_m^l$ is $a_m$ raised to the power of l, and $0 \leq l \leq K-1$; and
    $b_m$ is an element in the finite field, $1 \leq m \leq q$, $b_1, b_2, \ldots, b_m, \ldots, b_q$ are different elements in the finite field, $b_m^l$ is $b_m$ raised to the power of l, and $0 \leq l \leq K-1$.

2. The method according to claim 1, wherein a vector in the first matrix and a vector in the second matrix come from a set of row vectors in a same matrix A, and the matrix A satisfies $$\begin{bmatrix} a_1^0 & a_2^0 & \ldots & a_m^0 & \ldots & a_q^0 \\ a_1^1 & a_2^1 & \ldots & a_m^1 & \ldots & a_q^1 \\ \vdots & \vdots & \ddots & \vdots & \ddots & \vdots \\ a_1^l & a_2^l & \ldots & a_m^l & \ldots & a_q^l \\ \vdots & \vdots & \ddots & \vdots & \ddots & \vdots \\ a_1^{q-1} & a_2^{q-1} & \ldots & a_m^{q-1} & \ldots & a_q^{q-1} \end{bmatrix} \text{ or } \begin{bmatrix} a_1^0 & a_2^0 & \ldots & a_m^0 & \ldots & a_q^0 \\ a_1^1 & a_2^1 & \ldots & a_m^1 & \ldots & a_q^1 \\ \vdots & \vdots & \ddots & \vdots & \ddots & \vdots \\ a_1^l & a_2^l & \ldots & a_m^l & \ldots & a_q^l \\ \vdots & \vdots & \ddots & \vdots & \ddots & \vdots \\ a_1^{q-1} & a_2^{q-1} & \ldots & a_m^{q-1} & \ldots & a_q^{q-1} \end{bmatrix}^T,$$

wherein
    q is a size of a finite field minus 1, $a_m$ is an element in the finite field, $1 \leq m \leq q$, $a_1, a_2, \ldots, a_m, \ldots, a_q$ are different elements in the finite field, $a_m^l$ is $a_m$ raised to the power of l, and $0 \leq l \leq q-1$.

3. The method according to claim 1, wherein a codeword in the second codebook is: a Reed-Solomon (RS) code, a maximum distance separable (MDS) code, a low density parity check (LDPC) code, and/or a Bose-Chaudhuri-Hocquenghem (BCH) code.

4. A data processing method, comprising:
    obtaining a first codebook; and
    performing first network coding or decoding based on the first codebook, wherein
    the first codebook comprises a codeword in a third codebook, the third codebook is different from a second codebook, and the second codebook is used to perform second network coding or decoding;
    any codeword in the first codebook comprises: s elements in one codeword in the second codebook, and at least some elements in one codeword in the third codebook or one codeword in the second codebook, wherein s is a length of one codeword in the second codebook, s is a positive integer, and a quantity of all the elements is a length of one codeword in the third codebook or the second codebook;
    the third codebook corresponds to a first matrix, the first matrix is a random coefficient full-rank matrix, the second codebook corresponds to a second matrix, and the second matrix is a non-random coefficient full-rank matrix; or the third codebook corresponds to the first matrix, the second codebook corresponds to the second matrix, wherein the first matrix is a product of the second matrix and a diagonal matrix corresponding to a non-zero row vector $v=[v_1, \ldots, v_K]$ or $[v_1, \ldots, v_q]$ or a non-zero column wherein K is a quantity of original data packets corresponding to the first network coding or decoding, and q is a field size of a finite field minus 1.

5. The method according to claim 4, wherein the second matrix satisfies $$V_0 = \begin{bmatrix} a_1^0 & a_2^0 & \ldots & a_m^0 & \ldots & a_q^0 \\ a_1^1 & a_2^1 & \ldots & a_m^1 & \ldots & a_q^1 \\ \vdots & \vdots & \ddots & \vdots & \ddots & \vdots \\ a_1^i & a_2^i & \ldots & a_m^i & \ldots & a_q^i \\ \vdots & \vdots & \ddots & \vdots & \ddots & \vdots \\ a_1^{K-1} & a_2^{K-1} & \ldots & a_m^{K-1} & \ldots & a_q^{K-1} \end{bmatrix},$$

the non-zero vector is a row vector $v=[v_1, \ldots, v_K]$ or a column vector $v=[v_1, \ldots, v_K]^T$, and the first matrix satisfies $$V_1 = V_0 \times \mathrm{diag}(v) = \begin{bmatrix} v_1 a_1^0 & v_2 a_2^0 & \ldots & v_m a_m^0 & \ldots & v_q a_q^0 \\ v_1 a_1^1 & v_2 a_2^1 & \ldots & v_m a_m^1 & \ldots & v_q a_q^1 \\ \vdots & \vdots & \ddots & \vdots & \ddots & \vdots \\ v_1 a_1^i & v_2 a_2^i & \ldots & v_m a_m^i & \ldots & v_q a_q^i \\ \vdots & \vdots & \ddots & \vdots & \ddots & \vdots \\ v_1 a_1^{K-1} & v_2 a_2^{K-1} & \ldots & v_m a_m^{K-1} & \ldots & v_q a_q^{K-1} \end{bmatrix},$$

wherein $$\mathrm{diag}(v) = \begin{pmatrix} v_1 & 0 & \ldots & 0 \\ 0 & v_2 & \ldots & 0 \\ \vdots & \vdots & \ddots & \vdots \\ 0 & 0 & \ldots & v_q \end{pmatrix};$$

or
the second matrix satisfies $$V_0 = \begin{bmatrix} a_1^0 & a_2^0 & \ldots & a_m^0 & \ldots & a_q^0 \\ a_1^1 & a_2^1 & \ldots & a_m^1 & \ldots & a_q^1 \\ \vdots & \vdots & \ddots & \vdots & \ddots & \vdots \\ a_1^i & a_2^i & \ldots & a_m^i & \ldots & a_q^i \\ \vdots & \vdots & \ddots & \vdots & \ddots & \vdots \\ a_1^{K-1} & a_2^{K-1} & \ldots & a_m^{K-1} & \ldots & a_q^{K-1} \end{bmatrix},$$

the non-zero vector is a row vector $v=[v_1, \ldots, v_q]$ or a column vector $v=[v_1, \ldots, v_q]^T$, and the first matrix satisfies:

$$V_1 = \mathrm{diag}(v) \times V_0 = \begin{bmatrix} v_1 a_1^0 & v_1 a_2^0 & \ldots & v_1 a_m^0 & \ldots & v_1 a_q^0 \\ v_2 a_1^1 & v_2 a_2^1 & \ldots & v_2 a_m^1 & \ldots & v_2 a_q^1 \\ \vdots & \vdots & \ddots & \vdots & \ddots & \vdots \\ v_m a_1^i & v_m a_2^i & \ldots & v_m a_m^i & \ldots & v_m a_q^i \\ \vdots & \vdots & \ddots & \vdots & \ddots & \vdots \\ v_K a_1^{K-1} & v_K a_2^{K-1} & \ldots & v_K a_m^{K-1} & \ldots & v_K a_q^{K-1} \end{bmatrix},$$

wherein $$\mathrm{diag}(v) = \begin{pmatrix} v_1 & 0 & \ldots & 0 \\ 0 & v_2 & \ldots & 0 \\ \vdots & \vdots & \ddots & \vdots \\ 0 & 0 & \ldots & v_q \end{pmatrix};$$

or
the second matrix satisfies $$V_0 = \begin{bmatrix} a_1^0 & a_2^0 & \ldots & a_m^0 & \ldots & a_q^0 \\ a_1^1 & a_2^1 & \ldots & a_m^1 & \ldots & a_q^1 \\ \vdots & \vdots & \ddots & \vdots & \ddots & \vdots \\ a_1^i & a_2^i & \ldots & a_m^i & \ldots & a_q^i \\ \vdots & \vdots & \ddots & \vdots & \ddots & \vdots \\ a_1^{K-1} & a_2^{K-1} & \ldots & a_m^{K-1} & \ldots & a_q^{K-1} \end{bmatrix}^T,$$

the non-zero vector is a row vector $v=[v_1, \ldots, v_K]$ or a column vector $v=[v_1, \ldots, v_K]^T$, and the first matrix satisfies:

$$V_1 = V_0 \times \mathrm{diag}(v) = \begin{bmatrix} v_1 a_1^0 & v_1 a_2^0 & \ldots & v_1 a_m^0 & \ldots & v_1 a_q^0 \\ v_2 a_1^1 & v_2 a_2^1 & \ldots & v_2 a_m^1 & \ldots & v_2 a_q^1 \\ \vdots & \vdots & \ddots & \vdots & \ddots & \vdots \\ v_m a_1^i & v_m a_2^i & \ldots & v_m a_m^i & \ldots & v_m a_q^i \\ \vdots & \vdots & \ddots & \vdots & \ddots & \vdots \\ v_K a_1^{K-1} & v_K a_2^{K-1} & \ldots & v_K a_m^{K-1} & \ldots & v_K a_q^{K-1} \end{bmatrix}^T,$$

wherein $$\mathrm{diag}(v) = \begin{pmatrix} v_1 & 0 & \ldots & 0 \\ 0 & v_2 & \ldots & 0 \\ \vdots & \vdots & \ddots & \vdots \\ 0 & 0 & \ldots & v_K \end{pmatrix};$$

or
the second matrix satisfies $$V_0 = \begin{bmatrix} a_1^0 & a_2^0 & \ldots & a_m^0 & \ldots & a_q^0 \\ a_1^1 & a_2^1 & \ldots & a_m^1 & \ldots & a_q^1 \\ \vdots & \vdots & \ddots & \vdots & \ddots & \vdots \\ a_1^i & a_2^i & \ldots & a_m^i & \ldots & a_q^i \\ \vdots & \vdots & \ddots & \vdots & \ddots & \vdots \\ a_1^{K-1} & a_2^{K-1} & \ldots & a_m^{K-1} & \ldots & a_q^{K-1} \end{bmatrix}^T,$$

the non-zero vector is a row vector $v=[v_1, \ldots, v_q]$ or a column vector $v=[v_1, \ldots, v_q]^T$, and the first matrix satisfies $$V_1 = \mathrm{diag}(v) \times V_0 = \begin{bmatrix} v_1 a_1^0 & v_2 a_2^0 & \ldots & v_m a_m^0 & \ldots & v_q a_q^0 \\ v_1 a_1^1 & v_2 a_2^1 & \ldots & v_m a_m^1 & \ldots & v_q a_q^1 \\ \vdots & \vdots & \ddots & \vdots & \ddots & \vdots \\ v_1 a_1^i & v_2 a_2^i & \ldots & v_m a_m^i & \ldots & v_q a_q^i \\ \vdots & \vdots & \ddots & \vdots & \ddots & \vdots \\ v_1 a_1^{K-1} & v_2 a_2^{K-1} & \ldots & v_m a_m^{K-1} & \ldots & v_q a_q^{K-1} \end{bmatrix}^T,$$

wherein $$\operatorname{diag}(v) = \begin{bmatrix} v_1 & 0 & \ldots & 0 \\ 0 & v_2 & \ldots & 0 \\ \vdots & \vdots & \ddots & \vdots \\ 0 & 0 & \ldots & v_q \end{bmatrix};$$

and

K is a quantity of original data packets corresponding to the first network coding or decoding, q is a field size of a finite field minus 1, $a_m$ is an element in the finite field, $1 \leq m \leq q$, $a_1, a_2, \ldots, a_m, \ldots, a_q$ are different elements in the finite field, $a_m^l$ is $a_m$ raised to the power of l, $0 \leq l \leq K-1$, and diag(v) is a diagonal matrix corresponding to v.

6. A data processing apparatus, comprising at least one processing circuit and at least one memory storing instructions that, when executed by the at least one processing circuit, cause the data processing apparatus to perform operations comprising:

obtaining a first codebook; and configuring to perform first network coding or decoding based on the first codebook, wherein the first codebook comprises a codeword in a third codebook, the third codebook is different from a second codebook, and the second codebook is used to perform second network coding or decoding;

any codeword in the first codebook comprises: s elements in one codeword in the second codebook, and at least some elements in one codeword in the third codebook or one codeword in the second codebook, wherein s is a length of one codeword in the second codebook, s is a positive integer, and a quantity of all the elements is a length of one codeword in the third codebook or the second codebook;

the third codebook corresponds to a first matrix, the first matrix is a random coefficient full-rank matrix, the second codebook corresponds to a second matrix, and the second matrix is a non-random coefficient full-rank matrix; or the third codebook corresponds to the first matrix, the second codebook corresponds to the second matrix, wherein the first matrix satisfies $$V_1 = \begin{bmatrix} b_1^0 & b_2^0 & \ldots & b_m^0 & \ldots & b_q^0 \\ b_1^1 & b_2^1 & \ldots & b_m^1 & \ldots & b_q^1 \\ \vdots & \vdots & \ddots & \vdots & \ddots & \vdots \\ b_1^l & b_2^l & \ldots & b_m^l & \ldots & b_q^l \\ \vdots & \vdots & \ddots & \vdots & \ddots & \ldots \\ b_1^{K-1} & b_2^{K-1} & \ldots & b_m^{K-1} & \ldots & b_q^{K-1} \end{bmatrix},$$

and the second matrix satisfies $$V_0 = \begin{bmatrix} a_1^0 & a_2^0 & \ldots & a_m^0 & \ldots & a_q^0 \\ a_1^1 & a_2^1 & \ldots & a_m^1 & \ldots & a_q^1 \\ \vdots & \vdots & \ddots & \vdots & \ddots & \vdots \\ a_1^l & a_2^l & \ldots & a_m^l & \ldots & a_q^l \\ \vdots & \vdots & \ddots & \vdots & \ddots & \ldots \\ a_1^{K-1} & a_2^{K-1} & \ldots & a_m^{K-1} & \ldots & a_q^{K-1} \end{bmatrix},$$

wherein $[b_1, b_2, \ldots, b_m, \ldots, b_q]$ and $[a_1, a_2, \ldots, a_m, \ldots, a_q]$ are different; or the first matrix satisfies $$V_1 = \begin{bmatrix} b_1^0 & b_2^0 & \ldots & b_m^0 & \ldots & b_q^0 \\ b_1^1 & b_2^1 & \ldots & b_m^1 & \ldots & b_q^1 \\ \vdots & \vdots & \ddots & \vdots & \ddots & \vdots \\ b_1^l & b_2^l & \ldots & b_m^l & \ldots & b_q^l \\ \vdots & \vdots & \ddots & \vdots & \ddots & \ldots \\ b_1^{K-1} & b_2^{K-1} & \ldots & b_m^{K-1} & \ldots & b_q^{K-1} \end{bmatrix}^T,$$

and the second matrix satisfies $$V_0 = \begin{bmatrix} a_1^0 & a_2^0 & \ldots & a_m^0 & \ldots & a_q^0 \\ a_1^1 & a_2^1 & \ldots & a_m^1 & \ldots & a_q^1 \\ \vdots & \vdots & \ddots & \vdots & \ddots & \vdots \\ a_1^l & a_2^l & \ldots & a_m^l & \ldots & a_q^l \\ \vdots & \vdots & \ddots & \vdots & \ddots & \ldots \\ a_1^{K-1} & a_2^{K-1} & \ldots & a_m^{K-1} & \ldots & a_q^{K-1} \end{bmatrix}^T,$$

wherein $[b_1, b_2, \ldots, b_m, \ldots, b_q]^T$ and $[a_1, a_2, \ldots, a_m, \ldots, a_q]^T$ are different, wherein K is a quantity or original data packets corresponding to the first network coding or decoding, and q is a field size of a finite minus 1;

$a_m$ is an element in the finite field, $1 \leq m \leq q$, $a_1, a_2, \ldots, a_m, \ldots, a_q$ are different elements in the finite field, $a_m^l$ is $a_m$ raised to the power of l, and $0 \leq l \leq K-1$; and $b_m$ is an element in the finite field, $1 \leq m \leq q$, $b_1, b_2, \ldots b_m, \ldots, b_q$ are different elements in the finite field, $b_m^l$ is $b_m$ raised to the power of l, and $0 \leq l \leq K-1$.

7. The apparatus according to claim 6, wherein a vector in the first matrix and a vector in the second matrix come from a set of row vectors in a same matrix A, and the matrix A satisfies $$\begin{bmatrix} a_1^0 & a_2^0 & \ldots & a_m^0 & \ldots & a_q^0 \\ a_1^1 & a_2^1 & \ldots & a_m^1 & \ldots & a_q^1 \\ \vdots & \vdots & \ddots & \vdots & \ddots & \vdots \\ a_1^l & a_2^l & \ldots & a_m^l & \ldots & a_q^l \\ \vdots & \vdots & \ddots & \vdots & \ddots & \ldots \\ a_1^{q-1} & a_2^{q-1} & \ldots & a_m^{q-1} & \ldots & a_q^{q-1} \end{bmatrix} \text{ or } \begin{bmatrix} a_1^0 & a_2^0 & \ldots & a_m^0 & \ldots & a_q^0 \\ a_1^1 & a_2^1 & \ldots & a_m^1 & \ldots & a_q^1 \\ \vdots & \vdots & \ddots & \vdots & \ddots & \vdots \\ a_1^l & a_2^l & \ldots & a_m^l & \ldots & a_q^l \\ \vdots & \vdots & \ddots & \vdots & \ddots & \ldots \\ a_1^{q-1} & a_2^{q-1} & \ldots & a_m^{q-1} & \ldots & a_q^{q-1} \end{bmatrix}^T,$$

wherein q is a size of a finite field minus 1, $a_m$ is an element in the finite field, $1 \leq m \leq q$, $a_1, a_2, \ldots, a_m, \ldots, a_q$ are different elements in the finite field, $a_m^l$ is $a_m$ raised to the power of l, and $0 \leq l \leq q-1$.

8. The apparatus according to claim 6, wherein a codeword in the second codebook is: a Reed-Solomon (RS) code, a maximum distance separable (MDS) code, a low density parity check (LDPC) code, and/or a Bose-Chaudhuri-Hocquenghem (BCH) code.

9. The apparatus according to claim 6, wherein the apparatus is a chip.

* * * * *